US005627694A

United States Patent [19]

Ido et al.

[11] Patent Number: 5,627,694

[45] Date of Patent: May 6, 1997

[54] RECORDING/REPRODUCING APPARATUS FOR RECORDING AND REPRODUCING MULTIPLE KINDS OF DIGITAL SIGNALS HAVING DIFFERENT DATA AMOUNTS PER UNIT TIME

[75] Inventors: Kihei Ido; Masako Yamada; Hideaki Kosaka; Masayuki Ohta, all of Kyoto, Japan

[73] Assignee: Mitsubishi Denki Kabushiki Kaisha, Tokyo, Japan

[21] Appl. No.: 121,528

[22] Filed: Sep. 16, 1993

Related U.S. Application Data

[63] Continuation-in-part of Ser. No. 18,403, Feb. 17, 1993, abandoned.

[30] Foreign Application Priority Data

Feb. 19, 1992 [JP] Japan .................................... 4-32077
Feb. 28, 1992 [JP] Japan .................................... 4-43074

[51] Int. Cl.[6] .................................................. G11B 5/09

[52] U.S. Cl. ........................................... 360/51; 360/48

[58] Field of Search ............................ 360/32, 48, 51, 360/19.1, 8, 9.1; 358/335, 343

[56] References Cited

U.S. PATENT DOCUMENTS

| | | | |
|---|---|---|---|
| 4,620,300 | 10/1986 | Ogawa | 360/51 X |
| 4,812,924 | 3/1989 | Fukami et al. | 360/32 |
| 4,858,035 | 8/1989 | Hikawa | 360/51 |
| 5,012,352 | 4/1991 | Yoshimura et al. | 360/19.1 |
| 5,132,807 | 7/1992 | Takimoto et al. | 358/343 |
| 5,355,229 | 10/1994 | Arano et al. | 358/343 |
| 5,396,374 | 3/1995 | Kubota et al. | 360/19.1 |

FOREIGN PATENT DOCUMENTS

| | | |
|---|---|---|
| 0104700 | 4/1984 | European Pat. Off. . |
| 0250049 | 12/1987 | European Pat. Off. . |
| 0321314 | 6/1989 | European Pat. Off. . |
| 0339724 | 11/1989 | European Pat. Off. . |
| 0553980 | 8/1993 | European Pat. Off. . |
| 1317280 | 12/1989 | Japan . |
| 3217179 | 9/1991 | Japan . |

OTHER PUBLICATIONS

IEEE Transactions on Consumer Electronics, vol. 37, No. 3, Aug. 1991, pp. 252–259, Onishi et al., "An Experimental Home-Use Digital VCR With Three Dimensional DCT and Superimposed Error Correction Coding".

"General Report of the DAT Conference" Mar., 1988.

*Primary Examiner*—W. C. Kim

[57] ABSTRACT

The method and apparatus records/reproduces multiple kinds of digital signals having different data amounts per unit time on a recording medium. The multiple kinds of digital signals are organized into a plurality of blocks. At least two of the multiple kinds of digital signals are organized into blocks having different lengths. A synchronizing signal is appended to each of the plurality of blocks. The synchronizing signal identifies a length of each of the plurality of blocks. This method an apparatus increase the recording rate, and is therefore suitable for higher density recording. In reproduction, synchronization protection is performed for variable synchronization periods based on the length of the blocks being reproduced.

6 Claims, 86 Drawing Sheets

Fig. 2

Prior Art

| | | Q'=−1 | | | Q'=1 | | |
|---|---|---|---|---|---|---|---|
| | DATAWORD (MSB-LSB) | CODEWORD (MSB-LSB) | DC | Q | CODEWORD (MSB-LSB) | DC | Q |
| 00 | 00000000 | 0101010101 | 0 | 1 | 0101010101 | 0 | −1 |
| 01 | 00000001 | 0101010111 | 0 | −1 | 0101010111 | 0 | 1 |
| 02 | 00000010 | 0101011101 | 0 | −1 | 0101011101 | 0 | 1 |
| 03 | 00000011 | 0101011111 | 0 | 1 | 0101011111 | 0 | −1 |
| 04 | 00000100 | 0101001001 | 0 | −1 | 0101001001 | 0 | 1 |
| 05 | 00000101 | 0101001011 | 0 | 1 | 0101001011 | 0 | −1 |
| 06 | 00000110 | 0101001110 | 0 | 1 | 0101001110 | 0 | −1 |
| 07 | 00000111 | 0101011010 | 0 | 1 | 0101011010 | 0 | −1 |
| 08 | 00001000 | 0101110101 | 0 | −1 | 0101110101 | 0 | 1 |
| 09 | 00001001 | 0101110111 | 0 | 1 | 0101110111 | 0 | −1 |
| 0A | 00001010 | 0101111101 | 0 | 1 | 0101111101 | 0 | −1 |
| 0B | 00001011 | 0101111111 | 0 | −1 | 0101111111 | 0 | 1 |
| 0C | 00001100 | 0101101001 | 0 | 1 | 0101101001 | 0 | −1 |
| 0D | 00001101 | 0101101011 | 0 | −1 | 0101101011 | 0 | 1 |
| 0E | 00001110 | 0101101110 | 0 | −1 | 0101101110 | 0 | 1 |
| 0F | 00001111 | 0101111010 | 0 | −1 | 0101111010 | 0 | 1 |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |
| F0 | 11110000 | 1101010101 | 0 | −1 | 1101010101 | 0 | 1 |
| F1 | 11110001 | 1101010111 | 0 | 1 | 1101010111 | 0 | −1 |
| F2 | 11110010 | 1101011101 | 0 | 1 | 1101011101 | 0 | −1 |
| F3 | 11110011 | 1101011111 | 0 | −1 | 1101011111 | 0 | 1 |
| F4 | 11110100 | 1101001001 | 0 | 1 | 1101001001 | 0 | −1 |
| F5 | 11110101 | 1101001011 | 0 | −1 | 1101001011 | 0 | 1 |
| F6 | 11110110 | 1101001110 | 0 | −1 | 1101001110 | 0 | 1 |
| F7 | 11110111 | 1101011010 | 0 | −1 | 1101011010 | 0 | 1 |
| F8 | 11111000 | 1111100101 | 2 | −1 | 0111100101 | −2 | −1 |
| F9 | 11111001 | 1111100111 | 2 | 1 | 0111100111 | −2 | 1 |
| FA | 11111010 | 1111101101 | 2 | 1 | 0111101101 | −2 | 1 |
| FB | 11111011 | 1111101111 | 2 | −1 | 0111101111 | −2 | −1 |
| FC | 11111100 | 1111111001 | 2 | 1 | 0111111001 | −2 | 1 |
| FD | 11111101 | 1111111011 | 2 | −1 | 0111111011 | −2 | −1 |
| FE | 11111110 | 1111111110 | 2 | −1 | 0111111110 | −2 | −1 |
| FF | 11111111 | 1111101010 | 2 | −1 | 0111101010 | −2 | −1 |

Fig. 6

| CDS | −1 | +1 | −3 | +3 | −5 | +5 |
|---|---|---|---|---|---|---|
| NUMBER OF CODEWORDS | 2481 | 2169 | 1888 | 1231 | 909 | 410 |

Fig. 7

| CONDITION OF n1 | A CDS=0 | | | B CDS=+2 | | | C CDS=−2 | | D CDS=+4 | | E CDS=−4 | |
|---|---|---|---|---|---|---|---|---|---|---|---|---|
| | A1 | A2 | A3 | B1 | B2 | B3 | C1 | C2 | D1 | D2 | E1 | |
| NUMBER OF n1 CODEWORDS | 102 | 14 | 4 | 51 | 17 | 3 | 116 | 4 | 18 | 2 | 68 | |
| n2 CODEWORD MATCHING WITH n1 | 02 | | | 02 | 02 | | | | | | | |
| | 05 | 05 | | 05 | 05 | 05 | | | | | | |
| | 07 | 07 | | 07 | 07 | 07 | | | | | | |
| | 09 | 09 | 09 | | | | 09 | | | | | |
| | 0A | 0A | 0A | 0A | 0A | 0A | | | | | | |
| | 0B | 0B | 0B | | | | 0B | | | | | |
| | 0D | 0D | 0D | 0D | 0D | 0D | | | | | | |
| | 0E | 0E | 0E | | | | 0E | | | | | |
| | 0F | 0F | 0F | 0F | 0F | 0F | | | | | | |
| | 12 | 12 | 12 | | | | 12 | 12 | | | | |
| | 15 | 15 | 15 | | | | 15 | 15 | | | | |
| | 17 | 17 | 17 | | | | 17 | 17 | | | | |
| | 19 | 19 | 19 | 19 | 19 | 19 | | | | | | |
| | 1A | 1A | 1A | | | | 1A | 1A | | | | |
| | 1B | 1B | 1B | 1B | 1B | 1B | | | | | | |
| | 1D | 1D | 1D | | | | 1D | 1D | | | | |
| | 1E | 1E | 1E | 1E | 1E | 1E | | | | | | |
| | 1F | 1F | 1F | | | | 1F | 1F | | | | |
| | | | | 01 | | | | | 01 | | | |
| | | | | 03 | 03 | | | | 03 | 03 | | |
| | | | | 06 | 06 | 06 | | | 06 | 06 | | |
| | | | | | | | 11 | 11 | | | 11 | |
| | | | | | | | 13 | 13 | | | 13 | |
| | | | | | | | 16 | 16 | | | 16 | |

NOTE : SUBDIVISIONS OF A TO E GROUPS ARE EXECUTED FOR EACH n1 GROUP IN ACCORDANCE WITH "0" RUN-LENGTH AT LSB SIDE OF n1.

Fig. 8

| | m1 DATAWORD | n1 GROUP | n2 CODEWORD m2 | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|---|---|
| 1 | 00~73 | A GROUP (A1,A2) | | 07 | 09 | 0A | 0B | 0D | 0E | 0F | 12 | 15 | 17 | 19 | 1A | 1B | 1D | 1E | 1F |

Fig. 9

| | m1 DATAWORD | n1 GROUP | n2 CODEWORD m2 | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|---|---|
| 2 | 74~BA | 1st n1 GROUP C1 | | | 09 | | 0B | | 0E | | 12 | 15 | 17 | | 1A | | 1D | 1E | |
| | | 2nd n1 GROUP B1 | | 07 | | 0A | | 0D | | 0F | | | | 19 | | 1B | | | 1F |

Fig. 10

| | m1 DATAWORD | n1 GROUP | n2 CODEWORD m2: 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|---|
| 3 | BB~E7 | 1st n1 GROUP C1 | | 09 | | 0B | | 0E | | 12 | 15 | 17 | | 1A | | 1D | 1E | |
| | | 2nd n1 GROUP B1 | 01 | | 03 | | 05 | | 06 | | | | | | | | | |
| | | 3rd n1 GROUP E1 | | | | | | | | | | | 11 | | 13 | | | 16 |
| | E8~ED | 1st n1 GROUP C1 | | 11 | | 13 | | 16 | | 11 | 13 | 16 | | 11 | | 13 | 16 | |
| | | 2nd n1 GROUP B1 | 01 | | 03 | | 05 | | 06 | | | | | | | | | |
| | | 3rd n1 GROUP E1 | | | | | | | | | | | 11 | | 13 | | | 16 |
| | EE~FF | 1st n1 GROUP C1 | | 11 | | 13 | | 16 | | 11 | 13 | 16 | | 11 | | 13 | 16 | |
| | | 2nd n1 GROUP D1 | 01 | | 03 | | | | 06 | | | | | | | | | |
| | | 3rd n1 GROUP E1,C2 | | | | | | | | | | | 11 | | 13 | | | 16 |
| | | 4th n1 GROUP B2,B3 | | | | | 05 | | | | | | | | | | | |

Fig. 11

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00 | 8847 | 4849 | 084A | C84B | 884D | C84E | 084F | 4852 | C855 | 4857 | 8859 | C85A | 085D | 485D | 085E | C85F |
| 01 | 48A7 | 88A9 | C8AA | 08AB | 48AD | 08AE | C8AF | 88B2 | 08B5 | 88B7 | 48B9 | 08BA | C8BD | 88BD | C8BE | 08BF |
| 02 | 88E7 | 48E9 | 08EA | C8EB | 88ED | C8EE | 08EF | 48F2 | C8F5 | 48F7 | 88F9 | C8FA | 08FD | 48FD | 08FE | C8FF |
| 03 | 4947 | 8949 | C94A | 094B | 494D | 094E | C94F | 8952 | 0955 | 8957 | 4959 | 095A | C95D | 895D | C95E | 095F |
| 04 | 89A7 | 49A9 | 09AA | C9AB | 89AD | C9AE | 09AF | 49B2 | C9B5 | 49B7 | 89B9 | C9BA | 09BD | 49BD | 09BE | C9BF |
| 05 | 49E7 | 89E9 | C9EA | 09EB | 49ED | 09EE | C9EF | 89F2 | 09F5 | 89F7 | 49F9 | 09FA | C9FD | 89FD | C9FE | 09FF |
| 06 | 8B27 | 4B29 | 0B2A | CB2B | 8B2D | CB2E | 0B2F | 4B32 | CB35 | 4B37 | 8B39 | CB3A | 0B3D | 4B3D | 0B3E | CB3F |
| 07 | 4B67 | 8B69 | CB6A | 0B6B | 4B6D | 0B6E | CB6F | 8B72 | 0B75 | 8B77 | 4B79 | 0B7A | CB7D | 8B7D | CB7E | 0B7F |
| 08 | 4BC7 | 8BC9 | CBCA | 0BCB | 4BCD | 0BCE | CBCF | 8BD2 | 0BD5 | 8BD7 | 4BD9 | 0BDA | CBDD | 8BDD | CBDE | 0BDF |
| 09 | 8E27 | 4E29 | 0E2A | CE2B | 8E2D | CE2E | 0E2F | 4E32 | CE35 | 4E37 | 8E39 | CE3A | 0E3D | 4E3D | 0E3E | CE3F |
| 0A | 4E67 | 8E69 | CE6A | 0E6B | 4E6D | 0E6E | CE6F | 8E72 | 0E75 | 8E77 | 4E79 | 0E7A | CE7D | 8E7D | CE7E | 0E7F |
| 0B | 4EC7 | 8EC9 | CECA | 0ECB | 4ECD | 0ECE | CECF | 8ED2 | 0ED5 | 8ED7 | 4ED9 | 0EDA | CEDD | 8EDD | CEDE | 0EDF |
| 0C | 5127 | 9129 | D12A | 112B | 512D | 112E | D12F | 9132 | 1135 | 9137 | 5139 | 113A | D13D | 913D | D13E | 113F |
| 0D | 9167 | 5169 | 116A | D16B | 916D | D16E | 116F | 5172 | D175 | 5177 | 9179 | D17A | 117D | 517D | 117E | D17F |
| 0E | 91C7 | 51C9 | 11CA | D1CB | 91CD | D1CE | 11CF | 51D2 | D1D5 | 51D7 | 91D9 | D1DA | 11DD | 51DD | 11DE | D1DF |
| 0F | 5247 | 9249 | D24A | 124B | 524D | 124E | D24F | 9252 | 1255 | 9257 | 5259 | 125A | D25D | 925D | D25E | 125F |

Fig. 12

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 10 | 92A7 | 52A9 | 12AA | D2AB | 92AD | D2AE | 12AF | 52B2 | D2B5 | 52B7 | 92B9 | D2BA | 12BB | 52BD | 12BE | D2BF |
| 11 | 52E7 | 92E9 | D2EA | 12EB | 52ED | 12EE | D2EF | 92F2 | 12F5 | 92F7 | 52F9 | 12FA | D2FB | 92FD | D2FE | 12FF |
| 12 | 9347 | 5349 | 134A | D34B | 934D | D34E | 134F | 5352 | D355 | 5357 | 9359 | D35A | 135B | 535D | 135E | D35F |
| 13 | 53A7 | 93A9 | D3AA | 13AB | 53AD | 13AE | D3AF | 93B2 | 13B5 | 93B7 | 53B9 | 13BA | D3BB | 93BD | D3BE | 13BF |
| 14 | 93E7 | 53E9 | 13EA | D3EB | 93ED | D3EE | 13EF | 53F2 | D3F5 | 53F7 | 93F9 | D3FA | 13FB | 53FD | 13FE | D3FF |
| 15 | 9527 | 5529 | 152A | D52B | 952D | D52E | 152F | 5532 | D535 | 5537 | 9539 | D53A | 153B | 553D | 153E | D53F |
| 16 | 5567 | 9569 | D56A | 156B | 556D | 156E | D56F | 9572 | 1575 | 9577 | 5579 | 157A | D57B | 957D | D57E | 157F |
| 17 | 55C7 | 95C9 | D5CA | 15CB | 55CD | 15CE | D5CF | 95D2 | 15D5 | 95D7 | 55D9 | 15DA | D5DB | 95DD | D5DE | 15DF |
| 18 | 9647 | 5649 | 164A | D64B | 964D | D64E | 164F | 5652 | D655 | 5657 | 9659 | D65A | 165B | 565D | 165E | D65F |
| 19 | 56A7 | 96A9 | D6AA | 16AB | 56AD | 16AE | D6AF | 96B2 | 16B5 | 96B7 | 56B9 | 16BA | D6BB | 96BD | D6BE | 16BF |
| 1A | 96E7 | 56E9 | 16EA | D6EB | 96ED | D6EE | 16EF | 56F2 | D6F5 | 56F7 | 96F9 | D6FA | 16FB | 56FD | 16FE | D6FF |
| 1B | 5747 | 9749 | D74A | 174B | 574D | 174E | D74F | 9752 | 1755 | 9757 | 5759 | 175A | D75B | 975D | D75E | 175F |
| 1C | 97A7 | 57A9 | 17AA | D7AB | 97AD | D7AE | 17AF | 57B2 | D7B5 | 57B7 | 97B9 | D7BA | 17BB | 57BD | 17BE | D7BF |
| 1D | 57E7 | 97E9 | D7EA | 17EB | 57ED | 17EE | D7EF | 97F2 | 17F5 | 97F7 | 57F9 | 17FA | D7FB | 97FD | D7FE | 17FF |
| 1E | 9A27 | 5A29 | 1A2A | DA2B | 9A2D | DA2E | 1A2F | 5A32 | DA35 | 5A37 | 9A39 | DA3A | 1A3B | 5A3D | 1A3E | DA3F |
| 1F | 5A67 | 9A69 | DA6A | 1A6B | 5A6D | 1A6E | DA6F | 9A72 | 1A75 | 9A77 | 5A79 | 1A7A | DA7B | 9A7D | DA7E | 1A7F |

Fig. 13

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 20 | 5AC7 | 9AC9 | DACA | 1ACB | 5ACD | 1ACE | DACF | 9AD2 | 1AD5 | 9AD7 | 5AD9 | 1ADA | DADB | 9ADD | DADE | 1ADF |
| 21 | 9C47 | 5C49 | 1C4A | DC4B | 9C4D | DC4E | 1C4F | 5C52 | DC55 | 5C57 | 9C59 | DC5A | 1C5B | 5C5D | 1C5E | DC5F |
| 22 | 5CA7 | 9CA9 | DCAA | 1CAB | 5CAD | 1CAE | DCAF | 9CB2 | 1CB5 | 9CB7 | 5CB9 | 1CBA | DCBB | 9CBD | DCBE | 1CBF |
| 23 | 9CE7 | 5CE9 | 1CEA | DCEB | 9CED | DCEE | 1CEF | 5CF2 | DCF5 | 5CF7 | 9CF9 | DCFA | 1CFB | 5CFD | 1CFE | DCFF |
| 24 | 5D47 | 9D49 | DD4A | 1D4B | 5D4D | 1D4E | DD4F | 9D52 | 1D55 | 9D57 | 5D59 | 1D5A | DD5B | 9D5D | DD5E | 1D5F |
| 25 | 9DA7 | 5DA9 | 1DAA | DDAB | 9DAD | DDAE | 1DAF | 5DB2 | DDB5 | 5DB7 | 9DB9 | DDBA | 1DDB | 5DBD | 1DBE | DDBF |
| 26 | 5DE7 | 9DE9 | DDEA | 1DEB | 5DED | 1DEE | DDEF | 9DF2 | 1DF5 | 9DF7 | 5DF9 | 1DFA | DDFB | 9DFD | DDFE | 1DFF |
| 27 | 9F27 | 5F29 | 1F2A | DF2B | 9F2D | DF2E | 1F2F | 5F32 | DF35 | 5F37 | 9F39 | DF3A | 1F3B | 5F3D | 1F3E | DF3F |
| 28 | 5F67 | 9F69 | DF6A | 1F6B | 5F6D | 1F6E | DF6F | 9F72 | 1F75 | 9F77 | 5F79 | 1F7A | DF7B | 9F7D | DF7E | 1F7F |
| 29 | 5FC7 | 9FC9 | DFCA | 1FCB | 5FCD | 1FCE | DFCF | 9FD2 | 1FD5 | 9FD7 | 5FD9 | 1FDA | DFDB | 9FDD | DFDE | 1FDF |
| 2A | 6227 | A229 | E22A | 222B | 622D | 222E | E22F | A232 | 2235 | A237 | 6239 | 223A | E23B | A23D | E23E | 223F |
| 2B | A267 | 6269 | 226A | E26B | A26D | E26E | 226F | 6272 | E275 | 6277 | A279 | E27A | 227B | 627D | 227E | E27F |
| 2C | A2C7 | 62C9 | 22CA | E2CB | A2CD | E2CE | 22CF | 62D2 | E2D5 | 62D7 | A2D9 | E2DA | 22DB | 62DD | 22DE | E2DF |
| 2D | 6447 | A449 | E44A | 244B | 644D | 244E | E44F | A452 | 2455 | A457 | 6459 | 245A | E45B | A45D | E45E | 245F |
| 2E | A4A7 | 64A9 | 24AA | E4AB | A4AD | E4AE | 24AF | 64B2 | E4B5 | 64B7 | A4B9 | E4BA | 24DB | 64BD | 24BE | E4BF |
| 2F | 64E7 | A4E9 | E4EA | 24EB | 64ED | 24EE | E4EF | A4F2 | 24F5 | A4F7 | 64F9 | 24FA | E4FB | A4FD | E4FE | 24FF |

Fig. 14

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 30 | A547 | 6549 | 254A | E54B | A54D | E54E | 254F | 6552 | E555 | 6557 | A559 | E55A | 255B | 655D | 255E | E55F |
| 31 | 65A7 | A5A9 | E5AA | 25AB | 65AD | 25AE | E5AF | A5B2 | 25B5 | A5B7 | 65B9 | 25BA | E5BB | A5BD | E5BE | 25BF |
| 32 | A5E7 | 65E9 | 25EA | E5EB | A5ED | E5EE | 25EF | 65F2 | E5F5 | 65F7 | A5F9 | E5FA | 25FB | 65FD | 25FE | E5FF |
| 33 | 6727 | A729 | E72A | 272B | 672D | 272E | E72F | A732 | 2735 | A737 | 6739 | 273A | E73B | A73D | E73E | 273F |
| 34 | A767 | 6769 | 276A | E76B | A76D | E76E | 276F | 6772 | E775 | 6777 | A779 | E77A | 277B | 677D | 277E | E77F |
| 35 | A7C7 | 67C9 | 27CA | E7CB | A7CD | E7CE | 27CF | 67D2 | E7D5 | 67D7 | A7D9 | E7DA | 27DB | 67DD | 27DE | E7DF |
| 36 | A927 | 6929 | 292A | E92B | A92D | E92E | 292F | 6932 | E935 | 6937 | A939 | E93A | 293B | 693D | 293E | E93F |
| 37 | 6967 | A969 | E96A | 296B | 696D | 296E | E96F | A972 | 2975 | A977 | 6979 | 297A | E97B | A97D | E97E | 297F |
| 38 | 69C7 | A9C9 | E9CA | 29CB | 69CD | 29CE | E9CF | A9D2 | 29D5 | A9D7 | 69D9 | 29DA | E9DB | A9DD | E9DE | 29DF |
| 39 | AA47 | 6A49 | 2A4A | EA4B | AA4D | EA4E | 2A4F | 6A52 | EA55 | 6A57 | AA59 | EA5A | 2A5B | 6A5D | 2A5E | EA5F |
| 3A | 6AA7 | AAA9 | EAAA | 2AAB | 6AAD | 2AAE | EAAF | AAB2 | 2AB5 | AAB7 | 6AB9 | 2ABA | EABB | AABD | EABE | 2ABF |
| 3B | AAE7 | 6AE9 | 2AEA | EAEB | AAED | EAEE | 2AEF | 6AF2 | EAF5 | 6AF7 | AAF9 | EAFA | 2AFB | 6AFD | 2AFE | EAFF |
| 3C | 6B47 | AB49 | EB4A | 2B4B | 6B4D | 2B4E | EB4F | AB52 | 2B55 | AB57 | 6B59 | 2B5A | EB5B | AB5D | EB5E | 2B5F |
| 3D | ABA7 | 6BA9 | 2BAA | EBAB | ABAD | EBAE | 2BAF | 6BB2 | EBB5 | 6BB7 | ABB9 | EBBA | 2BBB | 6BBD | 2BBE | EBBF |
| 3E | 6BE7 | ABE9 | EBEA | 2BEB | 6BED | 2BEE | EBEF | ABF2 | 2BF5 | ABF7 | 6BF9 | 2BFA | EBFB | ABFD | EBFE | 2BFF |
| 3F | 6D27 | AD29 | ED2A | 2D2B | 6D2D | 2D2E | ED2F | AD32 | 2D35 | AD37 | 6D39 | 2D3A | ED3B | AD3D | ED3E | 2D3F |

Fig. 15

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 40 | AD67 | 6D69 | 2D6A | ED6B | AD6D | ED6E | 2D6F | 6D72 | ED75 | 6D77 | AD79 | ED7A | 2D7B | 6D7D | 2D7E | ED7F |
| 41 | ADC7 | 6DC9 | 2DCA | EDCB | ADCD | EDCE | 2DCF | 6DD2 | EDD5 | 6DD7 | ADD9 | EDDA | 2DDB | 6DDD | 2DDE | EDDF |
| 42 | 6E47 | AE49 | EE4A | 2E4B | 6E4D | 2E4E | EE4F | AE52 | 2E55 | AE57 | 6E59 | 2E5A | EE5B | AE5D | EE5E | 2E5F |
| 43 | AEA7 | 6EA9 | 2EAA | EEAB | AEAD | EEAE | 2EAF | 6EB2 | EEB5 | 6EB7 | AEB9 | EEBA | 2EBB | 6EBD | 2EBE | EEBF |
| 44 | 6EE7 | AEE9 | EEEA | 2EEB | 6EED | 2EEE | EEEF | AEF2 | 2EF5 | AEF7 | 6EF9 | 2EFA | EEFB | AEFD | EEFE | 2EFF |
| 45 | AF47 | 6F49 | 2F4A | EF4B | AF4D | EF4E | 2F4F | 6F52 | EF55 | 6F57 | AF59 | EF5A | 2F5B | 6F5D | 2F5E | EF5F |
| 46 | 6FA7 | AFA9 | EFAA | 2FAB | 6FAD | 2FAE | EFAF | AFB2 | 2FB5 | AFB7 | 6FB9 | 2FBA | EFBB | AFBD | EFBE | 2FBF |
| 47 | AFE7 | 6FE9 | 2FEA | EFEB | AFED | EFEE | 2FEF | 6FF2 | EFF5 | 6FF7 | AFF9 | EFFA | 2FFB | 6FFD | 2FFE | EFFF |
| 48 | B227 | 7229 | 322A | F22B | B22D | F22E | 322F | 7232 | F235 | 7237 | B239 | F23A | 323B | 723D | 323E | F23F |
| 49 | 7267 | B269 | F26A | 326B | 726D | 326E | F26F | B272 | 3275 | B277 | 7279 | 327A | F27B | B27D | F27E | 327F |
| 4A | 72C7 | B2C9 | F2CA | 32CB | 72CD | 32CE | F2CF | B2D2 | 32D5 | B2D7 | 72D9 | 32DA | F2DB | B2DD | F2DE | 32DF |
| 4B | B447 | 7449 | 344A | F44B | B44D | F44E | 344F | 7452 | F455 | 7457 | B459 | F45A | 345B | 745D | 345E | F45F |
| 4C | 74A7 | B4A9 | F4AA | 34AB | 74AD | 34AE | F4AF | B4B2 | 34B5 | B4B7 | 74B9 | 34BA | F4BB | B4BD | F4BE | 34BF |
| 4D | B4E7 | 74E9 | 34EA | F4EB | B4ED | F4EE | 34EF | 74F2 | F4F5 | 74F7 | B4F9 | F4FA | 34FB | 74FD | 34FE | F4FF |
| 4E | 7547 | B549 | F54A | 354B | 754D | 354E | F54F | B552 | 3555 | B557 | 7559 | 355A | F55B | B55D | F55E | 355F |
| 4F | B5A7 | 75A9 | 35AA | F5AB | B5AD | F5AE | 35AF | 75B2 | F5B5 | 75B7 | B5B9 | F5BA | 35BB | 75BD | 35BE | F5BF |

Fig. 16

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 50 | 75E7 | B5E9 | F5EA | 35EB | 75ED | 35EE | F5EF | B5F2 | 35F5 | B5F7 | 75F9 | 35FA | F5FB | B5FD | F5FE | 35FF |
| 51 | B727 | 7729 | 372A | F72B | B72D | F72E | 372F | 7732 | F735 | 7737 | B739 | F73A | 373B | 773D | 373E | F73F |
| 52 | 7767 | B769 | F76A | 376B | 776D | 376E | F76F | B772 | 3775 | B777 | 7779 | 377A | F77B | B77D | F77E | 377F |
| 53 | 77C7 | B7C9 | F7CA | 37CB | 77CD | 37CE | F7CF | B7D2 | 37D5 | B7D7 | 77D9 | 37DA | F7DB | B7DD | F7DE | 37DF |
| 54 | 7927 | B929 | F92A | 392B | 792D | 392E | F92F | B932 | 3935 | B937 | 7939 | 393A | F93B | B93D | F93E | 393F |
| 55 | B967 | 7969 | 396A | F96B | B96D | F96E | 396F | 7972 | F975 | 7977 | B979 | F97A | 397B | 797D | 397E | F97F |
| 56 | B9C7 | 79C9 | 39CA | F9CB | B9CD | F9CE | 39CF | 79D2 | F9D5 | 79D7 | B9D9 | F9DA | 39DB | 79DD | 39DE | F9DF |
| 57 | 7A47 | BA49 | FA4A | 3A4B | 7A4D | 3A4E | FA4F | BA52 | 3A55 | BA57 | 7A59 | 3A5A | FA5B | BA5D | FA5E | 3A5F |
| 58 | BAA7 | 7AA9 | 3AAA | FAAB | BAAD | FAAE | 3AAF | 7AB2 | FAB5 | 7AB7 | BAB9 | FABA | 3ABB | 7ABD | 3ABE | FABF |
| 59 | 7AE7 | BAE9 | FAEA | 3AEB | 7AED | 3AEE | FAEF | BAF2 | 3AF5 | BAF7 | 7AF9 | 3AFA | FAFB | BAFD | FAFE | 3AFF |
| 5A | BB47 | 7B49 | 3B4A | FB4B | BB4D | FB4E | 3B4F | 7B52 | FB55 | 7B57 | BB59 | FB5A | 3B5B | 7B5D | 3B5E | FB5F |
| 5B | 7BA7 | BBA9 | FBAA | 3BAB | 7BAD | 3BAE | FBAF | BBB2 | 3BB5 | BBB7 | 7BB9 | 3BBA | FBBB | BBBD | FBBE | 3BBF |
| 5C | BBE7 | 7BE9 | 3BEA | FBEB | BBED | FBEE | 3BEF | 7BF2 | FBF5 | 7BF7 | BBF9 | FBFA | 3BFB | 7BFD | 3BFE | FBFF |
| 5D | BD27 | 7D29 | 3D2A | FD2B | BD2D | FD2E | 3D2F | 7D32 | FD35 | 7D37 | BD39 | FD3A | 3D3B | 7D3D | 3D3E | FD3F |
| 5E | 7D67 | BD69 | FD6A | 3D6B | 7D6D | 3D6E | FD6F | BD72 | 3D75 | BD77 | 7D79 | 3D7A | FD7B | BD7D | FD7E | 3D7F |
| 5F | 7DC7 | BDC9 | FDCA | 3DCB | 7DCD | 3DCE | FDCF | BDD2 | 3DD5 | BDD7 | 7DD9 | 3DDA | FDDB | BDDD | FDDE | 3DDF |

Fig. 17

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 60 | BE47 | 7E49 | 3E4A | FE4B | BE4D | FE4E | 3E4F | 7E52 | FE55 | 7E57 | BE59 | FE5A | 3E5B | 7E5D | 3E5E | FE5F |
| 61 | 7EA7 | BEA9 | FEAA | 3EAB | 7EAD | 3EAE | FEAF | BEB2 | 3EB5 | BEB7 | 7EB9 | 3EBA | FEBB | BEBD | FEBE | 3EBF |
| 62 | BEE7 | 7EE9 | 3EEA | FEEB | BEED | FEEE | 3EEF | 7EF2 | FEF5 | 7EF7 | BEF9 | FEFA | 3EFB | 7EFD | 3EFE | FEFF |
| 63 | 7F47 | BF49 | FF4A | 3F4B | 7F4D | 3F4E | FF4F | BF52 | 3F55 | BF57 | 7F59 | 3F5A | FF5B | BF5D | FF5E | 3F5F |
| 64 | BFA7 | 7FA9 | 3FAA | FFAB | BFAD | FFAE | 3FAF | 7FB2 | FFB5 | 7FB7 | BFB9 | FFBA | 3FBB | 7FBD | 3FBE | FFBF |
| 65 | 7FE7 | BFE9 | FFEA | 3FEB | 7FED | 3FEE | FFEF | BFF2 | 3FF5 | BFF7 | 7FF9 | 3FFA | FFFB | BFFD | FFFE | 3FFF |
| 66 | 4A87 | 8A89 | CA8A | 0A8B | 4A8D | 0A8E | CA8F | 8A92 | 0A95 | 8A97 | 4A99 | 0A9A | CA9B | 8A9D | CA9E | 0A9F |
| 67 | 4F87 | 8F89 | CF8A | 0F8B | 4F8D | 0F8E | CF8F | 8F92 | 0F95 | 8F97 | 4F99 | 0F9A | CF9B | 8F9D | CF9E | 0F9F |
| 68 | 9087 | 5089 | 108A | D08B | 908D | D08E | 108F | 5092 | D095 | 5097 | 9099 | D09A | 109B | 509D | 109E | D09F |
| 69 | 5487 | 9489 | D48A | 148B | 548D | 148E | D48F | 9492 | 1495 | 9497 | 5499 | 149A | D49B | 949D | D49E | 149F |
| 6A | 5B87 | 9B89 | DB8A | 1B8B | 5B8D | 1B8E | DB8F | 9B92 | 1B95 | 9B97 | 5B99 | 1B9A | DB9B | 9B9D | DB9E | 1B9F |
| 6B | 5E87 | 9E89 | DE8A | 1E8B | 5E8D | 1E8E | DE8F | 9E92 | 1E95 | 9E97 | 5E99 | 1E9A | DE9B | 9E9D | DE9E | 1E9F |
| 6C | A387 | 6389 | 238A | E38B | A38D | E38E | 238F | 6392 | E395 | 6397 | A399 | E39A | 239B | 639D | 239E | E39F |
| 6D | A687 | 6689 | 268A | E68B | A68D | E68E | 268F | 6692 | E695 | 6697 | A699 | E69A | 269B | 669D | 269E | E69F |
| 6E | 6887 | A889 | E88A | 288B | 688D | 288E | E88F | A892 | 2895 | A897 | 6899 | 289A | E89B | A89D | E89E | 289F |
| 6F | AC87 | 6C89 | 2C8A | EC8B | AC8D | EC8E | 2C8F | 6C92 | EC95 | 6C97 | AC99 | EC9A | 2C9B | 6C9D | 2C9E | EC9F |

Fig. 18

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 70 | 7387 | B389 | F38A | 338B | 738D | 338E | F38F | B392 | 3395 | B397 | 7399 | 339A | F39B | B39D | F39E | 339F |
| 71 | 7687 | B689 | F68A | 368B | 768D | 368E | F68F | B692 | 3695 | B697 | 7699 | 369A | F69B | B69D | F69E | 369F |
| 72 | B887 | 7889 | 388A | F88B | B88D | F88E | 388F | 7892 | F895 | 7897 | B899 | F89A | 389B | 789D | 389E | F89F |
| 73 | 7C87 | BC89 | FC8A | 3C8B | 7C8D | 3C8E | FC8F | BC92 | 3C95 | BC97 | 7C99 | 3C9A | FC9B | BC9D | FC9E | 3C9F |
| 74 | 0927 | C869 | 892A | 486B | 092D | 486E | 892F | C872 | 4875 | C877 | 0939 | 487A | 893B | C87D | 893E | 487F |
| 75 | 0AE7 | 0889 | 8AEA | 888B | 0AED | 888E | 8AEF | 0892 | 8895 | 0897 | 0AF9 | 889A | 8AFB | 089D | 8AFE | 889F |
| 76 | 0BA7 | C8C9 | 8BAA | 48CB | 0BAD | 48CE | 8BAF | C8D2 | 48D5 | C8D7 | 0BB9 | 48DA | 8BBB | C8DD | 8BBE | 48DF |
| 77 | 0D67 | 0969 | 8D6A | 896B | 0D6D | 896E | 8D6F | 0972 | 8975 | 0977 | 0D79 | 897A | 8D7B | 097D | 8D7E | 897F |
| 78 | 0EA7 | C989 | 8EAA | 498B | 0EAD | 498E | 8EAF | C992 | 4995 | C997 | 0EB9 | 499A | 8EDB | C99D | 8EBE | 499F |
| 79 | 0FE7 | 09C9 | 8FEA | 89CB | 0FED | 89CE | 8FEF | 09D2 | 89D5 | 09D7 | 0FF9 | 89DA | 8FFB | 09DD | 8FFE | 89DF |
| 7A | D0E7 | 0AA9 | 50EA | 8AAB | D0ED | 8AAE | 50EF | 0AB2 | 8AB5 | 0AB7 | D0F9 | 8ABA | 50FB | 0ABD | 50FE | 8ABF |
| 7B | D1A7 | CB09 | 51AA | 4B0B | D1AD | 4B0E | 51AF | CB12 | 4B15 | CB17 | D1B9 | 4B1A | 51BB | CB1D | 51BE | 4B1F |
| 7C | 1227 | 0B49 | 922A | 8B4B | 122D | 8B4E | 922F | 0B52 | 8B55 | 0B57 | 1239 | 8B5A | 923B | 0B5D | 923E | 8B5F |
| 7D | D327 | 0BE9 | 532A | 8BEB | D32D | 8BEE | 532F | 0BF2 | 8BF5 | 0BF7 | D339 | 8BFA | 533B | 0BFD | 533E | 8BFF |
| 7E | 14E7 | 0D29 | 94EA | 8D2B | 14ED | 8D2E | 94EF | 0D32 | 8D35 | 0D37 | 14F9 | 8D3A | 94FB | 0D3D | 94FE | 9D3F |
| 7F | 15A7 | 0E49 | 95AA | 8E4B | 15AD | 8E4E | 95AF | 0E52 | 8E55 | 0E57 | 15B9 | 8E5A | 95BB | 0E5D | 95BE | 8E5F |

Fig. 19

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 80 | D627 | 0EE9 | 562A | 8EEB | D62D | 82EE | 562F | 0EF2 | 8EF5 | 0EF7 | D639 | 8EFA | 563B | 0EFD | 563E | 82FF |
| 81 | 1727 | 0FA9 | 972A | 8FAB | 172D | 8FAE | 972F | 0FB2 | 8FB5 | 0FB7 | 1739 | 8FBA | 973B | 0FBD | 973E | 8FBF |
| 82 | 1967 | D0A9 | 996A | 50AB | 196D | 50AE | 996F | D0B2 | 50B5 | D0B7 | 1979 | 50BA | 997B | D0BD | 997E | 50BF |
| 83 | 1AA7 | 1109 | 9AAA | 910B | 1AAD | 910E | 9AAF | 1112 | 9115 | 1117 | 1AB9 | 911A | 9ABB | 111D | 9ABE | 911F |
| 84 | 1BE7 | D149 | 9BEA | 514B | 1BED | 514E | 9BEF | D152 | 5155 | D157 | 1BF9 | 515A | 9BFB | D15D | 9BFE | 515F |
| 85 | DC27 | D1E9 | 5C2A | 51EB | DC2D | 51EE | 5C2F | D1F2 | 51F5 | D1F7 | DC39 | 51FA | 5C3B | D1FD | 5C3E | 51FF |
| 86 | 1D27 | 1269 | 9D2A | 926B | 1D2D | 926E | 9D2F | 1272 | 9275 | 1277 | 1D39 | 927A | 9D3B | 127D | 9D3E | 927F |
| 87 | 1EE7 | D289 | 9EEA | 528B | 1EED | 528E | 9EEF | D292 | 5295 | D297 | 1EF9 | 529A | 9EFB | D29D | 9EFE | 529F |
| 88 | 1FA7 | 12C9 | 9FAA | 92CB | 1FAD | 92CE | 9FAF | 12D2 | 92D5 | 12D7 | 1FB9 | 92DA | 9FBB | 12DD | 9FBE | 92DF |
| 89 | E167 | D369 | 616A | 536B | E16D | 536E | 616F | D372 | 5375 | D377 | E179 | 537A | 617B | D37D | 617E | 537F |
| 8A | E2A7 | 1389 | 62AA | 938B | E2AD | 938E | 62AF | 1392 | 9395 | 1397 | E2B9 | 939A | 62BB | 139D | 62BE | 939F |
| 8B | E3E7 | D3C9 | 63EA | 53CB | E3ED | 53CE | 63EF | D3D2 | 53D5 | D3D7 | E3F9 | 53DA | 63FB | D3DD | 63FE | 53DF |
| 8C | 2427 | 14A9 | A42A | 94AB | 242D | 94AE | A42F | 14B2 | 94B5 | 14B7 | 2439 | 94BA | A43B | 14BD | A43E | 94BF |
| 8D | E527 | D509 | 652A | 550B | E52D | 550E | 652F | D512 | 5515 | D517 | E539 | 551A | 653B | D51D | 653E | 551F |
| 8E | E6E7 | 1549 | 66EA | 954B | E6ED | 954E | 66EF | 1552 | 9555 | 1557 | E6F9 | 955A | 66FB | 155D | 66FE | 955F |
| 8F | E7A7 | 15E9 | 67AA | 95EB | E7AD | 95EE | 67AF | 15F2 | 95F5 | 15F7 | E7B9 | 95FA | 67BB | 15FD | 67BE | 95FF |

Fig. 20

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 90 | 28E7 | D669 | A8EA | 566B | 28ED | 566E | A8EF | D672 | 5675 | D677 | 28F9 | 567A | A8FB | D67D | A8FE | 567F |
| 91 | 29A7 | 1689 | A9AA | 968B | 29AD | 968E | A9AF | 1692 | 9695 | 1697 | 29B9 | 969A | A9BB | 169D | A9BE | 969F |
| 92 | EA27 | D6C9 | 6A2A | 56CB | EA2D | 56CE | 6A2F | D6D2 | 56D5 | D6D7 | EA39 | 56DA | 6A3B | D6DD | 6A3E | 56DF |
| 93 | 2B27 | 1769 | AB2A | 976B | 2B2D | 976E | AB2F | 1772 | 9775 | 1777 | 2B39 | 977A | AB3B | 177D | AB3E | 977F |
| 94 | ECE7 | D789 | 6CEA | 578B | ECED | 578E | 6CEF | D792 | 5795 | D797 | ECF9 | 579A | 6CFB | D79D | 6CFE | 579F |
| 95 | EDA7 | 17C9 | 6DAA | 97CB | EDAD | 97CE | 6DAF | 17D2 | 97D5 | 17D7 | EDB9 | 97DA | 6DBB | 17DD | 6DBE | 97DF |
| 96 | 2E27 | 1929 | AE2A | 992B | 2E2D | 992E | AE2F | 1932 | 9935 | 1937 | 2E39 | 993A | AE3B | 193D | AE3E | 993F |
| 97 | EF27 | 1A49 | 6F2A | 9A4B | EF2D | 9A4E | 6F2F | 1A52 | 9A55 | 1A57 | EF39 | 9A5A | 6F3B | 1A5D | 6F3E | 9A5F |
| 98 | 3167 | 1AE9 | B16A | 9AEB | 316D | 9AEE | B16F | 1AF2 | 9AF5 | 1AF7 | 3179 | 9AFA | B17B | 1AFD | B17E | 9AFF |
| 99 | 32A7 | 1BA9 | B2AA | 9BAB | 32AD | 9BAE | B2AF | 1BB2 | 9BB5 | 1BB7 | 32B9 | 9BBA | B2BB | 1BBD | B2BE | 9BBF |
| 9A | 33E7 | DC69 | B3EA | 5C6B | 33ED | 5C6E | B3EF | DC72 | 5C75 | DC77 | 33F9 | 5C7A | B3FB | DC7D | B3FE | 5C7F |
| 9B | F427 | 1C89 | 742A | 9C8B | F42D | 9C8E | 742F | 1C92 | 9C95 | 1C97 | F439 | 9C9A | 743B | 1C9D | 743E | 9C9F |
| 9C | 3527 | DCC9 | B52A | 5CCB | 352D | 5CCE | B52F | DCD2 | 5CD5 | DCD7 | 3539 | 5CDA | B53B | DCDD | B53E | 5CDF |
| 9D | 36E7 | 1D69 | B6EA | 9D6B | 36ED | 9D6E | B6EF | 1D72 | 9D75 | 1D77 | 36F9 | 9D7A | B6FB | 1D7D | B6FE | 9D7F |
| 9E | 37A7 | DD89 | B7AA | 5D8B | 37AD | 5D8E | B7AF | DD92 | 5D95 | DD97 | 37B9 | 5D9A | B7BB | DD9D | B7BE | 5D9F |
| 9F | F8E7 | 1DC9 | 78EA | 9DCB | F8ED | 9DCE | 78EF | 1DD2 | 9DD5 | 1DD7 | F8F9 | 9DDA | 78FB | 1DDD | 78FE | 9DDF |

Fig. 21

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A0 | F9A7 | 1EA9 | 79AA | 9EAB | F9AD | 9EAE | 79AF | 1EB2 | 9EB5 | 1EB7 | F9B9 | 9EBA | 79BB | 1EBD | 79BE | 9EBF |
| A1 | 3A27 | DF09 | BA2A | 5F0B | 3A2D | 5F0E | BA2F | DF12 | 5F15 | DF17 | 3A39 | 5F1A | BA3B | DF1D | BA3E | 5F1F |
| A2 | FB27 | 1F49 | 7B2A | 9F4B | FB2D | 9F4E | 7B2F | 1F52 | 9F55 | 1F57 | FB39 | 9F5A | 7B3B | 1F5D | 7B3E | 9F5F |
| A3 | 3CE7 | 1FE9 | BC2A | 9FEB | 3CED | 9FEE | BC2F | 1FF2 | 9FF5 | 1FF7 | 3CF9 | 9FFA | BCFB | 1FFD | BCFE | 9FFF |
| A4 | 3DA7 | E129 | BDAA | 612B | 3DAD | 612E | BDAF | E132 | 6135 | E137 | 3DB9 | 613A | BDBB | E13D | BDBE | 613F |
| A5 | FE27 | E249 | 7E2A | 624B | FE2D | 624E | 7E2F | E252 | 6255 | E257 | FE39 | 625A | 7E3B | E25D | 7E3E | 625F |
| A6 | 3F27 | E2E9 | BF2A | 62EB | 3F2D | 62EE | BF2F | E2F2 | 62F5 | E2F7 | 3F39 | 62FA | BF3B | E2FD | BF3E | 62FF |
| A7 | 0A47 | E3A9 | 1A4A | 63AB | 0A4D | 63AE | 8A4F | E3B2 | 63B5 | E3B7 | 0A59 | 63BA | 8A5B | E3BD | 8A5E | 63BF |
| A8 | 0DC7 | 2469 | 8DCA | A46B | 0DCD | A46E | 8DCF | 2472 | A475 | 2477 | 0DD9 | A47A | 8DDB | 247D | 8DDE | A47F |
| A9 | 0F47 | E489 | 8F4A | 648B | 0F4D | 648E | 8F4F | E492 | 6495 | E497 | 0F59 | 649A | 8F5B | E49D | 8F5E | 649F |
| AA | 1447 | 24C9 | 944A | A4CB | 144D | A4CE | 944F | 24D2 | A4D5 | 24D7 | 1459 | A4DA | 945B | 24DD | 945E | A4DF |
| AB | 19C7 | E569 | 99CA | 656B | 19CD | 656E | 99CF | E572 | 6575 | E577 | 19D9 | 657A | 99DB | E57D | 99DE | 657F |
| AC | 1B47 | 2589 | 9B4A | A58B | 1B4D | A58E | 9B4F | 2592 | A595 | 2597 | 1B59 | A59A | 9B5B | 259D | 9B5E | A59F |
| AD | 1E47 | E5C9 | 9E4A | 65CB | 1E4D | 65CE | 9E4F | E5D2 | 65D5 | E5D7 | 1E59 | 65DA | 9E5B | E5DD | 9E5E | 65DF |
| AE | E1C7 | E6A9 | 61CA | 66AB | E1CD | 66AE | 61CF | E6B2 | 66B5 | E6B7 | E1D9 | 66BA | 61DB | E6BD | 61DE | 66BF |
| AF | E347 | 2709 | 634A | A70B | E34D | A70E | 634F | 2712 | A715 | 2717 | E359 | A71A | 635B | 271D | 635E | A71F |

Fig. 22

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| B0 | E647 | E749 | 664A | 674B | E64D | 674E | 664F | E752 | 6755 | E757 | E659 | 675A | 665B | E75D | 665E | 675F |
| B1 | 2847 | E7E9 | A84A | 67EB | 284D | 67EE | A84F | E7F2 | 67F5 | E7F7 | 2859 | 67FA | A85B | E7FD | A85E | 67FF |
| B2 | EC47 | 28A9 | 6C4A | A8AB | EC4D | A8AE | 6C4F | 28B2 | A8B5 | 21B7 | EC59 | A8BA | 6C5B | 28BD | 6C5E | A8BF |
| B3 | 31C7 | E909 | B1CA | 690B | 31CD | 690E | B1CF | E912 | 6915 | E917 | 31D9 | 691A | B1DB | E91D | B1CE | 691F |
| B4 | 3347 | 2949 | B34A | A94B | 334D | A94E | B34F | 2952 | A955 | 2957 | 3359 | A95A | B35B | 295D | B35E | A95F |
| B5 | 3647 | 29E9 | B64A | A9EB | 364D | A9EE | B64F | 29F2 | A9F5 | 29F7 | 3659 | A9FA | B65B | 29FD | B65E | A9FF |
| B6 | F847 | EA69 | 784A | 6A6B | F84D | 6A6E | 784F | EA72 | 6A75 | EA77 | F859 | 6A7A | 785B | EA7D | 785E | 6A7F |
| B7 | 3C47 | 2A89 | BC4A | AA8B | 3C4D | AA8E | BC4F | 2A92 | AA95 | 2A97 | 3C59 | AA9A | BC5B | 2A9D | BC5E | AA9F |
| B8 | 0C87 | EAC9 | 8C8A | 6ACB | 0C8D | 6ACE | 8C8F | EAD2 | 6AD5 | EAD7 | 0C99 | 6ADA | 8C9B | EADD | 8C9E | 6ADF |
| B9 | 1887 | 2B69 | 988A | AB6B | 188D | AB6E | 988F | 2B72 | AB75 | 2B77 | 1899 | AB7A | 989B | 2B7D | 989E | AB7F |
| BA | 3087 | EB89 | B08A | 6B8B | 308D | 6B8E | B08F | EB92 | 6B95 | EB97 | 3099 | 6B9A | B09B | EB9D | B09E | 6B9F |
| BB | 4921 | 2BC9 | C923 | ABCB | 8925 | ABCE | C926 | 2BD2 | ABD5 | 2BD7 | 0911 | ABDA | 8913 | 2BDD | 8916 | ABDF |
| BC | 4AE1 | ECA9 | CAE3 | 6CAB | 8AE5 | 6CAE | CAE6 | ECB2 | 6CB5 | ECB7 | 0A71 | 6CBA | 8A73 | ECBD | 8A76 | 6CBF |
| BD | 4BA1 | 2D09 | CBA3 | AD0B | 8BA5 | AD0E | CBA6 | 2D12 | AD15 | 2D17 | 0AD1 | AD1A | 8AD3 | 2D1D | 8AD6 | AD1F |
| BE | 4D61 | ED49 | CD63 | 6D4B | 8D65 | 6D4E | CD66 | ED52 | 6D55 | ED57 | 0B91 | 6D5A | 8B93 | ED5D | 8B96 | 6D5F |
| BF | 4EA1 | EDE9 | CEA3 | 6DEB | 8EA5 | 6DEE | CEA6 | EDF2 | 6DF5 | EDF7 | 0CB1 | 6DFA | 8CB3 | EDFD | 8CB6 | 6DFF |

Fig. 23

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| C0 | 4FE1 | 2E69 | CFE3 | AE6B | 8FE5 | AE6E | CFE6 | 2E72 | AE75 | 2E77 | 0D51 | AE7A | 8D73 | 2E7D | 8D76 | AE7F |
| C1 | 90E1 | EE89 | 10E3 | 6E8B | 50E5 | 6E8E | 10E6 | EE92 | 6E95 | EE97 | 0DF1 | 6E9A | 8D93 | EE9D | 8D96 | 6E9F |
| C2 | 91A1 | 2EC9 | 11A3 | AECB | 51A5 | AECE | 11A6 | 2ED2 | AED5 | 2ED7 | 0E91 | AEDA | 8ED3 | 2EDD | 8ED6 | AEDF |
| C3 | 5221 | EF69 | D223 | 6F6B | 9225 | 6F6E | D226 | EF72 | 6F75 | EF77 | 0F71 | 6F7A | 8F73 | EF7D | 8F76 | 6F7F |
| C4 | 9321 | 2F89 | 1323 | AF8B | 5325 | AF8E | 1326 | 2F92 | AF95 | 2F97 | 0FD1 | AF9A | 8F93 | 2F9D | 8F96 | AF9F |
| C5 | 54E1 | EFC9 | D4E3 | 6FCB | 94E5 | 6FCE | D4E6 | EFD2 | 6FD5 | EFD7 | D0D1 | 6FDA | 50D3 | EFDD | 50D6 | 6FDF |
| C6 | 55A1 | 3129 | D5A3 | B12B | 95A5 | B12E | D5A6 | 3132 | B135 | 3137 | D191 | B13A | 5133 | 313D | 5136 | B13F |
| C7 | 9621 | 3249 | 1623 | B24B | 5625 | B24E | 1626 | 3252 | B255 | 3257 | 1211 | B25A | 9253 | 325D | 9256 | B25F |
| C8 | 5721 | 32E9 | D723 | B2EB | 9725 | B2EE | D726 | 32F2 | B2F5 | 32F7 | D311 | B2FA | 53F3 | 32FD | 53F6 | B2FF |
| C9 | 5961 | 33A9 | D963 | B3AB | 9965 | B3AE | D966 | 33B2 | B3B5 | 33B7 | 1471 | B3BA | 94B3 | 33BD | 94B6 | B3BF |
| CA | 5AA1 | F469 | DAA3 | 746B | 9AA5 | 746E | DAA6 | F472 | 7475 | F477 | 14D1 | 747A | 9473 | F47D | 9476 | 747F |
| CB | 5BE1 | 3489 | DBE3 | B48B | 9BE5 | B48E | DBE6 | 3492 | B495 | 3497 | 1591 | B49A | 9593 | 349D | 9596 | B49F |
| CC | 9C21 | F4C9 | 1C23 | 74CB | 5C25 | 74CE | 1C26 | F4D2 | 74D5 | F4D7 | D611 | 74DA | 56D3 | F4DD | 56D6 | 74DF |
| CD | 5D21 | 3569 | DD23 | B56B | 9D25 | B56E | DD26 | 3572 | B575 | 3577 | 1711 | B57A | 9773 | 357D | 9776 | B57F |
| CE | 5EE1 | F589 | DEE3 | 758B | 9EE5 | 758E | DEE6 | F592 | 7595 | F597 | 18B1 | 759A | 9893 | F59D | 9896 | 759F |
| CF | 5FA1 | 35C9 | DFA3 | B5CB | 9FA5 | B5CE | DFA6 | 35D2 | B5D5 | 35D7 | 1951 | B5DA | 99D3 | 35DD | 99D6 | B5DF |

Fig. 24

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| D0 | A161 | 36A9 | 2163 | B6AB | 6165 | B6AE | 2166 | 36B2 | B6B5 | 36B7 | 19F1 | B6BA | 99F3 | 36BD | 99F6 | B6BF |
| D1 | A2A1 | F709 | 22A3 | 770B | 62A5 | 770E | 22A6 | F712 | 7715 | F717 | 1A91 | 771A | 9A93 | F71D | 9A96 | 771F |
| D2 | A3E1 | 3749 | 23E3 | B74B | 63E5 | B74E | 23E6 | 3752 | B755 | 3757 | 1B71 | B75A | 9B73 | 375D | 9B76 | B75F |
| D3 | 6421 | 37E9 | E423 | B7EB | A425 | B7EE | E426 | 37F2 | B7F5 | 37F7 | 1BD1 | B7FA | 9BD3 | 37FD | 9BD6 | B7FF |
| D4 | A521 | F8A9 | 2523 | 78AB | 6525 | 78AE | 2526 | F8B2 | 78B5 | F8B7 | 1D11 | 78BA | 9D13 | F8BD | 9D16 | 78BF |
| D5 | A6E1 | 3909 | 26E3 | B90B | 66E5 | B90E | 26E6 | 3912 | B915 | 3917 | 1E71 | B91A | 9E73 | 391D | 9E76 | B91F |
| D6 | A7A1 | F949 | 27A3 | 794B | 67A5 | 794E | 27A6 | F952 | 7955 | F957 | 1ED1 | 795A | 9ED3 | F95D | 9ED6 | 795F |
| D7 | 68E1 | F9E9 | E8E3 | 79EB | A8E5 | 79EE | E8E6 | F9F2 | 79F5 | F9F7 | 1F91 | 79FA | 9F93 | F9FD | 9F96 | 79FF |
| D8 | 69A1 | 3A69 | E9A3 | BA6B | A9A5 | BA6E | E9A6 | 3A72 | BA75 | 3A77 | E151 | BA7A | 6153 | 3A7D | 6156 | BA7F |
| D9 | AA21 | FA89 | 2A23 | 7A8B | 6A25 | 7A8E | 2A26 | FA92 | 7A95 | FA97 | E1F1 | 7A9A | 61F3 | FA9D | 61F6 | 7A9F |
| DA | 6B21 | 3AC9 | EB23 | BACB | AB25 | BACE | EB26 | 3AD2 | BAD5 | 3AD7 | E291 | BADA | 6293 | 3ADD | 6296 | BADF |
| DB | ACE1 | FB69 | 2CE3 | 7B6B | 6CE5 | 7B6E | 2CE6 | FB72 | 7B75 | FB77 | E371 | 7B7A | 6373 | FB7D | 6376 | 7B7F |
| DC | ADA1 | 3B89 | 2DA3 | BB8B | 6DA5 | BB8E | 2DA6 | 3B92 | BB95 | 3B97 | E3D1 | BB9A | 63D3 | 3B9D | 63D6 | BB9F |
| DD | 6EE1 | FBC9 | EEE3 | 7BCB | AEE5 | 7BCE | EEE6 | FBD2 | 7BD5 | FBD7 | E511 | 7BDA | 6513 | FBDD | 6516 | 7BDF |
| DE | AFE1 | 3CA9 | 2FE3 | BCAB | 6FE5 | BCAE | 2FE6 | 3CB2 | BCB5 | 3CB7 | E671 | BCBA | 6673 | 3CBD | 6676 | BCBF |
| DF | 7161 | FD09 | F163 | 7D0B | B165 | 7D0E | F166 | FD12 | 7D15 | FD17 | E6D1 | 7D1A | 66D3 | FD1D | 66D6 | 7D1F |

Fig. 25

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| E0 | 72A1 | 3D49 | F2A3 | BD4B | B2A5 | BD4E | F2A6 | 3D52 | BD55 | 3D57 | E791 | BD5A | 6793 | 3D5D | 6796 | BD5F |
| E1 | 73E1 | 3DE9 | F3E3 | BDEB | B3E5 | BDEE | F3E6 | 3DF2 | BDF5 | 3DF7 | 2871 | BDFA | A873 | 3DFD | A876 | BDFF |
| E2 | B421 | FE69 | 3423 | 7E6B | 7425 | 7E6E | 3426 | FE72 | 7E75 | FE77 | 28D1 | 7E7A | A8D3 | FE7D | A8D6 | 7E7F |
| E3 | 7521 | 3E89 | F523 | BE8B | B525 | BE8E | F526 | 3E92 | BE95 | 3E97 | 2991 | BE9A | A993 | 3E9D | A996 | BE9F |
| E4 | 76E1 | FEC9 | F6E3 | 7ECB | B6E5 | 7ECE | F6E6 | FED2 | 7ED5 | FED7 | EA11 | 7EDA | 6A13 | FEDD | 6A16 | 7EDF |
| E5 | 77A1 | 3F69 | F7A3 | BF6B | B7A5 | BF6E | F7A6 | 3F72 | BF75 | 3F77 | 2B11 | BF7A | AB13 | 3F7D | AB16 | BF7F |
| E6 | B8E1 | FF89 | 38E3 | 7F8B | 78E5 | 7F8E | 38E6 | FF92 | 7F95 | FF97 | EC71 | 7F9A | 6C73 | FF9D | 6C76 | 7F9F |
| E7 | B9A1 | 3FC9 | 39A3 | BFCB | 79A5 | BFCE | 39A6 | 3FD2 | BFD5 | 3FD7 | ECD1 | BFDA | 6CD3 | 3FDD | 6CD6 | BFDF |
| E8 | 7A21 | 90B1 | FA23 | 10B3 | BA25 | 10B6 | FA26 | A131 | 2133 | 2136 | ED91 | 7131 | 6D93 | F133 | 6D96 | F13F |
| E9 | BB21 | 5111 | 3B23 | D113 | 7B25 | D116 | 3B26 | A251 | 2253 | 2256 | 2E11 | 7251 | AE13 | F253 | AE16 | F25F |
| EA | 7CE1 | 9151 | FCE3 | 1153 | BCE5 | 1156 | FCE6 | A2F1 | 22F3 | 22F6 | EF11 | 72F1 | 6F13 | F2F3 | 6F16 | F2FF |
| EB | 7DA1 | 91F1 | FDA3 | 11F3 | BDA5 | 11F6 | FDA6 | A3B1 | 23B3 | 23B6 | 30B1 | 73B1 | B0B3 | F3B3 | B0B6 | F3BF |
| EC | BE21 | 5271 | 3E23 | D273 | 7E25 | D276 | 3E26 | 6471 | E473 | E476 | 3151 | B471 | B153 | 3473 | B156 | 347F |
| ED | 7F21 | 9291 | FF23 | 1293 | BF25 | 1296 | FF26 | A491 | 2493 | 2496 | 31F1 | 7491 | B1F3 | F493 | B1F6 | F49F |
| EE | 0A21 | 52D1 | 8A23 | D2D3 | BA45 | D2D6 | 8A26 | 64D1 | E4D3 | E4D6 | 3291 | B4D1 | B293 | 34D3 | B296 | 34DF |
| EF | 0CE1 | 9371 | 8CE3 | 1373 | BDC5 | 1376 | 8CE6 | A571 | 2573 | 2576 | 3371 | 7571 | B373 | F573 | B376 | F57F |

Fig. 26

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| F0 | 1DA1 | 5391 | 8DA3 | D393 | 8F45 | D396 | 8DA6 | 6591 | E593 | E596 | 33D1 | B591 | B3D3 | 3593 | B3D6 | 3596 |
| F1 | 1F21 | 93D1 | 8F23 | 13D3 | 9445 | 13D6 | 8F26 | A5D1 | 25D3 | 25D6 | 3511 | 75D1 | B513 | F5D3 | B516 | F5D6 |
| F2 | 1421 | 54B1 | 9423 | D4B3 | 98C5 | D4B6 | 9426 | A6B1 | 26B3 | 26B6 | 3671 | 76B1 | B673 | F6B3 | B676 | F6B6 |
| F3 | 18E1 | 9511 | 98E3 | 1513 | 9B45 | 1516 | 98E6 | 6711 | E713 | E716 | 36D1 | B711 | B6D3 | 3713 | B6D6 | 3716 |
| F4 | 19A1 | 5551 | 99A3 | D553 | 9E45 | D556 | 99A6 | A751 | 2753 | 2756 | 3791 | 7751 | B793 | F753 | B796 | F756 |
| F5 | 1B21 | 55F1 | 9B23 | D5F3 | 61C5 | D5F6 | 9B26 | A7F1 | 27F3 | 27F6 | F871 | 77F1 | 7873 | F7F3 | 7876 | F7F6 |
| F6 | 1E21 | 9671 | 9E23 | 1673 | 6345 | 1676 | 9E26 | 68B1 | E8B3 | E8B6 | F8D1 | B8B1 | 78D3 | 38B3 | 78D6 | 38B6 |
| F7 | E1A1 | 5691 | 61A3 | D693 | 6645 | D696 | 61A6 | A911 | 2913 | 2916 | F991 | 7911 | 7993 | F913 | 7996 | F916 |
| F8 | E321 | 96D1 | 6323 | 16D3 | A845 | 16D6 | 6326 | 6951 | E953 | E956 | 3A11 | B951 | BA13 | 3953 | BA16 | 3956 |
| F9 | E621 | 5771 | 6623 | D773 | 6C45 | D776 | 6626 | 69F1 | E9F3 | E9F6 | FB11 | B9F1 | 7B13 | 39F3 | 7B16 | 39F6 |
| FA | EC21 | 9791 | 6C23 | 1793 | B1C5 | 1796 | 6C26 | AA71 | 2A73 | 2A76 | 3C71 | 7A71 | BC73 | FA73 | BC76 | FA76 |
| FB | 30E1 | 57D1 | B0E3 | D7D3 | B345 | D7D6 | B0E6 | 6A91 | EA93 | EA96 | 3CD1 | BA91 | BCD3 | 3A93 | BCD6 | 3A96 |
| FC | 31A1 | 5931 | B1A3 | D933 | B645 | D936 | B1A6 | AAD1 | 2AD3 | 2AD6 | 3D91 | 7AD1 | BD93 | FAD3 | BD96 | FAD6 |
| FD | 3321 | 5A51 | B323 | DA53 | 7845 | DA56 | B326 | 6B71 | EB73 | EB76 | FE11 | BB71 | 7E13 | 3B73 | 7E16 | 3B76 |
| FE | 3621 | 5AF1 | B623 | DAF3 | BC45 | DAF6 | B626 | AB91 | 2B93 | 2B96 | 3F11 | 7B91 | BF13 | FB93 | BF16 | FB96 |
| FF | 3C21 | 5BB1 | BC23 | DBB3 | 8C85 | DBB6 | BC26 | 6BD1 | EBD3 | EBD6 | 8E11 | BBD1 | 0E13 | 3BD3 | 0E16 | 3BD6 |

TIME
fCH(a)
fSym(b)
fMW(c)
fMW/2(d)
FIRST DATAWORD (r)
OUTPUT OF SHIFT REGISTER
(e)
(f)
(g)
OUTPUT OF LATCH (h)
OUTPUT OF SELECTOR (m)
0
1
2
3
4
5
6
7
8
9
10

Fig. 33

| n2 GROUP | m2 DATA 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 1 | 07 | 09 | 0A | 0B | 0D | 0E | 0F | 12 | 15 | 17 | 19 | 1A | 1B | 1D | 1E | 1F |
| 2 | 01 | | 03 | | 05 | | 06 | | | | | | | | | |
| 3 | | | | | | | | | | | 11 | | 13 | | | 16 |
| 4 | | 11 | | 13 | | 16 | | 11 | 13 | 16 | | 11 | | 13 | 16 | |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00 | 4E7B | 4E7E | CEA1 | 4EA3 | 4EA6 | CEC2 | 4EC5 | CEC7 | 4ECA | CECD | 4ECF | CED9 | 4EDB | 4EDE | CEF1 | 4EF3 |
| 01 | 4EF6 | 4F43 | 4F46 | 4F85 | CF87 | 4F8A | CF8D | 4F8F | CF99 | 4F9B | 4F9E | CFB1 | 4FB3 | 4FB6 | CFE1 | 4FE3 |
| 02 | 4FE6 | D0B9 | 50BB | 50BE | D092 | 5095 | D097 | 509A | D09D | 509F | 50A9 | D0AB | D0AE | 50B2 | D0B5 | 50B7 |
| 03 | D0BA | 50BD | D0BF | 50D1 | D0D3 | D0D6 | 50E2 | D0E5 | 50E7 | D0EA | 50ED | D0EF | 50F9 | D0FB | D0FB | D011 |
| 04 | 5113 | 5116 | D122 | 5125 | D127 | 512A | D12D | 512F | D139 | 513B | 513E | 5149 | D14B | D14E | 5152 | D155 |
| 05 | 5157 | D15A | 515D | D15F | D169 | 516B | 516E | D172 | 5175 | D177 | 517A | D17D | 517F | 5191 | D193 | D196 |
| 06 | 51A2 | D1A5 | 51A7 | D1AA | 51AD | D1AF | 51B9 | D1BB | D1BE | D1C9 | 51CB | 51CE | D1D2 | 51D5 | D1D7 | 51DA |
| 07 | D1DD | 51DF | 51E9 | D1EB | D1EE | 51F2 | D1F5 | 51F7 | D1FA | 51FD | D1FF | D221 | 5223 | 5226 | D242 | 5245 |
| 08 | D247 | 524A | D24D | 524F | D259 | 525B | 525E | D271 | 5273 | 5286 | 5289 | D28B | D28E | 5292 | D295 | 5297 |
| 09 | D29A | 529D | D29F | D2A9 | 52AB | 52AE | D2B2 | 52B5 | D2B7 | 52BA | D2BD | 52BF | D2D1 | 52D3 | 52D6 | D2E2 |
| 0A | 52E5 | D2E7 | 52EA | D2ED | D2EF | D2F9 | 52FB | 52FE | 5311 | D313 | D316 | 5322 | D325 | 5327 | D32A | 532D |
| 0B | D32F | 5339 | D33B | D33E | D349 | 534B | 534E | D352 | 5355 | D357 | 535A | D35D | 535F | 5369 | D36B | D36E |
| 0C | 5372 | D375 | 5377 | D37A | 537D | D37F | D391 | 5393 | 5396 | D3A2 | 53A5 | D3A7 | 53AA | D3AD | 53AF | D3B9 |
| 0D | 53BB | 53BE | 53C9 | D3CB | D3CE | 53D2 | D3D5 | 53D7 | D3DA | 53DD | D3DF | D3E9 | 53EB | 53EE | D3F2 | 53F5 |
| 0E | D3F7 | 53FA | D3FD | 53FF | 5443 | 5446 | 5485 | D487 | 548A | D48D | 548F | D499 | 549B | 549E | D4B1 | 54B3 |
| 0F | 54BB | D4E1 | 54E3 | 54E6 | 5509 | D50B | D50E | 5512 | D515 | 5517 | D51A | 551D | D51F | D529 | 552B | 552E |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 10 | D532 | 5535 | D537 | 553A | D53D | 553F | D551 | 5553 | 5556 | D562 | 5565 | D567 | 556A | D56D | 556F | D579 |
| 11 | 557B | 557E | D5A1 | 55A3 | 55A6 | D542 | 55C5 | D5C7 | 55CA | D5CD | 55CF | D5D9 | 55DB | 55DE | D5F1 | 55F3 |
| 12 | 55F6 | 5611 | D613 | D616 | 5622 | D625 | 5627 | D62A | 562D | D62F | 5639 | D63B | D63E | D649 | 564B | 564E |
| 13 | D652 | 5655 | D657 | 565A | D65D | 565F | 5669 | D66B | D66E | 5672 | D675 | 5677 | D67A | 567D | D67F | D691 |
| 14 | 5693 | 5696 | D6AE | 56A5 | D6A7 | 56AA | D6AD | 56AF | D6B9 | 56BB | 56BE | 56C9 | D6CB | D6CE | 56D2 | D6D5 |
| 15 | 56D7 | D6DA | 56DD | D6DF | D6E9 | 56EB | 56EE | D6F2 | 56F5 | D6F7 | 56FA | D6FD | 56FF | D621 | 5623 | 5626 |
| 16 | D742 | 5745 | D747 | 574A | D74D | 574F | D759 | 575B | 575E | D771 | 5773 | 5776 | 5789 | D78B | D78E | 5792 |
| 17 | D795 | 5797 | D79A | 579D | D79F | D7A9 | 57AB | D7AE | D7B2 | 57B5 | D7B7 | 57BA | D7BD | 57BF | D7D1 | 57D3 |
| 18 | 57D6 | D7E2 | 57E5 | D7E7 | 57EA | D7ED | 57EF | D7F9 | 57FB | 57FE | 5886 | 590A | D90D | 590F | D919 | 591B |
| 19 | 591E | D931 | 5933 | 5936 | D961 | 5963 | 5966 | 59C3 | 59C6 | 5A12 | DA15 | 5A17 | DA1A | 5A1D | DA1F | DA29 |
| 1A | 5A2B | 5A2E | DA32 | 5A35 | DA37 | 5A3A | DA3D | 5A3F | DA51 | 5A53 | 5A56 | DA62 | 5A65 | DA67 | 5A6A | DA6D |
| 1B | 5A6F | DA79 | 5A7B | 5A7E | DAA1 | 5AA3 | 5AA6 | DAC2 | 5AC5 | DAC7 | 5ACA | DACD | 5ACF | DAD9 | 5ADB | 5ADE |
| 1C | DAF1 | 5AF3 | 5AF6 | 5B43 | 5B46 | 5B85 | DB87 | 5B8A | DB8D | 5B8F | DB99 | 5B9B | 5B9E | DBB1 | 5BB3 | 5BB6 |
| 1D | DBE1 | 5BE3 | 5BE6 | 5C22 | DC25 | 5C27 | DC2A | 5C2D | DC2F | 5C39 | DC3B | DC3E | DC49 | 5C4B | 5C4E | DC52 |
| 1E | 5C55 | DC57 | 5C5A | DC5D | 5C5F | 5C69 | DC6B | DC6E | 5C72 | DC75 | 5C77 | DC7A | 5C7D | DC7F | DC91 | 5C93 |
| 1F | 5C96 | DCA2 | 5CA5 | DCA7 | 5CAA | DCAD | 5CAF | DCB9 | 5CBB | 5CBE | 5CC9 | DCCB | DCCE | 5CD2 | DCD5 | 5CD7 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 20 | DCDA | 5CDD | DCDF | DCE5 | 5CEB | 5CEE | DCF2 | 5CF5 | DCF7 | 5CFA | DCFD | 5CFF | DD21 | 5D23 | 5D26 | DD42 |
| 21 | 5D45 | DD47 | 5D4A | DD4D | 5D4F | DD59 | 5D5B | 5D5E | DD71 | 5D73 | 5D76 | 5D89 | DD8B | DD8E | 5D92 | DD95 |
| 22 | 5D97 | DD9A | 5D9D | DD9F | DDA9 | 5DAB | 5DAE | DDB2 | 5DB5 | DDB7 | 5DBA | DDBD | 5DBF | DDD1 | 5DD3 | 5DD6 |
| 23 | DDE2 | 5DE5 | DDE7 | 5DEA | DDED | 5DEF | DDF9 | 5DFB | 5DFE | 5E43 | 5E46 | 5E85 | DE87 | 5E8A | DE8D | 5E8F |
| 24 | DE99 | 5E9B | 5E9E | DED1 | 5ED3 | 5EB6 | DEE1 | 5EE3 | 5EE6 | 5F09 | DF0B | DF0E | 5F12 | DF15 | 5F17 | DF1A |
| 25 | 5F1D | DF1F | DF29 | 5F2B | 5F2E | DF32 | 5F35 | DF37 | 5F3A | DF3D | 5F3F | DF51 | 5F53 | 5F56 | DF62 | 5F65 |
| 26 | DF67 | 5F64 | DF6D | 5F6F | DF79 | 5F7D | 5F7E | DFA1 | 5FA3 | 5FA6 | DFC2 | 5FC5 | DFC7 | 5FCA | DFCD | 5FCF |
| 27 | DFD9 | 5FDB | 5FDE | DFF1 | 5FF3 | 5FF6 | 6843 | 6846 | 6885 | E887 | 688A | E88D | 688F | E899 | 689B | 689E |
| 28 | E8B1 | 68B7 | 68B6 | E8E1 | 68E3 | 68E6 | 6909 | E90B | E90E | 6912 | E915 | 6917 | E91A | 691D | E91F | E929 |
| 29 | 692B | 692E | E932 | 6935 | E937 | 693A | E93D | 693F | E951 | 6953 | 6956 | E962 | 6965 | E967 | 696A | E96D |
| 2A | 696F | E979 | 697B | 697E | E9A1 | 69A3 | 69A6 | E9C2 | 69C5 | E9C7 | 69CA | E9CD | 69CF | E9D9 | 69DB | 69DE |
| 2B | E9F1 | 69F3 | 69F6 | 6A11 | EA13 | EA16 | 6A22 | EA25 | 6A27 | EA2A | 6A2D | EA2F | 6A39 | EA3B | EA3E | EA49 |
| 2C | 6A4B | 6A4E | EA52 | 6A55 | EA57 | 6A5A | EA5D | 6A5F | 6A66 | EA6B | EA6E | 6A72 | EA75 | 6A77 | EA7A | 6A7D |
| 2D | EA7F | EA91 | 6A93 | 6A96 | EAA2 | 6AA5 | EAA7 | 6AAA | EAAD | 6AAF | EAB9 | 6ABB | 6ABE | 6AC9 | EACB | EACE |
| 2E | 6AD2 | EAD5 | 6AD7 | EADA | 6ADD | EADF | EAE9 | 6AEB | 6AEE | EAF2 | 6AF5 | EAF7 | 6AFA | EAFD | 6AFF | EB21 |
| 2F | 6B23 | 6B26 | EB42 | 6B45 | EB47 | 6B4A | EB4D | 6B4F | EB59 | 6B5B | 6B5E | EB71 | 6B73 | 6B76 | 6B89 | EB8B |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 30 | EBBE | 6B92 | EB95 | 6B97 | 6B9A | 6B9D | EB9F | EBA9 | 6BAB | 6BAE | EBB2 | 6BB5 | EBB7 | 6BBA | EBBD | 6BBF |
| 31 | EBD1 | 6BD3 | 6BD6 | EBE2 | EBE5 | EBE7 | 6BEA | EBED | 6BEF | EBF9 | 6BFB | 6BFE | 6C21 | EC23 | EC26 | 6C42 |
| 32 | EC45 | 6C47 | EC4A | 6C4D | 6C4F | 6C59 | EC5B | EC5E | 6C71 | EC73 | EC76 | EC89 | 6C8B | 6C8E | EC92 | 6C95 |
| 33 | EC97 | 6C9A | EC9D | 6C9F | ECA9 | ECAB | ECAE | 6CB2 | ECB5 | 6CB7 | ECBA | 6CBD | ECBF | 6CD1 | ECD3 | ECD6 |
| 34 | 6CE2 | ECE5 | 6CE7 | ECEA | 6CED | ECEF | 6CF9 | ECFB | ECFE | ED11 | 6D13 | 6D16 | ED22 | 6D25 | ED27 | 6D2A |
| 35 | ED2D | 6D2F | ED39 | 6D3B | 6D3E | 6D49 | ED4B | ED4E | 6D52 | ED55 | 6D57 | ED5A | 6D5D | ED5F | ED69 | 6D6B |
| 36 | 6D6E | ED72 | 6D75 | ED77 | 6D7A | ED7D | 6D7F | 6D91 | ED93 | ED96 | 6DA2 | EDA5 | 6DA7 | EDAA | 6DAD | EDAF |
| 37 | 6DB9 | EDBB | EDBE | EDC9 | 6DCB | 6DCE | EDD2 | 6DD5 | EDD7 | 6DDA | EDDD | 6DDF | 6DE9 | EDEB | EDEE | 6DF2 |
| 38 | EDF5 | 6DF7 | EDFA | 6DFD | EDFF | EE21 | 6E23 | 6E26 | EE42 | 6E45 | EE47 | 6E4A | EE4D | 6E4F | EE59 | 6E5B |
| 39 | 6E5E | EE71 | 6E73 | 6E76 | 6E89 | EE8B | EE8E | 6E92 | EE95 | 6E97 | EE95 | 6E9D | EE9F | EEA9 | 6EAB | 6EAE |
| 3A | EEB2 | 6EB5 | EEB7 | 6EBA | EEBD | 6EBF | EED1 | 6ED3 | 6ED6 | EEE2 | 6EEA | EEE7 | 6EEA | EEED | 6EEF | EEF9 |
| 3B | 6EFB | 6EFE | 6F11 | EF13 | EF16 | 6F22 | EF25 | 6F27 | EF2A | 6F2D | EF2F | 6F39 | EF3B | EF3E | EF49 | 6F4B |
| 3C | 6F4E | EF52 | 6F55 | EF57 | 6F5A | EF5D | 6F5F | 6F69 | EF6B | EF6E | 6F72 | EF75 | 6F77 | EF7A | 6F7D | EF7F |
| 3D | EF91 | 6F93 | 6F9B | EFA2 | 6FA5 | EFA7 | 6FAA | EFAD | 6FAF | EFB9 | 6FBB | 6FBE | 6FC9 | EFCB | EFCE | 6FD2 |
| 3E | EFD5 | 6FD7 | EFDA | 6FDD | EFDF | EFE9 | 6FEB | 6FEE | EFF2 | 6FF5 | EFF7 | 6FFA | EFFD | 6FFF | 7086 | 710A |
| 3F | F10D | 710F | F119 | 711B | 711E | F131 | 7133 | 7136 | F161 | 7163 | 7166 | 71C3 | 71C6 | 7212 | F215 | 7217 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 40 | F21A | 721D | F21F | F229 | 722B | 722E | F232 | 7235 | F237 | 723A | F23D | 723F | F251 | F253 | 7256 | F262 |
| 41 | 7265 | F267 | 726A | F26D | 726F | F279 | 727B | 727E | F2A1 | 72A3 | 72A6 | F2C2 | 72C5 | 72C7 | 72CA | F2CD |
| 42 | 72CF | F2D9 | 72DB | 72DE | F2F1 | 72F3 | 72F6 | 7343 | 7346 | 7385 | F387 | 738A | F38D | 738F | F399 | 739B |
| 43 | 739E | F381 | 73B3 | 73B6 | F3E1 | 73E3 | 73E6 | 7422 | F425 | 7427 | F42A | 742D | F42F | 7439 | F43B | F43E |
| 44 | F449 | 744B | 744E | F452 | 7455 | F457 | 745A | F45D | 745F | 7469 | F46B | F46E | 7472 | F475 | 7477 | F47A |
| 45 | 747D | F47F | F471 | 7493 | 7496 | F4A2 | 74A5 | F4A7 | 74AA | F4AD | 74AF | F4B9 | 74BB | 74CE | 74C9 | F4CB |
| 46 | F4CE | 74D2 | F4D5 | 74D7 | F4DA | 74DD | F4DF | F4E9 | 74EB | 74EE | F4F2 | 74F5 | F4F7 | 74FA | F4FD | 74FF |
| 47 | F521 | 7523 | 7526 | F542 | 7545 | F547 | 754A | F54D | 754F | F559 | 755B | 755E | F571 | 7573 | 7576 | 7589 |
| 48 | F58B | F58E | 7582 | F595 | 7597 | F59A | 759D | F59F | F5A9 | 75AB | 75AE | F5B2 | 75B5 | F5B7 | 75BA | F5BD |
| 49 | 75BF | F5D1 | 75D3 | 75D6 | F5E2 | 75E5 | F5E7 | 75EA | F5ED | 75EF | F5F9 | 75FB | 75FE | 7643 | 7646 | 7685 |
| 4A | F687 | 768A | F68D | 768F | F699 | 769B | 769E | F6B1 | 76B3 | 76B6 | F6E1 | 76E3 | 76E6 | 7709 | F70B | F70E |
| 4B | 7712 | F715 | 7717 | F71A | 771D | F71F | F729 | 772B | 772E | F732 | 7735 | F737 | 773A | F73D | 773F | F751 |
| 4C | 7753 | 7756 | F752 | 7765 | F767 | 776A | F76D | 776F | F776 | 777B | 777E | F7A1 | 77A3 | 77C0 | F7A2 | 77C5 |
| 4D | F7C7 | 77CA | F7CD | 77CF | F7D9 | 77DB | 77DE | F7F1 | 77F3 | 77F6 | 7842 | F845 | 7847 | F84A | 784D | F84F |
| 4E | 7859 | F85B | F85E | 7871 | F873 | F876 | F889 | 788B | 788E | F892 | 7895 | F897 | 789A | F89D | 789F | 78A9 |
| 4F | F8AB | F8AE | 78A2 | F8B5 | 78B7 | F8BA | 78BD | F8BF | 78D1 | F8D3 | F8D6 | 78E2 | F8E5 | 78E7 | F8EA | 78ED |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 50 | F8EF | 78F9 | F8FB | F8FE | F911 | 7913 | 7916 | F922 | 7925 | F927 | 792A | F92D | 792F | F939 | 793B | 793E |
| 51 | 7949 | F94B | F94E | 7952 | F955 | 7957 | F95A | 795D | F95F | F969 | 796B | 796E | F972 | 7975 | F977 | 797A |
| 52 | F97D | 797F | 7991 | F993 | F996 | 79A2 | F9A5 | 79A7 | F9AA | 79AD | F9AF | 79B9 | F9BB | F9BB | F9C9 | 79CB |
| 53 | 79CE | F9D2 | 79D5 | F9D7 | 79DA | F9DD | 79DF | 79E9 | F9EB | F9EE | 79F2 | F9F5 | 79F7 | F9FA | 79FD | F9FF |
| 54 | FA21 | 7A23 | 7A26 | FA42 | 7A45 | FA47 | 7A4A | FA4D | 7A4F | FA59 | 7A5B | 7A5E | FA71 | 7A73 | 7A76 | 7A89 |
| 55 | FA8B | FA8E | 7A92 | FA95 | 7A97 | FA9A | 7A9D | FA9F | FAA9 | 7AAB | 7AAE | FAB2 | 7AB5 | FAB7 | 7ABA | FABD |
| 56 | 7ABF | FAD1 | 7AD3 | 7AD6 | FAE2 | 7AE5 | FAE7 | 7AEA | FAED | 7AEF | FAF9 | 7AFB | 7AFE | 7B11 | FB13 | FB16 |
| 57 | 7B22 | FB25 | 7B27 | FB2A | 7B2D | FB2F | 7B39 | FB3B | FB3E | FB49 | 7B4B | 7B4F | FB52 | 7B55 | FB57 | 7B5A |
| 58 | FB5D | 7B5F | 7B69 | FB6B | FB6E | 7B72 | FB75 | 7B77 | FB7A | 7B7D | FB7F | FB91 | 7B93 | 7B96 | FBA2 | 7BA5 |
| 59 | FBA7 | 7BAA | FBAD | 7BAF | FBB9 | 7BBB | 7BBE | 7BC9 | FBCB | FBCE | 7BD2 | FBD5 | 7BD7 | FBDA | 7BDD | FBDF |
| 5A | FBE9 | 7BEB | 7BEE | FBF2 | 7BF5 | FBF7 | 7BFA | FBFD | 7BFF | 7C43 | 7C46 | 7C85 | FC87 | 7C8A | FC8D | 7C8F |
| 5B | FC99 | 7C9B | 7C9E | FCB1 | 7CB3 | 7CB6 | FCE1 | 7CE3 | 7CE6 | 7D09 | FD0B | FD0E | 7D12 | FD15 | 7D17 | FD1A |
| 5C | 7D1D | FD1F | FD29 | 7D2B | 7D2E | FD32 | 7D35 | FD37 | 7D3A | FD3D | 7D3F | FD51 | 7D53 | 7D56 | FD62 | 7D65 |
| 5D | FD67 | 7D6A | FD6D | 7D6F | FD79 | 7D7B | 7D7E | FDA1 | 7DA3 | 7DA6 | FDC2 | 7DC5 | FDC7 | 7DCA | FDCD | 7DCF |
| 5E | FDD9 | 7DDB | 7DDE | FDF1 | 7DF3 | 7DF6 | 7E11 | FE13 | FE16 | 7E22 | FE25 | 7E27 | FE2A | 7E2D | FE2F | 7E39 |
| 5F | FE3B | FE3E | FE49 | 7E4B | 7E4E | FE52 | 7E55 | FE57 | 7E5A | FE5D | 7E5F | 7E69 | FE6B | FE6E | 7E72 | FE75 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 60 | 7E77 | FE7A | 7E7D | FE7F | FE91 | 7E93 | 7E96 | FEA2 | 7EA5 | FEA7 | 7EAA | FEAD | 7EAF | FEB9 | 7EBB | 7EBE |
| 61 | 7EC9 | FECB | FECE | 7ED2 | FED5 | 7ED7 | FEDA | 7EDD | FEDF | FEE9 | 7EEB | 7EEE | FEF2 | 7EF5 | FEF7 | 7EFA |
| 62 | FEFD | 7EFF | FF21 | 7F23 | 7F26 | FF42 | 7F45 | FF47 | 7F4A | FF4D | 7F4F | FF59 | 7F5B | 7F5E | FF71 | 7F73 |
| 63 | 7F76 | 7F89 | FF8B | FF8E | 7F92 | FF95 | 7F97 | FF9A | 7F9D | FF9F | FFA9 | 7FAB | 7FAE | FFB2 | 7FB5 | FFB7 |
| 64 | 7FBA | FFBD | 7FBF | FFD1 | 7FD3 | 7FD8 | FFE2 | 7FE5 | FFE7 | 7FEA | FFED | 7FEF | FFF9 | 7FFB | 7FFB | 8842 |
| 65 | 0845 | 8847 | 084A | 884D | 084F | 8859 | 085B | 085E | 8871 | 0873 | 0876 | 0889 | 888B | 888E | 0892 | 8895 |
| 66 | 0897 | 889A | 089D | 889F | 88A9 | 08AB | 08AE | 88B2 | 08B5 | 88B7 | 08BA | 88BD | 08BF | 88D1 | 08D3 | 08D6 |
| 67 | 88E2 | 08E5 | 88E7 | 08EA | 88ED | 08EF | 88F9 | 08FB | 08FE | 0911 | 8913 | 8916 | 0922 | 8925 | 0927 | 892A |
| 68 | 092D | 892F | 0939 | 893B | 893E | 8949 | 094B | 094E | 8952 | 0955 | 8957 | 095A | 895D | 095F | 0969 | 896B |
| 69 | 896E | 0972 | 8975 | 0977 | 897A | 097D | 897F | 8991 | 0993 | 0996 | 89A2 | 09A5 | 89A7 | 09AA | 89AD | 09AF |
| 6A | 89B9 | 09BB | 09BE | 09C9 | 89CB | 89CE | 09D2 | 89D5 | 09D7 | 89DA | 09DD | 89DF | 89E9 | 09EB | 09EE | 89F2 |
| 6B | 09F5 | 89F7 | 09FA | 89FD | 09FF | 0A21 | 8A23 | 8A26 | 0A42 | 8A45 | 0A47 | 8A4A | 0A4D | 8A4F | 0A59 | 8A5B |
| 6C | 8A5E | 0A71 | 8A73 | 8A76 | 8A89 | 0A8B | 0A8E | 8A92 | 0A95 | 8A97 | 0A9A | 8A9B | 0A9F | 0AA9 | 8AAB | 8AAE |
| 6D | 0AB2 | 8AB5 | 0AB7 | 8ABA | 0AB0 | 8ABF | 0AD1 | 8AD3 | 8AD6 | 0AE2 | 8AE5 | 0AE7 | 8AEA | 0AED | 8AEF | 0AF9 |
| 6E | 8AFB | 8AFE | 8B11 | 0B13 | 0B16 | 8B22 | 0B25 | 8B27 | 0B2A | 8B2D | 0B2F | 8B39 | 0B3B | 0B3E | 0B49 | 8B4B |
| 6F | 8B4E | 0B52 | 8B55 | 0B57 | 8B5A | 0B5D | 8B5F | 8B69 | 0B6B | 0B6E | 8B72 | 0B75 | 8B77 | 0B7A | 8B7D | 0B7F |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 70 | 0B91 | 8B93 | 8B96 | 0BA2 | 8BA5 | 0BA7 | 8BAA | 0BAD | 8BAF | 0BB9 | 8BBB | 8BBE | 8BC9 | 0BCB | 0BCE | 8BD2 |
| 71 | 0BD5 | 8BD7 | 0BDA | 8BDD | 0BDF | 0BE9 | 8BEB | 8BEE | 0BF2 | 8BF5 | 0BF7 | 8BFA | 0BFD | 8BFF | 8B43 | 8B46 |
| 72 | 8C85 | 0C87 | 8C8A | 0CBD | 8C8F | 0C99 | 8C9B | 8C9E | 0CB1 | 8CB3 | 8CB6 | 0CE1 | 8CE3 | 8CE6 | 8C09 | 0C0B |
| 73 | 0D0E | 8D12 | 0D15 | 8D17 | 0D1A | 8D1D | 0D1F | 0D29 | 8D2B | 8D2E | 0D32 | 8D35 | 0D37 | 8D3A | 0D3D | 8D3F |
| 74 | 0D51 | 8D53 | 8D56 | 0D62 | 8D65 | 0D67 | 8D6A | 0D6D | 8D6F | 0D79 | 8D7B | 8D7E | 0DA1 | 8DA3 | 8DA6 | 0DC2 |
| 75 | 8DC5 | 0DC7 | 8DCA | 0DCD | 8DCF | 0DD9 | 8DDB | 8DDE | 0DF1 | 8DF3 | 8DF6 | 8E11 | 0E13 | 0E16 | 8E22 | 0E25 |
| 76 | 8E27 | 0E2A | 8E2D | 0E2F | 8E39 | 0E3B | 0E3E | 0E49 | 8E4B | 8E4E | 0E52 | 8E55 | 0E57 | 8E5A | 0E5D | 8E5F |
| 77 | 8E69 | 0E6B | 0E6E | 8E72 | 0E75 | 8E77 | 0E7A | 8E7D | 0E7F | 0E91 | 8E93 | 8E96 | 0EA2 | 8EA5 | 0EA7 | 8EAA |
| 78 | 0EAD | 8EAF | 0EB9 | 8EBB | 8EBE | 8EC9 | 0ECB | 0ECE | 8ED2 | 0ED5 | 8ED7 | 0EDA | 8EDD | 0EDF | 0EE9 | 8EEB |
| 79 | 8EEE | 0EF2 | 8EF5 | 0EF7 | 8EFA | 0EFD | 8EFF | 0E21 | 8F23 | 8F26 | 0F42 | 8F45 | 0F47 | 8F4A | 0F4D | 8F4F |
| 7A | 0F59 | 8F5B | 8F5E | 0F71 | 8F73 | 8F76 | 8F8B | 0F8B | 0F8E | 8F92 | 0F95 | 8F97 | 0F9A | 8F9D | 0F9F | 0FA9 |
| 7B | 8FAB | 8FAE | 0FB2 | 8FB5 | 0FB7 | 8FBA | 0FBD | 8FBF | 0FD1 | 8FD3 | 8FD6 | 0FE2 | 8FE5 | 0FE7 | 8FEA | 0FED |
| 7C | 8FEF | 0FF9 | 8FFB | 8FFE | 1085 | 9087 | 108A | 908D | 108F | 9099 | 109B | 109E | 90B1 | 10B3 | 10B6 | 90E1 |
| 7D | 10E3 | 10E6 | 1109 | 910B | 910E | 1112 | 9115 | 1117 | 911A | 111D | 911F | 9129 | 112B | 112E | 9132 | 1135 |
| 7E | 9137 | 113A | 013D | 113F | 9151 | 1153 | 1156 | 9162 | 1165 | 9167 | 116A | 016D | 116F | 9179 | 117B | 117E |
| 7F | 91A1 | 11A3 | 11A6 | 91C2 | 11C5 | 91C7 | 11CA | 91CD | 11CF | 81D9 | 11DB | 11DE | 91F1 | 11F3 | 11F6 | 1211 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 80 | 9213 | 9216 | 1222 | 0225 | 1227 | 922A | 122D | 022F | 1239 | 923B | 923E | 9249 | 124B | 124E | 9252 | 1255 |
| 81 | 9257 | 125A | 925D | 125F | 1269 | 926B | 926E | 1272 | 9275 | 1277 | 927A | 127D | 927F | 9291 | 1293 | 1296 |
| 82 | 92A2 | 12A5 | 92A7 | 12AA | 92AD | 12AF | 92B0 | 12BB | 12BE | 12C9 | 92CB | 92CE | 12D2 | 92D5 | 12D7 | 92DA |
| 83 | 12DD | 92DF | 92E9 | 12EB | 12EE | 92F2 | 12F5 | 93F7 | 12FA | 92FD | 12FF | 9321 | 1323 | 1326 | 9342 | 1345 |
| 84 | 9347 | 134A | 934D | 134F | 9359 | 135B | 135E | 0371 | 1373 | 1376 | 1389 | 93BB | 938E | 1392 | 9395 | 1397 |
| 85 | 939A | 139D | 939F | 93A9 | 13AB | 13AE | 93B2 | 13B5 | 93B7 | 13BA | 938D | 13BF | 93D1 | 13D3 | 13D6 | 93E2 |
| 86 | 13E5 | 93E7 | 13EE | 93ED | 13EF | 93F9 | 13FB | 14FE | 1421 | 0423 | 9426 | 1442 | 9445 | 1447 | 944A | 144D |
| 87 | 944F | 1459 | 945D | 945E | 1471 | 9473 | 9476 | 9489 | 148B | 148E | 9492 | 1495 | 9497 | 149A | 949D | 149F |
| 88 | 14A9 | 94AB | 94AE | 14B2 | 94B5 | 14B7 | 94BA | 158D | 94BF | 14D1 | 94D3 | 94D6 | 14E2 | 94E5 | 14E7 | 94EA |
| 89 | 14ED | 94EF | 14F9 | 94FB | 94FE | 9511 | 1513 | 1516 | 9522 | 1525 | 9527 | 152A | 952D | 152F | 9539 | 153B |
| 8A | 153E | 1549 | 9548 | 954E | 1552 | 9555 | 1557 | 955A | 155D | 055F | 9569 | 156B | 156E | 9572 | 1575 | 9577 |
| 8B | 157A | 957D | 157F | 1591 | 9593 | 9596 | 15A2 | 95A5 | 15A7 | 05AA | 15AD | 95AF | 15B9 | 95BB | 05BE | 95C9 |
| 8C | 15CB | 15CE | 95D2 | 15D5 | 95D7 | 15DA | 95DD | 15DF | 15A9 | 05EB | 95EE | 15F2 | 95F5 | 15F7 | 95FA | 15FD |
| 8D | 95FF | 9621 | 1623 | 1626 | 0642 | 1645 | 0647 | 164A | 964D | 164F | 9659 | 1658 | 165E | 9671 | 1673 | 1676 |
| 8E | 1689 | 9688 | 968E | 169E | 0695 | 1697 | 069A | 169D | 969F | 96A9 | 16AB | 16AE | 96B2 | 16B5 | 06B7 | 16BA |
| 8F | 96BD | 16B4 | 96D1 | 16D3 | 16D6 | 96E2 | 16E5 | 96E7 | 16EA | 96ED | 16EF | 96F9 | 16FB | 16FE | 1711 | 9713 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 90 | 9716 | 1722 | 9725 | 1727 | 972A | 172D | 972F | 1739 | 973B | 973E | 9749 | 174B | 174E | 9752 | 1755 | 9757 |
| 91 | 175A | 975D | 175F | 1769 | 976B | 976E | 1772 | 9775 | 1777 | 977A | 177D | 977F | 9791 | 1793 | 1796 | 97A2 |
| 92 | 17A5 | 97A7 | 17AA | 97AD | 17AF | 97B9 | 17BB | 17BE | 17C9 | 97CB | 97CE | 17D2 | 97D5 | 17D7 | 97DA | 17DD |
| 93 | 97DF | 97E9 | 17EB | 17EE | 97F2 | 17F5 | 97F7 | 17FA | 97FD | 17FF | 9843 | 98A6 | 9885 | 1887 | 988A | 1B8D |
| 94 | 988F | 1899 | 989B | 989E | 18B1 | 98B3 | 98B6 | 18E1 | 98E3 | 98E6 | 9909 | 190B | 190E | 9912 | 1915 | 9917 |
| 95 | 191A | 991D | 191F | 1929 | 992B | 992E | 1932 | 9935 | 1937 | 993A | 193D | 993F | 1951 | 9953 | 9956 | 1962 |
| 96 | 9965 | 1967 | 996A | 196D | 996F | 1979 | 997B | 997E | 19A1 | 99A3 | 99A6 | 19C2 | 99C5 | 19C7 | 99CA | 19CD |
| 97 | 09CF | 19D9 | 99DB | 99DE | 19F1 | 99F3 | 99F6 | 9A11 | 1A13 | 1A16 | 9A22 | 1A25 | 9A27 | 1A2A | 9A2D | 1A2F |
| 98 | 9A39 | 1A3B | 1A3E | 1A49 | 9A4B | 9A4E | 1A52 | 9A55 | 1A57 | 9A5A | 1A5D | 9A5F | 9A65 | 1A6B | 1A6E | 9A72 |
| 99 | 1A75 | 9A77 | 1A7A | 9A7D | 1A7F | 1A91 | 9A93 | 9A96 | 1AA2 | 9AA5 | 1AA7 | 9AAA | 1AAD | 9AAF | 1AB9 | 9ABB |
| 9A | 0ABE | 9AC9 | 1ACB | 1ACE | 0AD2 | 1AD5 | 9AD7 | 1ADA | 9ADD | 1ADF | 1AE9 | 9AEB | 9AEE | 1AF2 | 9AF5 | 1AF7 |
| 9B | 0AFA | 1AFD | 9AFF | 1B21 | 0B23 | 0B26 | 1B42 | 9B45 | 1B47 | 0B4A | 1B4D | 0B4F | 1B59 | 9B5B | 0B5E | 1B71 |
| 9C | 0B73 | 9B76 | 9B89 | 1BBB | 1B8E | 0B92 | 1B95 | 9B97 | 1B9A | 0B9D | 1B9F | 1BA9 | 8BAB | 9BAE | 1BB2 | 9BB5 |
| 9D | 1BB7 | 0BBA | 1BBD | 9BBF | 1BD1 | 0BD3 | 9BD6 | 1BE2 | 9BE5 | 1BE7 | 9BEA | 1BED | 0BEF | 1BF9 | 9BFB | 9BFE |
| 9E | 9C21 | 1C23 | 1C26 | 9C42 | 1C45 | 0C47 | 1C4A | 9C4D | 1C4F | 0C55 | 1C5B | 1C5E | 0C71 | 1C73 | 1C76 | 1C89 |
| 9F | 0C8B | 0C8E | 1C92 | 9C95 | 1C97 | 0C9A | 1C9D | 9C9F | 9CA9 | 1CAB | 1CAE | 0CB2 | 1CB5 | 9CB7 | 1CBA | 9CBD |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A0 | 1CBF | 9CD1 | 1CD3 | 1CD6 | 9CE2 | 1CE5 | 9CE7 | 1CEA | 9CED | 1CEF | 9CF9 | 1CFB | 1CFE | 1D11 | 9D13 | 9D16 |
| A1 | 1D22 | 9D25 | 1D27 | 9D2A | 1D2D | 9D2F | 1D39 | 9D3B | 9D3E | 9D49 | 1D4B | 1D4E | 9D52 | 1D55 | 9D57 | 1D5A |
| A2 | 9D5D | 1D5F | 1D69 | 9D6B | 9D6E | 1D72 | 9D75 | 1D77 | 9D7A | 1D7D | 9D7F | 9D91 | 1D93 | 1D96 | 9DA2 | 1DA5 |
| A3 | 9DA7 | 1DAA | 9DAD | 1DAF | 9DB9 | 1DBB | 1DBE | 1DC9 | 9DCB | 9DCE | 1DD2 | 9DD5 | 1DD7 | 9DDA | 1DDD | 9DDF |
| A4 | 9DE9 | 1DEB | 1DEE | 9DF2 | 1DF9 | 9DF7 | 1DFA | 9DFD | 1DFF | 1E21 | 9E23 | 9E26 | 1E42 | 9E45 | 1E47 | 9E4A |
| A5 | 1E4D | 9E4F | 1E59 | 9E5B | 9E5B | 1E71 | 9E73 | 9E76 | 9E89 | 1E8B | 1E8E | 9E92 | 1E95 | 9E97 | 1E9A | 9E9D |
| A6 | 1E9F | 1EA9 | 9EAB | 9EAE | 1EB2 | 9EB5 | 1EB7 | 9EBA | 1EBD | 9EBF | 1ED1 | 9ED3 | 9ED6 | 1EE2 | 9EE5 | 1EE7 |
| A7 | 9EEA | 1EED | 9EEF | 1EF9 | 9EFB | 9EFE | 9F11 | 1F13 | 1F16 | 9F22 | 1F25 | 9F27 | 1F2A | 9F2D | 1F2F | 9F39 |
| A8 | 1F3B | 1F3E | 1F49 | 9F4B | 9F4E | 1F52 | 9F55 | 1F57 | 9F5A | 1F5D | 9F5F | 9F69 | 1F6B | 1F6E | 9F72 | 1F7D |
| A9 | 9F77 | 1F7A | 9F7D | 1F7F | 1F91 | 9F93 | 9F96 | 1FA2 | 9FA5 | 1FA7 | 9FAA | 1FAD | 9FAF | 1FB9 | 9FBB | 9FBE |
| AA | 9FC9 | 1FCB | 1FCE | 9FD2 | 1FD5 | 9FD7 | 1FDA | 9FDD | 1FDF | 1FE9 | 9FEB | 9FEE | 1FF2 | 9FF5 | 1FF7 | 9FFA |
| AB | 1FFD | 9FFF | 210A | A10D | 210F | A119 | 211B | 211E | A131 | 2133 | 2136 | A161 | 2163 | 2166 | 21C3 | 21C6 |
| AC | 2212 | A215 | 2217 | A21A | 221D | A21F | A229 | 222B | 222E | A232 | 2235 | A237 | 223A | A23D | 223F | A251 |
| AD | 2253 | 2256 | A262 | 2265 | A267 | 226A | A26D | 226F | A279 | 227B | 227E | A2A1 | 22A3 | 22A6 | A2C2 | 22C5 |
| AE | A2C7 | 22CA | A2CD | 22CF | A2D9 | 22DB | 22DE | A2F1 | 22F3 | 22F6 | 2343 | 2346 | 2385 | A387 | 238A | A38D |
| AF | 238F | A399 | 239B | 239E | A3B1 | 23B3 | 23B6 | A3E1 | 23E3 | 23E6 | 2422 | A425 | 2427 | A42A | 242D | A42F |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| B0 | 2439 | A43B | A43E | A449 | 244B | 244E | A452 | 2455 | A457 | 245A | A45D | 245F | 2469 | A46B | A46E | 2472 |
| B1 | A475 | 2477 | A47A | 247D | A47F | A491 | 2493 | 2496 | A4A2 | 24A5 | A4A7 | 24AA | A4AD | 24AF | A4B9 | 24BB |
| B2 | 24BE | 24C9 | A4C8 | A4CE | 24D2 | A4D5 | 24D7 | A4DA | 24DD | A4DF | A4E9 | 24EB | 24EE | A4F2 | 24F5 | A4F7 |
| B3 | 24FA | A4FD | 24FF | A521 | 2523 | 2526 | A542 | 2545 | A547 | 254A | A54D | 254F | A555 | 255B | 255E | A571 |
| B4 | 2573 | 2576 | 2589 | A58B | A58E | 2592 | A595 | 2597 | A59A | 259D | A59F | A5A9 | 25AB | 25AE | A5B2 | 25B5 |
| B5 | A5B7 | 25BA | A58D | 25BF | A5D1 | 25D3 | 25D6 | A5E2 | 25E5 | A5E7 | 25EA | A5ED | 25EF | A5F9 | 25FB | 25FE |
| B6 | 2643 | 2646 | 2685 | A687 | 268A | A68D | 268F | A699 | 269B | 269E | A6B1 | 26B3 | 26B6 | A6E1 | 26E3 | 26E6 |
| B7 | 2709 | A70B | A70E | 2712 | A715 | 2717 | A71A | 271D | A71F | A729 | 272B | 272E | A732 | 2735 | A737 | 273A |
| B8 | A73D | 273F | A751 | 2753 | 2756 | A762 | 2765 | A767 | 276A | A76D | 276F | A779 | 277B | 277E | A7A1 | 27A3 |
| B9 | 27A6 | A7C2 | 27C5 | A7C7 | 27CA | A7CD | 27CF | A7D9 | 27DB | 27DE | A7F1 | 27F3 | 27F6 | 2842 | A845 | 2847 |
| BA | A84A | 284D | A84F | 2859 | A85B | A85E | 2871 | A873 | A876 | A889 | 288B | 288E | A892 | 2895 | A897 | 289A |
| BB | A89D | 289F | 28A9 | A8AB | A8AE | 28B2 | A8B5 | 28B7 | A8BA | 28BD | A8BF | 28D1 | A8D3 | A8D6 | 28E2 | A8E5 |
| BC | 28E7 | A8EA | 28ED | A8EF | 28F9 | A8FB | A8FE | A911 | 2913 | 2916 | A92E | 2925 | A927 | 292A | A92D | 292F |
| BD | A939 | 293B | 293E | 2949 | A94B | A94E | 2952 | A955 | 2957 | A95A | 295D | A95F | A969 | 296B | 296E | A972 |
| BE | 2975 | A977 | 297A | A97D | 297F | 2991 | A993 | A996 | 29A2 | A9A5 | 29A7 | A9AA | 29AD | A9AF | 29B9 | A9BB |
| BF | A9BE | A9C9 | 29CB | 29CE | A9D2 | 29D5 | A9D7 | 29DA | A9DD | 29DF | 29E9 | A9EB | A9EE | 29F2 | A9F5 | 29F7 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| C0 | A9FA | 29FD | A9FF | AA21 | 2A23 | 2A26 | AA42 | 2A45 | AA47 | 2A4A | AA4D | 2A4F | AA55 | 2A5B | 2A5E | AA71 |
| C1 | 2A73 | 2A76 | 2A89 | AA8B | AA8E | 2A92 | AA95 | 2A97 | AA9A | 2A9D | AA9F | AA99 | 2AAB | 2AAE | AAB2 | 2AB5 |
| C2 | AAB7 | 2ABA | AABD | 2ABF | AAD1 | 2AD3 | 2AD0 | AAE2 | 2AE5 | AAE7 | 2AEA | AAAD | 2AEF | AAF9 | 2AFB | 2AFE |
| C3 | 2B11 | AB13 | AB16 | 2B22 | AB25 | 2B27 | AB2A | 2B2D | AB2F | 2B39 | AB3B | AB3E | AB49 | 2B4B | 2B4E | AB52 |
| C4 | 2B55 | AB57 | 2B5A | AB5D | 2B5F | 2B69 | AB6B | AB6E | 2B72 | AB75 | 2B77 | AB7A | 2B7D | AB7F | AB91 | 2B93 |
| C5 | 2B96 | ABA2 | 2BA5 | ABA7 | 2BAA | ABAD | 2BAF | ABB9 | 2BBB | 2BBE | 2BC9 | ABCB | ABCE | 2BD2 | ABD5 | 2BD7 |
| C6 | ABDA | 2BDD | ABDF | ABE9 | 2BEB | 2BEE | ABF2 | 2BF5 | ABF7 | 2BFA | ABFD | 2BFF | 2C43 | 2C46 | 2C85 | AC87 |
| C7 | 2C8A | AC8D | 2C8F | AC99 | 2C9B | 2C9E | ACB1 | 2C83 | 2CB6 | ACE1 | 2CE3 | 2CE6 | 2D09 | AD0B | AD0E | 2D12 |
| C8 | AD15 | 2D17 | AD1A | 2D1D | AD1F | AD29 | 2D2B | 2D2E | AD32 | 2D35 | AD37 | 2D3A | AD3D | 2D3F | AD51 | 2D53 |
| C9 | 2D56 | AD62 | 2D65 | AD67 | 2D6A | AD6D | 2D6F | AD79 | 2D7B | 2D7E | ADA1 | 2DA3 | 2DA6 | ADC2 | 2DC5 | ADC7 |
| CA | 2DCA | ADCD | 2DCF | ADD9 | 2DDB | 2DDE | ADF1 | 2DF3 | 2DF6 | 2E11 | AE13 | AE16 | 2E22 | AE25 | 2E27 | AE2A |
| CB | 2E2D | AE2F | 2E39 | AE3B | AE3E | AE49 | 2E4B | 2E4E | AE52 | 2E55 | AE57 | 2E5A | AE5D | 2E5F | 2E69 | AE6B |
| CC | AE6E | 2E72 | AE75 | 2E77 | AE7A | 2E7D | AE7F | AE91 | 2E93 | 2E96 | AEA2 | 2EA5 | AEA7 | 2EAA | AEAD | 2EAF |
| CD | AE89 | 2EBB | 2EBE | 2EC9 | AECB | AECE | 2EB2 | AED5 | 2ED7 | AEDA | 2EDD | AEDF | AEE9 | 2EEB | 2EEE | AEF2 |
| CE | 2EF5 | AEF7 | 2EFA | AEFD | 2EFF | AF21 | 2F23 | 2F26 | AF42 | 2F45 | AF47 | 2F4A | AF4D | 2F4F | AF59 | 2F5B |
| CF | 2F5E | AF71 | 2F73 | 2F76 | 2F89 | AF8B | AF8E | 2F92 | AF95 | 2F97 | AF9A | 2F9D | AF9F | AFA5 | 2FAB | 2FAE |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| D0 | AFB2 | 2FB5 | AFB7 | 2FBA | AFBD | 2FBF | AFD1 | 2FD3 | 2FD6 | AFE2 | 2FE5 | AFE7 | 2FEA | AFED | 2FEF | AFF9 |
| D1 | 2FFB | 2FFE | B085 | 3087 | 808A | 308D | 808F | 3099 | 809B | 809E | 30B1 | 80B3 | 80B6 | 30E1 | 80E3 | B0E6 |
| D2 | B109 | 310B | 310E | 8112 | 3115 | 8117 | 311A | 811D | 311F | 3129 | 812B | 812E | 3132 | B135 | 3137 | 813A |
| D3 | 313D | 813F | 3151 | 8153 | 8156 | 3162 | 8165 | 3167 | 816A | 316D | 816F | 3179 | 817B | B17E | 31A1 | 81A3 |
| D4 | 81A6 | 31C2 | 81C5 | 31C7 | 81CA | 31CD | 81CF | 31D9 | 81DB | 81DE | 31F1 | 81F3 | 81F6 | B211 | 3213 | 3216 |
| D5 | 8222 | 3225 | 8227 | 322A | 822D | 322F | 8239 | 323B | 323E | 3249 | 824B | 824E | 3252 | B255 | 3257 | 825A |
| D6 | 325D | 825F | 8269 | 326B | 326E | 8272 | 3275 | 8277 | 327A | 827D | 327F | 3291 | 8293 | B296 | 32A2 | 82A5 |
| D7 | 32A7 | 82AA | 32AD | 82AF | 3289 | 82BB | 82BE | 82C9 | 32CB | 32CE | 82D2 | 32D5 | 82D7 | 32DA | 82DD | 32DF |
| D8 | 32E9 | 82EB | 82EE | 32F2 | 82F5 | 32F7 | 82FA | 32FD | 82FF | 3321 | 8323 | 8326 | 3342 | B345 | 3347 | 834A |
| D9 | 334D | 834F | 3359 | 835B | 835E | 3371 | 8373 | 8376 | 8389 | 338B | 338E | 8392 | 3395 | 8397 | 339A | 839D |
| DA | 339F | 33A9 | 83AB | 83AE | 33B2 | 83B5 | 33B7 | 83BA | 33BD | 83BF | 33D1 | 83D3 | 83D6 | 33E2 | 8325 | 33E7 |
| DB | 83EA | 33ED | 83EF | 33F9 | 83FB | 83FE | 8421 | 3423 | 3426 | 8442 | 3445 | 8447 | 344A | B44D | 344F | 8459 |
| DC | 345B | 345E | 8471 | 3473 | 3476 | 3489 | 848B | 848E | 3492 | 8495 | 3497 | 849A | 349D | B49F | 84A9 | 34AB |
| DD | 34AE | 84B2 | 34B5 | 84B7 | 34BA | 84BD | 34BF | 84D1 | 34D3 | 34D6 | 84E2 | 34E5 | 84E7 | 34EA | 84ED | 34EF |
| DE | 84F9 | 34FB | 34FE | 3511 | 8513 | 8516 | 3522 | 8525 | 3527 | 852A | 352D | 852F | 3539 | 853B | 853E | 8549 |
| DF | 354B | 354E | 8552 | 3555 | 8557 | 355A | 855D | 355F | 3569 | 856B | 856E | 3572 | 8575 | 3577 | 857A | 357D |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| E0 | B57F | B591 | 3593 | 3596 | B5A2 | 35A5 | B5A7 | 35AA | B5AD | 35AF | B5BB | 35BB | 35BE | 35C9 | B5CB | B5CE |
| E1 | 35D2 | B5D5 | 35D7 | B5DA | 35DD | B5DF | B5E9 | 35EB | 35EE | B5F2 | 35F5 | B5F7 | 35FA | B5FD | 35FF | 3621 |
| E2 | B623 | B626 | 3642 | B645 | 3647 | B64A | 364D | B64F | 3659 | B65B | B65E | 3671 | B673 | B676 | B689 | 368B |
| E3 | 368E | B692 | 3695 | B697 | 369A | B69D | 369F | 36A9 | B6AB | B6AE | 36B2 | B6B5 | 36B7 | B6BA | 36BD | B6BF |
| E4 | 36D1 | B6D3 | B6D6 | 36E2 | B6B5 | 36E7 | B6EA | 36ED | B6EF | 36F9 | B6FB | B6FE | B711 | 3713 | 3716 | B722 |
| E5 | 3725 | B727 | 372A | B72D | 372F | B739 | 373B | 373E | 3749 | B74B | B74E | 3752 | B755 | 3757 | B75A | 375D |
| E6 | B75F | B769 | 376B | 376B | B772 | 3775 | B777 | 377A | B77D | 377F | 3791 | B793 | B796 | 37A2 | B7A5 | 37A7 |
| E7 | B7AA | 37AD | B7AF | 37B9 | B7BB | B7BE | B7C9 | 37CB | 37CE | B7D2 | 37D5 | B7D7 | 37DA | B7DD | 37DF | 37D9 |
| E8 | B7EB | B7EE | 37F2 | B7F5 | 37F7 | B7FA | 37FD | B7FF | 3843 | 3846 | 3885 | B887 | 38BA | B88D | 388F | B899 |
| E9 | 389B | 389E | B8B1 | 38B3 | 38B6 | B8E1 | 38B3 | 38E6 | 3909 | B90B | B90E | 3912 | B915 | 3917 | B91A | 391D |
| EA | B91F | B929 | 392B | 392E | B932 | 3935 | B937 | 393A | B93D | 393F | B951 | 3953 | 3956 | B962 | 3965 | B967 |
| EB | 396A | B96D | 396F | B979 | 397B | 397E | B9A1 | 39A3 | 39A6 | B9C2 | 39C5 | B9C7 | 39CA | B9CD | 39CF | 39D9 |
| EC | 39DB | 39DE | B9F1 | 39F3 | 39F6 | 3A11 | BA13 | BA16 | 3A22 | BA25 | 3A27 | BA2A | 3A2D | BA2F | 3A39 | BA3B |
| ED | BA32 | BA49 | 3A4B | 3A4E | BA52 | 3A55 | BA57 | 3A5A | BA5D | 3A5F | 3A69 | BA6B | BA6E | 3A72 | BA75 | 3A77 |
| EE | BA7A | 3A7D | BA7F | BA91 | 3A93 | 3A96 | BAA2 | 3AA5 | BAA7 | 3AAA | BAAD | 3AAF | BAB9 | 3ABB | 3ABE | 3AC9 |
| EF | BACB | BACE | 3AD2 | BAD5 | 3AD7 | BADA | 3ADD | BADF | BAE9 | 3AEB | 3AEE | BAF2 | 3AF5 | BAF7 | 3AFA | BAFD |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| F0 | 3AFF | BB21 | 3B23 | 3B26 | BB42 | 3B45 | BB47 | 3B4A | BB4D | 3B4F | BB59 | 3B5B | 3B5E | BB71 | 3B73 | 3B76 |
| F1 | 3B89 | BB8B | BB8E | 3B92 | BB95 | 3B97 | BB9A | 3B9D | BB9F | BBA9 | 3BAB | 3BAE | BBB2 | 3BB5 | BBB7 | 3BBA |
| F2 | BBBD | 3BBF | BBD1 | 3BD3 | 3BD6 | BBE2 | 3BE5 | BBE7 | 3BEA | BBED | 3BEF | BBF9 | 3BFB | 3BFE | 3C21 | BC23 |
| F3 | BC26 | 3C42 | BC45 | 3C47 | BC4A | 3C4D | BC4F | 3C59 | BC5B | BC53 | 3C71 | BC73 | BC76 | BC89 | 3C8B | 3C8E |
| F4 | BC92 | 3C95 | BC97 | 3C9A | BC9D | 3C9F | 3CA9 | BCAB | BCAE | 3CB2 | BCB5 | 3CB7 | BCBA | 3CBD | BCBF | 3CD1 |
| F5 | BCD3 | BCD6 | 3CE2 | BCE5 | 3CE7 | BCDA | 3CED | BCEF | 3CF9 | BCFB | BCFE | BD11 | 3D13 | 3D16 | BD22 | 3D25 |
| F6 | BD27 | 3D2A | BD2D | 3D2F | BD39 | 3D3B | 3D3B | 3D49 | BD48 | BD4E | 3D52 | BD55 | 3D57 | BD5A | 3D5D | BD5F |
| F7 | BD69 | 3D6B | 3D6E | BD72 | 3D75 | BD77 | 3D7A | BD7D | 3D7F | 3D91 | BD93 | BD96 | 3DA2 | BDA5 | 3DA7 | BDAA |
| F8 | 3DAD | BDAF | 3DB9 | BDBB | BDBE | BDC9 | 3DCB | 3DCE | BDD2 | 3DD5 | BDD7 | 3DDA | BDDD | 3DDF | 3DE9 | BDEB |
| F9 | BDEE | 3DF2 | BDF5 | 3DF7 | BDFA | 3DFD | BDFF | BE21 | 3E23 | 3E26 | BE42 | 3E45 | BE47 | 3E4A | BE4D | 3E4F |
| FA | BE59 | 3E5B | 3E5E | BE71 | 3E73 | 3E76 | 3E89 | BE8B | BE8E | 3E92 | BE95 | 3E97 | BE9A | 3E9D | BE9F | BEA9 |
| FB | 3EAB | 3EAE | BEB2 | 3E85 | BEB7 | 3EBA | BEBD | 3EBF | BED1 | 3ED3 | 3ED6 | BEE2 | 3EE5 | BEE7 | 3EEA | BEED |
| FC | 3EEF | BEF9 | 3EFB | 3EFE | 3F11 | BF13 | BF16 | 3F22 | BF25 | 3F27 | BF2A | 3F2D | BF2F | 3F39 | BF3B | BF3E |
| FD | BF49 | 3F4B | 3F4E | BF52 | 3F55 | BF57 | 3F5A | BF5D | 3F5F | 3F69 | BF6B | BF6E | 3F72 | BF75 | 3F77 | BF7A |
| FE | 3F7D | BF7F | BF91 | 3F93 | 3F96 | BFA2 | 3FA5 | BFA7 | 3FAA | BFAD | 3FAF | BFB9 | 3FBB | 3FBE | 3FC9 | BFCB |
| FF | BFCE | 3FD2 | BFD5 | 3FD7 | BFDA | 3FDD | BFDF | BFE9 | 3FEB | 3FEE | BFF2 | 3FF5 | BFF7 | 3FFA | BFFD | 3FFF |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00 | CCB5 | 4CB7 | CCBA | 4CBD | CCBF | 4CD1 | CCD3 | CCD6 | 4CE2 | CCE5 | 4CE7 | CCEA | 4CED | CCEF | 4CF9 | CCFB |
| 01 | CCFE | CD11 | 4D13 | 4D16 | CD22 | 4D25 | CD27 | 4D2A | CD2D | 4D2F | CD39 | 4D3B | 4D3E | 4D49 | CD4B | CD4E |
| 02 | 4D52 | CD55 | 4D57 | CD5A | 4D5D | CD5F | CD69 | 4D6B | 4D66 | CD72 | 4D75 | CD77 | 4D7A | CD7D | 4D7F | 4D91 |
| 03 | CD93 | CD96 | 4DA2 | CDA5 | 4DA7 | CDAA | 4DAD | CDAF | 4DB9 | CDBB | CDBE | CDC9 | 4DCB | 4DCE | CDD2 | 4DD5 |
| 04 | CDD7 | 4DDA | CDDD | 4DDF | 4DEB | CDEB | CDEE | 4DF2 | CDF5 | 4DF7 | CDFA | 4DFD | CDFF | CE21 | 4E23 | 4E26 |
| 05 | CE42 | 4E45 | CE47 | 4E4A | CE4D | 4E4F | CE59 | 4E5B | 4E5E | CE71 | 4E73 | 4E76 | AE89 | CE8B | CE8E | 4E92 |
| 06 | CE95 | 4E97 | CE9A | 4E9D | CE9F | CEA9 | 4EAB | 4EAE | CEB2 | 4EB5 | CEB7 | 4EBA | CEBD | 4EBF | CED1 | 4ED3 |
| 07 | 4ED6 | CEE2 | 4EE5 | CEE7 | 4EEA | CEED | 4EEF | CEF9 | 4EFB | 4EFE | 4F11 | CF13 | CF16 | 4F22 | CF25 | 4F27 |
| 08 | CF2A | 4F2D | CF2F | 4F39 | CF3B | CF3E | CF49 | 4F4B | 4F4E | CF52 | 4F55 | CF57 | 4F5A | CF5D | 4F5F | 4F69 |
| 09 | CF6B | CF6E | 4F72 | CF75 | 4F77 | CF7A | 4F7D | CF7F | CF91 | 4F93 | 4F96 | CFA2 | 4FA5 | CFA7 | 4FAA | CFAD |
| 0A | 4FAF | CFB9 | 4FBB | 4FBB | 4FC9 | CFCB | CFCE | 4FD2 | CFD5 | 4FD7 | CFAA | 4FAD | CFDF | CFE9 | 4FEB | AFEE |
| 0B | CFF2 | 4FF5 | CFF7 | 4FFA | CFFD | 4FFF | 5086 | 510A | D10D | 510F | D119 | 511B | 511E | D131 | 5133 | 5136 |
| 0C | D161 | 5163 | 5166 | 51C3 | 51C6 | 5212 | D215 | 5217 | D21A | 521D | D21F | D229 | 522B | 522E | D232 | 5235 |
| 0D | D237 | 523A | D23D | 523F | D251 | 5253 | 5256 | D262 | 5265 | D267 | 526A | D26D | 526F | D279 | 527B | 527E |
| 0E | D2A1 | 52A3 | 52A6 | D2C2 | 52C5 | D2C7 | 52CA | D2CD | 52CF | D2D9 | 52DB | 52DE | D2F1 | 52F3 | 52F6 | 5343 |
| 0F | 5346 | 5385 | D387 | 538A | D38D | 538F | D399 | 5396 | 539E | D3B1 | 53B3 | 53B6 | D3E1 | 53E3 | 53E6 | 5422 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 10 | D425 | 5427 | D42A | 542D | D42F | 5439 | D43B | D43E | D449 | 544B | 544E | D452 | 5455 | D457 | 545A | D45D |
| 11 | 545F | 5469 | D46B | D46E | 5472 | D475 | 5477 | D47A | 547D | D47F | D491 | 5493 | 5498 | D4A2 | 54A5 | D4A7 |
| 12 | 54AA | D4AD | 54AF | D4B9 | 54BB | 54BE | 54C9 | D4CB | D4CE | 54D2 | D4D5 | 54D7 | D4DA | 54DD | D4DF | D4E9 |
| 13 | 54EB | 54EE | D4F2 | 54F5 | D4F7 | 54FA | D4FD | 54FF | D521 | 5523 | 5526 | D542 | 5545 | D547 | 554A | D54D |
| 14 | 554F | D559 | 555B | 555E | D571 | 5573 | 5576 | 5589 | D58B | D58E | 5592 | D595 | 5597 | D59A | 559D | D59F |
| 15 | D5A9 | 55AB | 55AE | D5B2 | 55B5 | D5B7 | 55BA | D5BD | 558F | D5D1 | 55D3 | 55D6 | D5E2 | 55E5 | D5E7 | 55EA |
| 16 | D5ED | 55EF | D5F9 | 55FB | 55FE | 5643 | 5646 | 5685 | D687 | 568A | D68D | 568F | D699 | 569B | 569E | D6B1 |
| 17 | 56B3 | 56B8 | D6E1 | 56E3 | 56E6 | 5709 | D70B | D70E | 5712 | D715 | 5717 | D71A | 571D | D71F | D729 | 572B |
| 18 | 572E | D732 | 5735 | D737 | 573A | D73D | 573F | D751 | 5753 | 5756 | D762 | 5765 | D767 | 576A | D76D | 576F |
| 19 | D779 | 5778 | 577E | D7A1 | 57A3 | 57A6 | D7C2 | 57C5 | D7C7 | 57CA | D7CD | 57CF | D7D9 | 57DB | 57DE | D7F1 |
| 1A | 57F3 | 57F6 | 5842 | D845 | 5847 | D84A | 584D | D84F | 5859 | D85B | D85E | 5871 | D873 | D876 | D889 | 588B |
| 1B | 588E | D892 | 5895 | D897 | 589A | D89D | 589F | 58A9 | D8AB | D8AE | 58B2 | D8B5 | 5887 | D8BA | 58BD | D8BF |
| 1C | 58D1 | D8D3 | D8D6 | 58E2 | D8E5 | 58E7 | D8EA | 58ED | D8EF | 58F9 | D8FB | D8FE | D911 | 5913 | 5916 | D922 |
| 1D | 5925 | D927 | 592A | D92D | 592F | D939 | 593B | 593E | 5949 | D94B | D94E | 5952 | D955 | 5957 | D95A | 595D |
| 1E | D95F | D969 | 596B | 596E | D972 | 5975 | D977 | 597A | D97D | 597F | 5991 | D993 | D996 | 59A2 | D9A5 | 59A7 |
| 1F | D9AA | 59AD | D9AF | 59B9 | D9BB | D9BE | D9C9 | 59CB | 59CE | D9D2 | 59D5 | D9D7 | 59DA | D9DD | 59DF | 59E9 |

F I g. 43 ( a )

Q' = 1

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 20 | D9EB | D9EE | 59F2 | D9F5 | 59F7 | D9FA | 59FD | D9FF | DA21 | 5A23 | 5A26 | DA42 | 5A45 | DA47 | 5A4A | DA4D |
| 21 | 5A4F | DA59 | 5A5B | 5A5E | DA71 | 5A73 | 5A76 | 5A89 | DA8B | DA8E | 5A92 | DA95 | 5A97 | DA9A | 5A9D | DA9F |
| 22 | DAA9 | 5AAB | 5AAE | DAB2 | 5AB5 | DAB7 | 5ABA | DABD | 5ABF | DAD1 | 5AD3 | 5ADD | DAE2 | 5AE5 | DAE7 | 5AEA |
| 23 | DAED | 5AEF | DAF9 | 5AFB | 5AFE | 5B11 | DB13 | DB16 | 5B22 | DB25 | 5B27 | DB2A | 5B2D | DB2F | 5B39 | DB3B |
| 24 | DB3E | DB49 | 5B4B | 5B4E | DB52 | 5B55 | DB57 | 5B5A | DB5D | 5B5F | 5B69 | DB6B | DB6E | 5B72 | DB75 | 5B77 |
| 25 | DB7A | 5B7D | DB7F | DB91 | 5B93 | 5B96 | DBA2 | 5BA5 | DBA7 | 5BAA | DBAD | 5BAF | DBB9 | 5BBB | 5BBE | 5BC9 |
| 26 | DBCB | DBCE | 5BD2 | DBD5 | 5BD7 | DBDA | 5BDD | DBDF | DBE9 | 5BE8 | 5BEE | DBF2 | 5BF5 | DBF7 | 5BFA | DBFD |
| 27 | 5BFF | 5C43 | 5C46 | 5C85 | DC87 | 5C8A | DCBD | 5C8F | DC99 | 5C9B | 5C9E | DCB1 | 5CB3 | 5CB6 | DCE1 | 5CE3 |
| 28 | 5CE6 | 5D09 | DD0B | DD0E | 5D12 | DD15 | 5D17 | DD1A | 5D1D | DD1F | DD29 | 5D2B | 5D2E | DD32 | 5D35 | DD37 |
| 29 | 5D3A | DD3D | 5D3F | DD51 | 5D53 | 5D56 | DD62 | 5D65 | DD67 | 5D6A | DD6D | 5D6F | DD79 | 5D7B | 5D7E | DDA1 |
| 2A | 5DA3 | 5DA6 | DDC2 | 5DC5 | DDC7 | 5DCA | DDCD | 5DCF | DDD9 | 5DDB | 5DDE | DDF1 | 5DF3 | 5DF6 | 5E11 | DE13 |
| 2B | DE16 | 5E22 | DE25 | 5E27 | DE2A | 5E2D | DE2F | 5E39 | DE3B | DE3E | DE49 | 5E4B | 5E4E | DE52 | 5E55 | DE57 |
| 2C | 5E5A | DE5D | 5E5F | 5E69 | DE6B | DE6E | 5E72 | DE75 | 5E77 | DE7A | 5E7D | DE7F | DE91 | 5E93 | 5E96 | DEA2 |
| 2D | 5EA5 | DEA7 | 5EAA | DEAD | 5EAF | DEB9 | 5EBB | 5EBE | 5EC9 | DECB | DECE | 5ED2 | DED5 | 5ED7 | DEDA | 5EDD |
| 2E | DEDF | DEE9 | 5EEB | 5EEE | DEF2 | 5EF5 | DEF7 | 5EFA | DEFD | 5EFF | DF21 | 5F23 | 5F26 | DF42 | 5F45 | DF47 |
| 2F | 5F4A | DF4D | 5F4F | DF59 | 5F5B | 5F5E | DF71 | 5F73 | 5F76 | 5F89 | DF8B | DF8E | 5F92 | DF95 | 5F97 | DF9A |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 30 | 5F9D | DF9F | DFA9 | 5FAB | 5FAE | DFB2 | 5FB5 | DF67 | 5F6A | DFBD | 5FBF | DFD1 | 5FD3 | 5FD6 | DFE2 | 5FE5 |
| 31 | DFE7 | 5FEA | DFED | 5FEF | DFF9 | 5FFB | 5FFE | E849 | 684B | 684E | E852 | 6855 | E857 | 685A | E85D | 685F |
| 32 | 6869 | E86B | E86E | 6872 | E875 | 6877 | E87A | 687D | E87F | E891 | 6893 | 6896 | E8A2 | 68A5 | E8A7 | 68AA |
| 33 | E8AD | 68AF | E8B9 | 68BB | 68BE | 68C9 | E8CB | E8CE | 68D2 | E8D5 | 68D7 | E8DA | 68DD | E8DF | E8E9 | 68EB |
| 34 | 68EE | E8F2 | 68F5 | E8F7 | 68FA | E8FD | 68FF | E921 | 6923 | 6926 | E942 | 6945 | E947 | 694A | E94D | 694F |
| 35 | E959 | 695B | 698E | E971 | 6973 | 6976 | 6989 | E98B | E98E | 6992 | E995 | 6997 | E99A | 699D | E99F | E9A9 |
| 36 | 69AB | 69AE | E9B2 | 69B5 | E9B7 | 69BA | E9BD | 69BF | E9D1 | 69D3 | 69D6 | E9E2 | 69E5 | E9E7 | 69EA | E9ED |
| 37 | 695F | E9F9 | 69FB | 69FE | 6A43 | 6A46 | 6A85 | EA87 | 6A8A | EA8D | 6A8F | EA99 | 6A9B | 6A9E | EAB1 | 6AD3 |
| 38 | 6AB6 | EAE1 | 6AE3 | 6AE6 | 6B09 | EB0B | EB0E | 6B12 | EB15 | 6B17 | EB1A | 6B1D | EB1F | EB29 | 6B2B | 6B2E |
| 39 | EB32 | 6B35 | EB37 | 6B3A | EB3D | 6B3F | EB51 | 6B53 | 6B56 | EB62 | 6B65 | EB67 | 6B6A | EB6D | 6B6F | EB79 |
| 3A | 6B7B | 6B7E | EBA1 | 6BA3 | 6BA6 | EBC2 | 6BC5 | EBC7 | 6BCA | EBCD | 6BCF | EBD9 | 6BDB | 6BDE | EBF1 | 6BF3 |
| 3B | 6BF6 | 6C86 | 6D0A | ED0D | 6D0F | ED19 | 6D1B | 6D1E | ED31 | 6D33 | 6D36 | ED61 | 6D63 | 6D66 | 6DC3 | 6DC6 |
| 3C | 6E12 | EE15 | 6E17 | EE1A | 6E1D | EE1F | EE29 | 6E2B | 6E2E | EE32 | 6E35 | EE37 | 6E3A | EE3D | 6E3F | EE51 |
| 3D | 6E53 | 6E56 | EE62 | 6E65 | EE67 | 6E6A | EE6D | 6E6F | EE79 | 6E7B | 6E7E | EEA1 | 6EA3 | 6EA6 | EEC2 | 6EC5 |
| 3E | EEC7 | 6ECA | EECD | 6ECF | EED9 | 6EDB | 6EDE | EEF1 | 6EF3 | 6EF6 | 6F43 | 6F46 | 6F85 | EF87 | 6F8A | EF8D |
| 3F | 6F8F | EF99 | 6F9B | 6F9E | EFB1 | 6FB3 | 6FB6 | EFE1 | 6FE3 | 6FE6 | F089 | 708B | 708E | F092 | 7095 | F097 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 40 | 709A | F09D | 709F | 70A9 | F0AB | F0AE | 70B2 | F0B5 | 70B7 | F0BA | 70BD | F0BF | 70D1 | F0D3 | F0D6 | 70E2 |
| 41 | F0E5 | 70E7 | F0EA | 70ED | F0EF | 70F9 | F0FD | F0FE | F111 | 7113 | 7116 | F122 | 7125 | F127 | 712A | F12D |
| 42 | 712F | F139 | 713B | 713E | 7149 | F14B | F14E | 7152 | F155 | 7157 | F15A | 715D | F15F | F169 | 716B | 716E |
| 43 | F172 | 7175 | F177 | 717A | F17D | 717F | 7191 | F193 | F196 | 71A2 | F1A5 | 71A7 | F1AA | 71AD | F1AF | 71B9 |
| 44 | F1BB | F1BE | F1C9 | 71CB | 71CE | F1D2 | 71D5 | F1D7 | 71DA | F1DD | 71DF | 71E9 | F1EB | F1EE | 71F2 | F1F5 |
| 45 | 71F7 | F1FA | 71FD | F1FF | F221 | 7223 | 7226 | F242 | 7245 | F247 | 724A | F24D | 724F | F259 | 725B | 725E |
| 46 | F271 | 7273 | 7276 | 7289 | F28B | F28E | 7292 | F295 | 7297 | F29A | 729D | F29F | F2A9 | 72AB | 72AE | F2B2 |
| 47 | 72B5 | F2B7 | 72BA | F2BD | 72BF | F2D1 | 72D3 | 72D6 | F2E2 | 72E5 | F2E7 | 72EA | F2ED | 72EF | F2F9 | 72FB |
| 48 | 72FE | 7311 | F313 | F316 | 7322 | F325 | 7327 | F32A | 732D | F32F | 7339 | F33B | F33E | F349 | 734B | 734E |
| 49 | F352 | 7355 | F357 | 735A | F35D | 735F | 7369 | F36B | F36E | 7372 | F375 | 7377 | F37A | 737D | F37F | F391 |
| 4A | 7393 | 7396 | F3A2 | 73A5 | F3A7 | 73AA | F3AD | 73AF | F389 | 73BB | 73BE | 73C9 | F3CB | F3CE | 73D2 | F3D5 |
| 4B | 73D7 | F3DA | 73DD | F3DF | F3E9 | 73EB | 73EE | F3F2 | 73F5 | F3F7 | 73FA | F3FD | 73FF | 7443 | 7446 | 7485 |
| 4C | F487 | 748A | F4BD | 748F | F499 | 749B | 749E | F4B1 | 74B3 | 74B6 | F4E1 | 74E3 | 74E6 | 7509 | F50B | F50E |
| 4D | 7512 | F515 | 7517 | F51A | 751D | F51F | F529 | 7522 | 752A | F532 | 7535 | F537 | 753A | F53D | 753F | F551 |
| 4E | 7553 | 7556 | F562 | 7565 | F567 | 756A | F56D | 756F | F579 | 757B | 757E | F5A1 | 75A3 | 75A6 | F5C2 | 75C5 |
| 4F | F5C7 | 75CA | F5CD | 75CF | F5D9 | 75DB | 75DE | F5F1 | 75F3 | 75F6 | 7611 | F613 | F616 | 7622 | F625 | 7627 |

F i g. 44 (b)

Q′ = 1

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 50 | F62A | 762D | F62F | 7639 | F63B | F63E | F649 | 764B | 764E | F652 | 7655 | F657 | 765A | F65D | 765F | 7669 |
| 51 | F66B | F66E | 7672 | F675 | 7677 | F67A | 767D | F67F | F691 | 7693 | 7696 | F6A2 | 76A5 | F6A7 | 76AA | F6AD |
| 52 | 76AF | F6B9 | 76BB | 76BE | 76C9 | F6CB | F6CE | 76D2 | F6D5 | 76D7 | F6DA | 76DD | F6DF | F6E9 | 76EB | 76EE |
| 53 | F6F2 | 76F5 | F6F7 | 76FA | F6FD | 76FF | F721 | 7723 | 7726 | F742 | 7745 | F747 | 774A | F74D | 774F | F759 |
| 54 | 775B | 775E | F771 | 7773 | 7776 | 7789 | F78B | F78E | 7792 | F795 | 7797 | F79A | 779D | F79F | F7A9 | 77AB |
| 55 | 77AE | F7B2 | 77B5 | F7B7 | 77BA | F7BD | 77BF | F7D1 | 77D3 | 77D6 | F7E2 | 77E5 | F7E7 | 77EA | F7ED | 77EF |
| 56 | F7F9 | 77FB | 77FE | 7886 | 790A | F90D | 790F | F915 | 791B | 791E | F931 | 7933 | 7936 | F961 | 7963 | 7966 |
| 57 | 79C3 | 79C6 | 7A12 | FA15 | 7A17 | FA1A | 7A1D | FA1F | FA29 | 7A2B | 7A2E | FA32 | 7A35 | FA37 | 7A3A | FA3D |
| 58 | 7A3F | FA51 | 7A53 | 7A56 | FA62 | 7A65 | FA67 | 7A6A | FA6D | 7A6F | FA79 | 7A7B | 7A7E | FAA1 | 7AA3 | 7AA6 |
| 59 | FAC2 | 7AC5 | FAC7 | 7ACA | FACD | 7ACF | FAD9 | 7ADB | 7ADE | FAF1 | 7AF3 | 7AF6 | 7B43 | 7B46 | 7B85 | FB87 |
| 5A | 7BBA | FB8D | 7B8F | FB99 | 7B9B | 7B9E | FBB1 | 7BB3 | 7BB6 | FBE1 | 7BE3 | 7BE6 | 7C22 | FC25 | 7C27 | FC2A |
| 5B | 7C2D | FC2F | 7C39 | FC3B | FC3E | FC49 | 7C4B | 7C4E | FC52 | 7C55 | FC57 | 7C5A | FC5D | 7C5F | 7C69 | FC6B |
| 5C | FC6E | 7C72 | FC75 | 7C77 | FC7A | 7C7D | FC7F | FC91 | 7C93 | 7C96 | FCA2 | 7CA5 | FCA7 | 7CAA | FCAD | 7CAF |
| 5D | FCB9 | 7CBB | 7CBE | 7CC9 | FCCB | FCCE | 7CD2 | FCD5 | 7CD7 | FCDA | 7CDD | FCDF | FCE9 | 7CEB | 7CEE | FCF2 |
| 5E | 7CF5 | FCF7 | 7CFA | FCFD | 7CFF | FD21 | 7D23 | 7D26 | FD42 | 7D45 | FD47 | 7D4A | FD4D | 7D4F | FD59 | 7D5B |
| 5F | 7D5E | FD71 | 7D73 | 7D76 | 7D89 | FD8B | FD8E | 7D92 | FD95 | 7D97 | FD9A | 7D9D | FD9F | FDA9 | 7DAB | 7DAE |

F I g. 45 ( a )

Q′ = 1

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 60 | FDB2 | 7DB5 | FDB7 | 7DBA | FDBD | 7DBF | FDD1 | 7DD3 | 7DD6 | FDE2 | 7DE5 | FDE7 | 7DEA | FDED | 7DEF | FDF9 |
| 61 | 7DFB | 7DFE | 7E43 | 7E46 | 7E85 | FE87 | 7E8A | FE8D | 7E8F | FE99 | 7E9B | 7E9E | FEB1 | 7EB3 | 7EB6 | FEE1 |
| 62 | 7EE3 | 7EE6 | 7F09 | FF0B | FF0E | 7F12 | FF15 | 7F17 | FF1A | 7F1D | FF1F | FF29 | 7F2B | 7F2E | FF32 | 7F35 |
| 63 | FF37 | 7F3A | FF3D | 7F3F | FF51 | 7F53 | 7F56 | FF62 | 7F65 | FF67 | 7F6A | FF6D | 7F6F | FF79 | 7F7B | 7F7E |
| 64 | FFA1 | 7FA3 | 7FA6 | FFC2 | 7FC5 | FFC7 | 7FCA | FFCD | 7FCF | FFD9 | 7FDB | 7FDE | FFF1 | 7FF3 | 7FF6 | 0842 |
| 65 | 8845 | 0847 | 884A | 084D | 884F | 0859 | 885B | 885E | 0871 | 8873 | 8876 | 8889 | 088B | 088E | 8892 | 0895 |
| 66 | 8897 | 089A | 889D | 089F | 08A9 | 88AB | 88AE | 08B2 | 88B5 | 08B7 | 88BA | 08BD | 88BF | 08D1 | 88D3 | 88D6 |
| 67 | 08E2 | 88E5 | 08E7 | 88EA | 08ED | 88EF | 08F9 | 88FB | 88FE | 8911 | 0913 | 0916 | 8922 | 0925 | 8927 | 092A |
| 68 | 892D | 092F | 8939 | 093B | 093E | 0949 | 894B | 894E | 0952 | 8955 | 0957 | 895A | 095D | 895F | 8969 | 096B |
| 69 | 096E | 8972 | 0975 | 8977 | 097A | 897D | 097F | 0991 | 8993 | 8996 | 09A2 | 89A5 | 09A7 | 89AA | 09AD | 89AF |
| 6A | 09B9 | 99BB | 89BB | 89C9 | 09CB | 09CE | 89D2 | 09D5 | 89D7 | 09DA | 89DD | 09DF | 09E9 | 89EB | 89EE | 09F2 |
| 6B | 89F5 | 09F7 | 89FA | 09FD | 89FF | 8A21 | 0A23 | 0A26 | 8A42 | 0A45 | 8A47 | 0A4A | 8A4D | 0A4F | 8A59 | 0A5B |
| 6C | 0A5E | 8A71 | 0A73 | 0A76 | 0A89 | 8A8B | 8A8E | 0A92 | 8A95 | 0A97 | 8A9A | 0A9D | 8A9F | 8AA9 | 0AA2 | 0AAE |
| 6D | 8AB2 | 0AB5 | 8AB7 | 0ABA | 8ABD | 0ABF | 8AD1 | 0AD3 | 0AD6 | 8AE2 | 0AE5 | 8AE7 | 0AEA | 8AED | 0AEF | 8AF9 |
| 6E | 0AFB | 0AFE | 0B11 | 8B13 | 8B16 | 0B22 | 8B25 | 0B27 | 8B2A | 0B2D | 8B2F | 0B39 | 8B3B | 8B3E | 8B49 | 0B4B |
| 6F | 0B4E | 8B52 | 0B55 | 8B57 | 0B5A | 8B5D | 0B5F | 0B69 | 8B6B | 8B6E | 0B72 | 8B75 | 0B77 | 8B7A | 0B7D | 8B7F |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 70 | 8B91 | 0B93 | 0B96 | 8BA2 | 0BA5 | 8BA7 | 0BAA | 8BAD | 0BAF | 8BB9 | 0BBB | 0BBE | 0BC9 | 8BCB | 8BCE | 0BD2 |
| 71 | 8BD5 | 0BD7 | 8BDA | 0BDD | 8BDF | 8BE9 | 0BEB | 0BEE | 8BF2 | 0BF5 | 8BF7 | 0BFA | 8BFD | 0BFF | 0B43 | 0B46 |
| 72 | 0C85 | 8C87 | 0C8A | 8CBD | 0C8F | 8C99 | 0C9B | 0C9E | 8CB1 | 0CB3 | 0CB6 | 8CE1 | 0CE3 | 0CE6 | 0C09 | 8C0B |
| 73 | 8D0E | 0D12 | 8D15 | 0D17 | 8D1A | 0D1D | 9D1F | 8D29 | 0D2B | 0D2E | 8D32 | 0D35 | 8D37 | 0D3A | 8D3D | 0D3F |
| 74 | 8D51 | 0D53 | 0D56 | 8D62 | 0D65 | 8D67 | 0D6A | 8D6D | 0D6F | 8D79 | 0D7B | 0D7E | 8DA1 | 0DA3 | 0DA6 | 8DC2 |
| 75 | 0DC5 | 8DC7 | 0DCA | 8DCD | 0DCF | 8DD9 | 0DDB | 0DDE | 8DF1 | 0DF3 | 0DF6 | 0E11 | 8E13 | 8E16 | 0E22 | 8E25 |
| 76 | 0E27 | 8E2A | 0E2D | 8E2F | 0E39 | 8E3B | 8E3E | 8E49 | 0E4B | 0E4E | 8E52 | 0E55 | 8E57 | 0E5A | 8E5D | 0E5F |
| 77 | 0E69 | 8E6B | 8E6E | 0E72 | 8E75 | 0E77 | 8E7A | 0E7D | 8E7F | 8E91 | 0E93 | 0E96 | 8EA2 | 0EA5 | 8EA7 | 0EAA |
| 78 | 8EAD | 0EAF | 8EB9 | 0EBB | 0EBE | 0EC9 | 8ECB | 8ECE | 0ED2 | 8ED5 | 0ED7 | 8EDA | 0EDD | 8EDF | 8EE9 | 0EEB |
| 79 | 0EEE | 8EF2 | 0EF5 | 8EF7 | 0EFA | 8EFD | 0EFF | 8E21 | 0F23 | 0F26 | 8F42 | 0F45 | 8F47 | 0F4A | 8F4D | 0F4F |
| 7A | 8F59 | 0F5B | 0F5E | 8F71 | 0F73 | 0F76 | 0F8B | 8F8B | 8F8E | 0F92 | 8F95 | 0F97 | 8F9A | 0F9D | 8F9F | 8FA9 |
| 7B | 0FAB | 0FAE | 8FB2 | 0FB5 | 8FB7 | 0FBA | 8FBD | 0FBF | 8FD1 | 0FD3 | 0FD6 | 8FE2 | 0FE5 | 8FE7 | 0FEA | 8FED |
| 7C | 0FEF | 8FF9 | 0FFB | 0FFE | 9085 | 1087 | 908A | 108D | 908F | 1099 | 909B | 909E | 10B1 | 90B3 | 90B6 | 10E1 |
| 7D | 90E3 | 90E6 | 9109 | 110B | 110E | 9112 | 1115 | 9117 | 111A | 911D | 111F | 1129 | 912B | 912E | 1132 | 9135 |
| 7E | 1137 | 913A | 113D | 913F | 1151 | 9153 | 9156 | 1162 | 9165 | 1167 | 916A | 116D | 916F | 1179 | 917B | 917E |
| 7F | 11A1 | 91A3 | 81A6 | 11C2 | 91C5 | 11C7 | 91CA | 11CD | 91CF | 11D9 | 91DB | 91DE | 11F1 | 91F3 | 91F6 | 9211 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 80 | 1213 | 1216 | 9222 | 1225 | 9227 | 122A | 922D | 122F | 9239 | 123B | 123E | 1249 | 924B | 924E | 1252 | 9255 |
| 81 | 1257 | 925A | 125D | 925F | 9269 | 126B | 126E | 9272 | 1275 | 9277 | 127A | 927D | 127F | 1291 | 9293 | 9296 |
| 82 | 12A2 | 92A5 | 12A7 | 92AA | 12AD | 92AF | 12B0 | 92BB | 92BE | 92C9 | 12CB | 12CE | 92D2 | 12D5 | 92D7 | 12DA |
| 83 | 92DD | 12DF | 12E9 | 92EB | 92EE | 12F2 | 92F5 | 13F7 | 92FA | 12FD | 92FF | 1321 | 9323 | 9326 | 1342 | 9345 |
| 84 | 1347 | 934A | 134D | 934F | 1359 | 935B | 935E | 1371 | 9373 | 9376 | 9389 | 13BB | 138E | 9392 | 1395 | 9397 |
| 85 | 139A | 939D | 139F | 13A9 | 93AB | 93AE | 13B2 | 93B5 | 13B7 | 93BA | 138D | 93BF | 13D1 | 93D3 | 93D6 | 13E2 |
| 86 | 93E5 | 13E7 | 93EE | 13ED | 93EF | 13F9 | 93FB | 94FE | 9421 | 1423 | 1426 | 9442 | 1445 | 9447 | 144A | 944D |
| 87 | 144F | 9459 | 145D | 145E | 9471 | 1473 | 1476 | 1489 | 948B | 948E | 1492 | 9495 | 1497 | 949A | 149D | 949F |
| 88 | 94A9 | 14AB | 14AE | 94B2 | 14B5 | 94B7 | 14BA | 958D | 14BF | 94D1 | 14D3 | 14D6 | 94E2 | 14E5 | 94E7 | 14EA |
| 89 | 94ED | 14EF | 94F9 | 14FB | 14FE | 1511 | 9513 | 9516 | 1522 | 9525 | 1527 | 952A | 152D | 952F | 1539 | 953B |
| 8A | 953E | 9549 | 1548 | 154E | 9552 | 1555 | 9557 | 155A | 955D | 155F | 1569 | 956B | 956E | 1572 | 9575 | 1577 |
| 8B | 957A | 157D | 957F | 9591 | 1593 | 1596 | 95A2 | 15A5 | 95A7 | 15AA | 95AD | 15AF | 95B9 | 15BB | 15BE | 15C9 |
| 8C | 95CB | 95CE | 15D2 | 95D5 | 15D7 | 95DA | 15DD | 95DF | 95A9 | 15EB | 15EE | 95F2 | 15F5 | 95F7 | 15FA | 95FD |
| 8D | 15FF | 1621 | 9623 | 9626 | 1642 | 9645 | 1647 | 964A | 164D | 964F | 1659 | 9658 | 965E | 1671 | 9673 | 9676 |
| 8E | 9689 | 1688 | 168E | 969E | 1695 | 9697 | 169A | 969D | 169F | 16A9 | 96AB | 96AE | 16B2 | 96B5 | 16B7 | 96BA |
| 8F | 16BD | 96B4 | 16D1 | 96D3 | 96D6 | 16E2 | 96E5 | 16E7 | 96EA | 16ED | 96EF | 16F9 | 96FB | 96FE | 9711 | 1713 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 90 | 1716 | 9722 | 1725 | 9727 | 172A | 972D | 172F | 9739 | 173B | 173E | 1749 | 974B | 974E | 1752 | 9755 | 1757 |
| 91 | 975A | 175D | 975F | 9769 | 176B | 176E | 9772 | 1775 | 9777 | 177A | 977D | 177F | 1791 | 9793 | 9796 | 17A2 |
| 92 | 97A5 | 17A7 | 97AA | 17AD | 97AF | 17B9 | 97BB | 97BE | 97C9 | 17CB | 17CE | 97D2 | 17D5 | 97D7 | 17DA | 97DD |
| 93 | 17DF | 17E9 | 97EB | 97EE | 17F2 | 97F5 | 17F7 | 97FA | 17FD | 97FF | 1843 | 18A6 | 1885 | 9887 | 188A | 9B8D |
| 94 | 188F | 9899 | 189B | 189E | 98B1 | 18B3 | 18B6 | 98E1 | 18E3 | 18E6 | 1909 | 990B | 990E | 1912 | 9915 | 1917 |
| 95 | 991A | 191D | 991F | 9929 | 192B | 192E | 9932 | 1935 | 9937 | 193A | 993D | 193F | 9951 | 1953 | 1956 | 9962 |
| 96 | 1965 | 9967 | 196A | 996D | 196F | 9979 | 197B | 197E | 99A1 | 19A3 | 19A6 | 99C2 | 19C5 | 99C7 | 19CA | 99CD |
| 97 | 19CF | 99D9 | 19DB | 19DE | 99F1 | 19F3 | 19F6 | 1A11 | 9A13 | 9A16 | 1A22 | 9A25 | 1A27 | 9A2A | 1A2D | 9A2F |
| 98 | 1A39 | 9A3B | 9A3E | 9A49 | 1A4B | 1A4E | 9A52 | 1A55 | 9A57 | 1A5A | 9A5D | 1A5F | 1A65 | 9A6B | 9A6E | 1A72 |
| 99 | 9A75 | 1A77 | 9A7A | 1A7D | 9A7F | 9A91 | 1A93 | 1A96 | 9AA2 | 1AA5 | 9AA7 | 1AAA | 9AAD | 1AAF | 9AB9 | 1ABB |
| 9A | 1ABE | 1AC9 | 9ACB | 9ACE | 1AD2 | 9AD5 | 1AD7 | 9ADA | 1ADD | 9ADF | 9AE9 | 1AEB | 1AEE | 9AF2 | 1AF5 | 9AF7 |
| 9B | 1AFA | 9AFD | 1AFF | 9B21 | 1B23 | 1B26 | 9B42 | 1B45 | 9B47 | 1B4A | 9B4D | 1B4F | 9B59 | 1B5B | 1B5E | 9B71 |
| 9C | 1B73 | 1B76 | 1B89 | 9BBB | 9B8E | 1B92 | 9B95 | 1B97 | 9B9A | 1B9D | 9B9F | 9BA9 | 1BAB | 1BAE | 9BB2 | 1BB5 |
| 9D | 9BB7 | 1BBA | 9BBD | 1BBF | 9BD1 | 1BD3 | 1BD6 | 9BE2 | 1BE5 | 9BE7 | 1BEA | 9BED | 1BEF | 9BF9 | 1BFB | 1BFE |
| 9E | 1C21 | 9C23 | 9C26 | 1C42 | 9C45 | 1C47 | 9C4A | 1C4D | 9C4F | 1C55 | 9C5B | 9C5E | 1C71 | 9C73 | 9C76 | 9C89 |
| 9F | 1C8B | 1C8E | 9C92 | 1C95 | 9C97 | 1C9A | 9C9D | 1C9F | 1CA9 | 9CAB | 9CAE | 1CB2 | 9CB5 | 1CB7 | 9CBA | 1CBD |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A0 | 9CBF | 1CD1 | 9CD3 | 9CD6 | 1CE2 | 9CE5 | 1CE7 | 9CEA | 1CED | 9CEF | 1CF9 | 9CFB | 9CFE | 9D11 | 1D13 | 1D16 |
| A1 | 9D22 | 1D25 | 9D27 | 1D2A | 9D2D | 1D2F | 9D39 | 1D3B | 1D3E | 1D49 | 9D4B | 9D4E | 1D52 | 9D55 | 1D57 | 9D5A |
| A2 | 1D5D | 9D5F | 9D69 | 1D6B | 1D6E | 9D72 | 1D75 | 9D77 | 1D7A | 9D7D | 1D7F | 1D91 | 9D93 | 9D96 | 1DA2 | 9DA5 |
| A3 | 1DA7 | 9DAA | 1DAD | 9DAF | 1DB9 | 9DBB | 9DBE | 9DC9 | 1DCB | 1DCE | 9DD2 | 1DD5 | 9DD7 | 1DDA | 9DDD | 1DDF |
| A4 | 1DE9 | 9DEB | 9DEE | 1DF2 | 9DF9 | 1DF7 | 9DFA | 1DFD | 9DFF | 9E21 | 1E23 | 1E26 | 9E42 | 1E45 | 9E47 | 1E4A |
| A5 | 9E4D | 1E4F | 9E59 | 1E5B | 1E5B | 9E71 | 1E73 | 1E76 | 1E89 | 9E8B | 9E8E | 1E92 | 9E95 | 1E97 | 9E9A | 1E9D |
| A6 | 9E9F | 9EA9 | 1EAB | 1EAE | 9EB2 | 1EB5 | 9EB7 | 1EBA | 9EBD | 1EBF | 9ED1 | 1ED3 | 1ED6 | 9EE2 | 1EE5 | 9EE7 |
| A7 | 1EEA | 9EED | 1EEF | 9EF9 | 1EFB | 1EFE | 1F11 | 9F13 | 9F16 | 1F22 | 9F25 | 1F27 | 9F2A | 1F2D | 9F2F | 1F39 |
| A8 | 9F3B | 9F3E | 9F49 | 1F4B | 1F4E | 9F52 | 1F55 | 9F57 | 1F5A | 9F5D | 1F5F | 1F69 | 9F6B | 9F6E | 1F72 | 9F7D |
| A9 | 1F77 | 9F7A | 1F7D | 9F7F | 9F91 | 1F93 | 1F96 | 9FA2 | 1FA5 | 9FA7 | 1FAA | 9FAD | 1FAF | 9FB9 | 1FBB | 1FBE |
| AA | 1FC9 | 9FCB | 9FCE | 1FD2 | 9FD5 | 1FD7 | 9FDA | 1FDD | 9FDF | 9FE9 | 1FEB | 1FEE | 9FF2 | 1FF5 | 9FF7 | 1FFA |
| AB | 9FFD | 1FFF | A10A | 210D | A10F | 2119 | A11B | A11E | 2131 | A133 | A136 | 2161 | A163 | A166 | A1C3 | A1C6 |
| AC | A212 | 2215 | A217 | 221A | A21D | 221F | 2229 | A22B | A22E | 2232 | A235 | 2237 | A23A | 223D | A23F | 2251 |
| AD | A253 | A256 | 2262 | A265 | 2267 | A26A | 226D | A26F | 2279 | A27B | A27E | 22A1 | A2A3 | A2A6 | 22C2 | A2C5 |
| AE | 22C7 | A2CA | 22CD | A2CF | 22D9 | A2DB | A2DE | 22F1 | A2F3 | A2F6 | A343 | A346 | A385 | 2387 | A38A | 238D |
| AF | A38F | 2399 | A39B | A39E | 23B1 | A3B3 | A3B6 | 23E1 | A3E3 | A3E6 | A422 | 2425 | A427 | 242A | A42D | 242F |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| B0 | A439 | 243B | 243E | 2449 | A44B | A44E | 2452 | A455 | 2457 | A45A | 245D | A45F | A469 | 246B | 246E | A472 |
| B1 | 2475 | A477 | 247A | A47D | 247F | 2491 | A493 | A496 | 24A2 | A4A5 | 24A7 | A4AA | 24AD | A4AF | 24B9 | A4BB |
| B2 | A4BE | A4C9 | 24C8 | 24CE | A4D2 | 24D5 | A4D7 | 24DA | A4DD | 24DF | 24E9 | A4EB | A4EE | 24F2 | A4F5 | 24F7 |
| B3 | A4FA | 24FD | A4FF | 2521 | A523 | A526 | 2542 | A545 | 2547 | A54A | 254D | A54F | 2555 | A55B | A55E | 2571 |
| B4 | A573 | A576 | A589 | 258B | 258E | A592 | 2595 | A597 | 259A | A59D | 259F | 25A9 | A5AB | A5AE | 25B2 | A5B5 |
| B5 | 25B7 | A5BA | 258D | A5BF | 25D1 | A5D3 | A5D6 | 25E2 | A5E5 | 25E7 | A5EA | 25ED | A5EF | 25F9 | A5FB | A5FE |
| B6 | A643 | A646 | A685 | 2687 | A68A | 268D | A68F | 2699 | A69B | A69E | 26B1 | A6B3 | A6B6 | 26E1 | A6E3 | A6E6 |
| B7 | A709 | 270B | 270E | A712 | 2715 | A717 | 271A | A71D | 271F | 2729 | A72B | A72E | 2732 | A735 | 2737 | A73A |
| B8 | 273D | A73F | 2751 | A753 | A756 | 2762 | A765 | 2767 | A76A | 276D | A76F | 2779 | A77B | A77E | 27A1 | A7A3 |
| B9 | A7A6 | 27C2 | A7C5 | 27C7 | A7CA | 27CD | A7CF | 27D9 | A7DB | A7DE | 27F1 | A7F3 | A7F6 | A842 | 2845 | A847 |
| BA | 284A | A84D | 284F | A859 | 285B | 285E | A871 | 2873 | 2876 | 2889 | A88B | A88E | 2892 | A895 | 2897 | A89A |
| BB | 289D | A89F | A8A9 | 28AB | 28AE | A8B2 | 28B5 | A8B7 | 28BA | A8BD | 28BF | A8D1 | 28D3 | 28D6 | A8E2 | 28E5 |
| BC | A8E7 | 28EA | A8ED | 28EF | A8F9 | 28FB | 28FE | 2911 | A913 | A916 | 292E | A925 | 2927 | A92A | 292D | A92F |
| BD | 2939 | A93B | A93E | A949 | 294B | 294E | A952 | 2955 | A957 | 295A | A95D | 295F | 2969 | A96B | A96E | 2972 |
| BE | A975 | 2977 | A97A | 297D | A97F | A991 | 2993 | 2996 | A9A2 | 29A5 | A9A7 | 29AA | A9AD | 29AF | A9B9 | 29BB |
| BF | 29BE | 29C9 | A9CB | A9CE | 29D2 | A9D5 | 29D7 | A9DA | 29DD | A9DF | A9E9 | 29EB | 29EE | A9F2 | 29F5 | A9F7 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| C0 | 29FA | A9FD | 29FF | 2A21 | AA23 | AA26 | 2A42 | AA45 | 2A47 | AA4A | 2A4D | AA4F | 2A55 | AA5B | AA5E | 2A71 |
| C1 | AA73 | AA76 | AA89 | 2A8B | 2A8E | AA92 | 2A95 | AA97 | 2A9A | AA9D | 2A9F | 2A99 | AAAB | AAAE | 2AB2 | AAB5 |
| C2 | 2AB7 | AABA | 2ABD | AABF | 2AD1 | AAD3 | AAD0 | 2AE2 | AAE5 | 2AE7 | AAEA | 2AAD | AAEF | 2AF9 | AAFB | AAFE |
| C3 | AB11 | 2B13 | 2B16 | AB22 | 2B25 | AB27 | 2B2A | AB2D | 2B2F | AB39 | 2B3B | 2B3E | 2B49 | AB4B | AB4E | 2B52 |
| C4 | AB55 | 2B57 | AB5A | 2B5D | AB5F | AB69 | 2B6B | 2B6E | AB72 | 2B75 | AB77 | 2B7A | AB7D | 2B7F | 2B91 | AB93 |
| C5 | AB96 | 2BA2 | ABA5 | 2BA7 | ABAA | 2BAD | ABAF | 2BB9 | ABBB | ABBE | ABC9 | 2BCB | 2BCE | ABD2 | 2BD5 | ABD7 |
| C6 | 2BDA | ABDD | 2BDF | 2BE9 | ABEB | ABEE | 2BF2 | ABF5 | 2BF7 | ABFA | 2BFD | ABFF | AC43 | AC46 | AC85 | 2C87 |
| C7 | AC8A | 2C8D | AC8F | 2C99 | AC9B | AC9E | 2CB1 | AC83 | ACB6 | 2CE1 | ACE3 | ACE6 | AD09 | 2D0B | 2D0E | AD12 |
| C8 | 2D15 | AD17 | 2D1A | AD1D | 2D1F | 2D29 | AD2B | AD2E | 2D32 | AD35 | 2D37 | AD3A | 2D3D | AD3F | 2D51 | AD53 |
| C9 | AD56 | 2D62 | AD65 | 2D67 | AD6A | 2D6D | AD6F | 2D79 | AD7B | AD7E | 2DA1 | ADA3 | ADA6 | 2DC2 | ADC5 | 2DC7 |
| CA | ADCA | 2DCD | ADCF | 2DD9 | ADDB | ADDE | 2DF1 | ADF3 | ADF6 | AE11 | 2E13 | 2E16 | AE22 | 2E25 | AE27 | 2E2A |
| CB | AE2D | 2E2F | AE39 | 2E3B | 2E3E | 2E49 | AE4B | AE4E | 2E52 | AE55 | 2E57 | AE5A | 2E5D | AE5F | AE69 | 2E6B |
| CC | 2E6E | AE72 | 2E75 | AE77 | 2E7A | AE7D | 2E7F | 2E91 | AE93 | AE96 | 2EA2 | AEA5 | 2EA7 | AEAA | 2EAD | AEAF |
| CD | 2E89 | AEBB | AEBE | AEC9 | 2ECB | 2ECE | AEB2 | 2ED5 | AED7 | 2EDA | AEDD | 2EDF | 2EE9 | AEEB | AEEE | 2EF2 |
| CE | AEF5 | 2EF7 | AEFA | 2EFD | AEFF | 2F21 | AF23 | AF26 | 2F42 | AF45 | 2F47 | AF4A | 2F4D | AF4F | 2F59 | AF5B |
| CF | AF5E | 2F71 | AF73 | AF76 | AF89 | 2F8B | 2F8E | AF92 | 2F95 | AF97 | 2F9A | AF9D | 2F9F | 2FA5 | AFAB | AFAE |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| D0 | 2FB2 | AFB5 | 2FB7 | AFBA | 2FBD | AFBF | 2FD1 | AFD3 | AFD6 | 2FE2 | AFE5 | 2FE7 | AFEA | 2FED | AFEF | 2FF9 |
| D1 | AFFB | AFFE | 3085 | B087 | 308A | B08D | 308F | B099 | 309B | 309E | B0B1 | 30B3 | 30B6 | B0E1 | 30E3 | 30E6 |
| D2 | 3109 | B10B | B10E | 3112 | B115 | 3117 | B11A | 311D | B11F | B129 | 312B | 312E | B132 | 3135 | B137 | 313A |
| D3 | B13D | 313F | B151 | 3153 | 3156 | B162 | 3165 | B167 | 316A | B16D | 316F | B179 | 317B | 317E | B1A1 | 31A3 |
| D4 | 31A6 | B1C2 | 31C5 | B1C7 | 31CA | B1CD | 31CF | B1D9 | 31DB | 31DE | B1F1 | 31F3 | 31F6 | 3211 | B213 | B216 |
| D5 | 3222 | B225 | 3227 | B22A | 322D | B22F | 3239 | B23B | B23E | B249 | 324B | 324E | B252 | 3255 | B257 | 325A |
| D6 | B25D | 325F | 3269 | B26B | B26E | 3272 | B275 | 3277 | B27A | 327D | B27F | B291 | 3293 | 3296 | B2A2 | 32A5 |
| D7 | B2A7 | 32AA | B2AD | 32AF | B289 | 32BB | 32BE | 32C9 | B2CB | B2CE | 32D2 | B2D5 | 32D7 | B2DA | 32DD | B2DF |
| D8 | B2E9 | 32EB | 32EE | B2F2 | 32F5 | B2F7 | 32FA | B2FD | 32FF | B321 | 3323 | 3326 | B342 | 3345 | B347 | 334A |
| D9 | B34D | 334F | B359 | 335B | 335E | B371 | 3373 | 3376 | 3389 | B38B | B38E | 3392 | B395 | 3397 | B39A | 339D |
| DA | B39F | B3A9 | 33AB | 33AE | B3B2 | 33B5 | B3B7 | 33BA | B3BD | 33BF | B3D1 | 33D3 | 33D6 | B3E2 | 3325 | B3E7 |
| DB | 33EA | B3ED | 33EF | B3F9 | 33FB | 33FE | 3421 | B423 | B426 | 3442 | B445 | 3447 | B44A | 344D | B44F | 3459 |
| DC | B45B | B45E | 3471 | B473 | B476 | B489 | 348B | 348E | B492 | 3495 | B497 | 349A | B49D | 349F | 34A9 | B4AB |
| DD | B4AE | 34B2 | B4B5 | 34B7 | B4BA | 34BD | B4BF | 34D1 | B4D3 | B4D6 | 34E2 | B4E5 | 34E7 | B4EA | 34ED | B4EF |
| DE | 34F9 | B4FB | B4FE | B511 | 3513 | 3516 | B522 | 3525 | B527 | 352A | B52D | 352F | B539 | 353B | 353E | 3549 |
| DF | B54B | B54E | 3552 | B555 | 3557 | B55A | 355D | B55F | B569 | 356B | 356E | B572 | 3575 | B577 | 357A | B57D |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| E0 | 357F | 3591 | B593 | B596 | 35A2 | B5A5 | 35A7 | B5AA | 35AD | B5AF | 35BB | B5BB | B5BE | B5C9 | 35CB | 35CE |
| E1 | B5D2 | 35D5 | B5D7 | 35DA | B5DD | 35DF | 35E9 | B5EB | B5EE | 35F2 | B5F5 | 35F7 | B5FA | 35FD | B5FF | B621 |
| E2 | 3623 | 3626 | B642 | 3645 | B647 | 364A | B64D | 364F | B659 | 365B | 365E | B671 | 3673 | 3676 | 3689 | B68B |
| E3 | B68E | 3692 | B695 | 3697 | B69A | 369D | B69F | B6A9 | 36AB | 36AE | B6B2 | 36B5 | B6B7 | 36BA | B6BD | 36BF |
| E4 | B6D1 | 36D3 | 36D6 | B6E2 | 36B5 | B6E7 | 36EA | B6ED | 36EF | B6F9 | 36FB | 36FE | 3711 | B713 | B716 | 3722 |
| E5 | B725 | 3727 | B72A | 372D | B72F | 3739 | B73B | B73E | B749 | 374B | 374E | B752 | 3755 | B757 | 375A | B75D |
| E6 | 375F | 3769 | B76B | B76B | 3772 | B775 | 3777 | B77A | 377D | B77F | B791 | 3793 | 3796 | B7A2 | 37A5 | B7A7 |
| E7 | 37AA | B7AD | 37AF | B7B9 | 37BB | 37BE | 37C9 | B7CB | B7CE | 37D2 | B7D5 | 37D7 | B7DA | 37DD | B7DF | B7D9 |
| E8 | 37EB | 37EE | B7F2 | 37F5 | B7F7 | 37FA | B7FD | 37FF | B843 | B846 | B885 | 3887 | B8BA | 388D | B88F | 3899 |
| E9 | B89B | B89E | 38B1 | B8B3 | B8B6 | 38E1 | B8B3 | B8E6 | B909 | 390B | 390E | B912 | 3915 | B917 | 391A | B91D |
| EA | 391F | 3929 | B92B | B92E | 3932 | B935 | 3937 | B93A | 393D | B93F | 3951 | B953 | B956 | 3962 | B965 | 3967 |
| EB | B96A | 396D | B96F | 3979 | B97B | B97E | 39A1 | B9A3 | B9A6 | 39C2 | B9C5 | 39C7 | B9CA | 39CD | B9CF | 39D9 |
| EC | B9DB | B9DE | 39F1 | B9F3 | B9F6 | BA11 | 3A13 | 3A16 | BA22 | 3A25 | BA27 | 3A2A | BA2D | 3A2F | BA39 | 3A3B |
| ED | 3A32 | 3A49 | BA4B | BA4E | 3A52 | BA55 | 3A57 | BA5A | 3A5D | BA5F | BA69 | 3A6B | 3A6E | BA72 | 3A75 | BA77 |
| EE | 3A7A | BA7D | 3A7F | 3A91 | BA93 | BA96 | 3AA2 | BAA5 | 3AA7 | BAAA | 3AAD | BAAF | 3AB9 | BABB | BABE | BAC9 |
| EF | 3ACB | 3ACE | BAD2 | 3AD5 | BAD7 | 3ADA | BADD | 3ADF | 3AE9 | BAEB | BAEE | 3AF2 | BAF5 | 3AF7 | BAFA | 3AFD |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| F0 | BAFF | 3B21 | BB23 | BB26 | 3B42 | BB45 | 3B47 | BB4A | 3B4D | BB4F | 3B59 | BB5B | BB5E | 3B71 | BB73 | BB76 |
| F1 | BB89 | 3B8B | 3B8E | BB92 | 3B95 | BB97 | 3B9A | BB9D | 3B9F | 3BA9 | BBAB | BBAE | 3BB2 | BBB5 | 3BB7 | BBBA |
| F2 | 3BBD | BBBF | 3BD1 | BBD3 | BBD6 | 3BE2 | 3BE5 | 3BE7 | BBEA | 3BED | BBEF | 3BF9 | BBFB | BBFE | BC21 | 3C23 |
| F3 | 3C26 | BC42 | 3C45 | BC47 | 3C4A | BC4D | 3C4F | BC59 | 3C5B | 3C53 | BC71 | 3C73 | 3C76 | 3C89 | BC8B | BC8E |
| F4 | 3C92 | BC95 | 3C97 | BC9A | 3C9D | BC9F | BCA9 | 3CAB | 3CAE | BCB2 | 3CB5 | BCB7 | 3CBA | BCBD | 3CBF | BCD1 |
| F5 | 3CD3 | 3CD6 | BCE2 | 3CE5 | BCE7 | 3CDA | BCED | 3CEF | BCF9 | 3CFB | 3CFE | 3D11 | BD13 | BD16 | 3D22 | BD25 |
| F6 | 3D27 | BD2A | 3D2D | BD2F | 3D39 | BD3B | BD3B | BD49 | 3D48 | 3D4E | BD52 | 3D55 | BD57 | 3D5A | BD5D | 3D5F |
| F7 | 3D69 | BD6B | BD6E | 3D72 | BD75 | 3D77 | BD7A | 3D7D | BD7F | BD91 | 3D93 | 3D96 | BDA2 | 3DA5 | BDA7 | 3DAA |
| F8 | BDAD | 3DAF | BDB9 | 3DBB | 3DBE | 3DC9 | BDCB | BDCE | 3DD2 | BDD5 | 3DD7 | BDDA | 3DDD | BDDF | BDE9 | 3DEB |
| F9 | 3DEE | BDF2 | 3DF5 | BDF7 | 3DFA | BDFD | 3DFF | 3E21 | BE23 | BE26 | 3E42 | BE45 | 3E47 | BE4A | 3E4D | BE4F |
| FA | 3E59 | BE5B | BE5E | 3E71 | BE73 | BE76 | BE89 | 3E8B | 3E8E | BE92 | 3E95 | BE97 | 3E9A | BE9D | 3E9F | 3EA9 |
| FB | BEAB | BEAE | 3EB2 | BE85 | 3EB7 | BEBA | 3EBD | BEBF | 3ED1 | BED3 | BED6 | 3EE2 | BEE5 | 3EE7 | BEEA | 3EED |
| FC | BEEF | 3EF9 | BEFB | BEFE | BF11 | 3F13 | 3F16 | BF22 | 3F25 | BF27 | 3F2A | BF2D | 3F2F | BF39 | 3F3B | 3F3E |
| FD | 3F49 | BF4B | BF4E | 3F52 | BF55 | 3F57 | BF5A | 3F5D | 2F5F | BF69 | 3F6B | 3F6E | BF72 | 3F75 | BF77 | 3F7A |
| FE | BF7D | 3F7F | 3F91 | BF93 | BF96 | 3FA2 | BFA5 | 3FA7 | 2FAA | 3FAD | BFAF | 3FB9 | BFBB | BFBE | BFC9 | 3FCB |
| FF | 3FCE | BFD2 | 3FD5 | BFD7 | 3FDA | BFDD | 3FDF | 3FE9 | 2FEB | BFEE | 3FF2 | BFF5 | 3FF7 | BFFA | 3FFD | BFFF |

Fig. 51

| | | | | | | | | | | | | | | | | |
|---|---|---|---|---|---|---|---|---|---|---|---|---|---|---|---|---|
| DSV | 0 | 0 | 0 | 0 | 0 | 0 | 0 | 0 | 1 | 1 | 1 | 1 | 1 | 1 | 1 | 1 |
| DSV' | 0 | 0 | 0 | 0 | 1 | 1 | 1 | 1 | 0 | 0 | 0 | 0 | 1 | 1 | 1 | 1 |
| Q' | 0 | 0 | 1 | 1 | 0 | 0 | 1 | 1 | 0 | 0 | 1 | 1 | 0 | 0 | 1 | 1 |
| CDS | 0 | 1 | 0 | 1 | 0 | 1 | 0 | 1 | 0 | 1 | 0 | 1 | 0 | 1 | 0 | 1 |
| Q" | 1 | 0 | 1 | 0 | 0 | 1 | 0 | 1 | 0 | 1 | 0 | 1 | 1 | 0 | 1 | 0 |

Fig. 56

| DATA | Q′ = 0 | | | Q′ = 1 | | |
|---|---|---|---|---|---|---|
| | CODE | CDS | Q | CODE | CDS | Q |
| 00 | 0100010001 | 0 | 1 | 0100010001 | 0 | 0 |
| 01 | 0100010011 | 0 | 0 | 0100010011 | 0 | 1 |
| 02 | 0100010110 | 0 | 0 | 0100010110 | 0 | 1 |
| 03 | 0100100010 | 0 | 1 | 0100100010 | 0 | 0 |
| 04 | 0100100101 | 0 | 0 | 0100100101 | 0 | 1 |
| 05 | 0100100111 | 0 | 1 | 0100100111 | 0 | 0 |
| 06 | 0100101010 | 0 | 0 | 0100101010 | 0 | 1 |
| 07 | 0100101101 | 0 | 1 | 0100101101 | 0 | 0 |
| 08 | 0100101111 | 0 | 0 | 0100101111 | 0 | 1 |
| 09 | 0100111001 | 0 | 1 | 0100111001 | 0 | 0 |
| 0A | 0100111011 | 0 | 0 | 0100111011 | 0 | 1 |
| 0B | 0100111110 | 0 | 0 | 0100111110 | 0 | 1 |
| 0C | 0101001001 | 0 | 0 | 0101001001 | 0 | 1 |
| 0D | 0101001011 | 0 | 1 | 0101001011 | 0 | 0 |
| 0E | 0101001110 | 0 | 1 | 0101001110 | 0 | 0 |
| 0F | 0101010010 | 0 | 0 | 0101010010 | 0 | 1 |
| 10 | 0101010101 | 0 | 1 | 0101010101 | 0 | 0 |
| 11 | 0101010111 | 0 | 0 | 0101010111 | 0 | 1 |
| 12 | 0101011010 | 0 | 1 | 0101011010 | 0 | 0 |
| 13 | 0101011101 | 0 | 0 | 0101011101 | 0 | 1 |
| 14 | 0101011111 | 0 | 1 | 0101011111 | 0 | 0 |
| 15 | 0101101001 | 0 | 1 | 0101101001 | 0 | 0 |
| 16 | 0101101011 | 0 | 0 | 0101101011 | 0 | 1 |
| 17 | 0101101110 | 0 | 0 | 0101101110 | 0 | 1 |
| 18 | 0101110010 | 0 | 1 | 0101110010 | 0 | 0 |
| 19 | 0101110101 | 0 | 0 | 0101110101 | 0 | 1 |
| 1A | 0101110111 | 0 | 1 | 0101110111 | 0 | 0 |
| 1B | 0101111010 | 0 | 0 | 0101111010 | 0 | 1 |
| 1C | 0101111101 | 0 | 1 | 0101111101 | 0 | 0 |
| 1D | 0101111111 | 0 | 0 | 0101111111 | 0 | 1 |
| 1E | 0110010001 | 0 | 0 | 0110010001 | 0 | 1 |
| 1F | 0110010011 | 0 | 1 | 0110010011 | 0 | 0 |
| 20 | 0110010110 | 0 | 1 | 0110010110 | 0 | 0 |
| 21 | 0110100010 | 0 | 0 | 0110100010 | 0 | 1 |
| 22 | 0110100101 | 0 | 1 | 0110100101 | 0 | 0 |
| 23 | 0110100111 | 0 | 0 | 0110100111 | 0 | 1 |
| 24 | 0110101010 | 0 | 1 | 0110101010 | 0 | 0 |
| 25 | 0110101101 | 0 | 0 | 0110101101 | 0 | 1 |
| 26 | 0110101111 | 0 | 1 | 0110101111 | 0 | 0 |
| 27 | 0110111001 | 0 | 0 | 0110111001 | 0 | 1 |
| 28 | 0110111011 | 0 | 1 | 0110111011 | 0 | 0 |
| 29 | 0110111110 | 0 | 1 | 0110111110 | 0 | 0 |
| 2A | 0111001001 | 0 | 1 | 0111001001 | 0 | 0 |
| 2B | 0111001011 | 0 | 0 | 0111001011 | 0 | 1 |
| 2C | 0111001110 | 0 | 0 | 0111001110 | 0 | 1 |
| 2D | 0111010010 | 0 | 1 | 0111010010 | 0 | 0 |
| 2E | 0111010101 | 0 | 0 | 0111010101 | 0 | 1 |
| 2F | 0111010111 | 0 | 1 | 0111010111 | 0 | 0 |

| DATA | Q′ = 0 | | | Q′ = 1 | | |
|---|---|---|---|---|---|---|
| | CODE | CDS | Q | CODE | CDS | Q |
| 30 | 0111011010 | 0 | 0 | 0111011010 | 0 | 1 |
| 31 | 0111011101 | 0 | 1 | 0111011101 | 0 | 0 |
| 32 | 0111011111 | 0 | 0 | 0111011111 | 0 | 1 |
| 33 | 0111101001 | 0 | 0 | 0111101001 | 0 | 1 |
| 34 | 0111101011 | 0 | 1 | 0111101011 | 0 | 0 |
| 35 | 0111101110 | 0 | 1 | 0111101110 | 0 | 0 |
| 36 | 0111110010 | 0 | 0 | 0111110010 | 0 | 1 |
| 37 | 0111110101 | 0 | 1 | 0111110101 | 0 | 0 |
| 38 | 0111110111 | 0 | 0 | 0111110111 | 0 | 1 |
| 39 | 0111111010 | 0 | 1 | 0111111010 | 0 | 1 |
| 3A | 0111111101 | 0 | 0 | 0111111101 | 0 | 1 |
| 3B | 0111111111 | 0 | 1 | 0111111111 | 0 | 0 |
| 3C | 1000111011 | 2 | 1 | 0101000101 | −2 | 0 |
| 3D | 1000111110 | 2 | 1 | 0101000111 | −2 | 1 |
| 3E | 1001001001 | 2 | 1 | 0101001010 | −2 | 0 |
| 3F | 1001001011 | 2 | 0 | 0101001101 | −2 | 1 |
| 40 | 1001001110 | 2 | 0 | 0101001111 | −2 | 0 |
| 41 | 1001010010 | 2 | 1 | 0101011001 | −2 | 1 |
| 42 | 1001010101 | 2 | 0 | 0101011011 | −2 | 0 |
| 43 | 1001010111 | 2 | 1 | 0101011110 | −2 | 0 |
| 44 | 1001011010 | 2 | 0 | 0101110001 | −2 | 1 |
| 45 | 1001011101 | 2 | 1 | 0101110011 | −2 | 0 |
| 46 | 1001011111 | 2 | 0 | 0101110110 | −2 | 0 |
| 47 | 1001101001 | 2 | 0 | 0110001001 | −2 | 0 |
| 48 | 1001101011 | 2 | 1 | 0110001011 | −2 | 1 |
| 49 | 1001101110 | 2 | 1 | 0110001110 | −2 | 1 |
| 4A | 1001110010 | 2 | 0 | 0110010010 | −2 | 0 |
| 4B | 1001110101 | 2 | 1 | 0110010101 | −2 | 1 |
| 4C | 1001110111 | 2 | 0 | 0110010111 | −2 | 0 |
| 4D | 1001111010 | 2 | 1 | 0110011010 | −2 | 1 |
| 4E | 1001111101 | 2 | 0 | 0110011101 | −2 | 0 |
| 4F | 1001111111 | 2 | 1 | 0110011111 | −2 | 1 |
| 50 | 1010010001 | 2 | 1 | 0110101001 | −2 | 1 |
| 51 | 1010010011 | 2 | 0 | 0110101011 | −2 | 0 |
| 52 | 1010010110 | 2 | 0 | 0110101110 | −2 | 0 |
| 53 | 1010100010 | 2 | 1 | 0110110010 | −2 | 1 |
| 54 | 1010100101 | 2 | 0 | 0110110101 | −2 | 0 |
| 55 | 1010100111 | 2 | 1 | 0110110111 | −2 | 1 |
| 56 | 1010101010 | 2 | 0 | 0110111010 | −2 | 0 |
| 57 | 1010101101 | 2 | 1 | 0110111101 | −2 | 1 |
| 58 | 1010101111 | 2 | 0 | 0110111111 | −2 | 0 |
| 59 | 1010111001 | 2 | 1 | 0111010001 | −2 | 1 |
| 5A | 1010111011 | 2 | 0 | 0111010011 | −2 | 0 |
| 5B | 1010111110 | 2 | 0 | 0111010110 | −2 | 0 |
| 5C | 1011001001 | 2 | 0 | 0111100010 | −2 | 1 |
| 5D | 1011001011 | 2 | 1 | 0111100101 | −2 | 0 |
| 5E | 1011001110 | 2 | 1 | 0111100111 | −2 | 1 |
| 5F | 1011010010 | 2 | 0 | 0111101010 | −2 | 0 |

Fig. 57

| DATA | Q′ = 0 | | | Q′ = 1 | | |
|---|---|---|---|---|---|---|
| | CODE | CDS | Q | CODE | CDS | Q |
| 60 | 1011010101 | 2 | 1 | 0111101101 | −2 | 1 |
| 61 | 1011010111 | 2 | 0 | 0111101111 | −2 | 0 |
| 62 | 1011011010 | 2 | 1 | 0111111001 | −2 | 1 |
| 63 | 1011011101 | 2 | 0 | 0111111011 | −2 | 0 |
| 64 | 1011011111 | 2 | 1 | 0111111110 | −2 | 0 |
| 65 | 1011101001 | 2 | 1 | 1001000110 | −2 | 0 |
| 66 | 1011101011 | 2 | 0 | 1010001010 | −2 | 0 |
| 67 | 1011101110 | 2 | 0 | 1010001101 | −2 | 1 |
| 68 | 1011110010 | 2 | 1 | 1010001111 | −2 | 0 |
| 69 | 1011110101 | 2 | 0 | 1010011001 | −2 | 1 |
| 6A | 1011110111 | 2 | 1 | 1010011011 | −2 | 0 |
| 6B | 1011111010 | 2 | 0 | 1010011110 | −2 | 0 |
| 6C | 1011111101 | 2 | 1 | 1010110001 | −2 | 1 |
| 6D | 1011111111 | 2 | 0 | 1010110011 | −2 | 0 |
| 6E | 1100100011 | 2 | 0 | 1010110110 | −2 | 0 |
| 6F | 1100100110 | 2 | 0 | 1011100011 | −2 | 0 |
| 70 | 1101000101 | 2 | 0 | 1011100110 | −2 | 0 |
| 71 | 1101000111 | 2 | 1 | 1100010010 | −2 | 0 |
| 72 | 1101001010 | 2 | 0 | 1100010101 | −2 | 1 |
| 73 | 1101001101 | 2 | 1 | 1100010111 | −2 | 0 |
| 74 | 1101001111 | 2 | 0 | 1100011010 | −2 | 1 |
| 75 | 1101011001 | 2 | 1 | 1100011101 | −2 | 0 |
| 76 | 1101011011 | 2 | 0 | 1100011111 | −2 | 1 |
| 77 | 1101011110 | 2 | 0 | 1100101001 | −2 | 1 |
| 78 | 1101110001 | 2 | 1 | 1100101011 | −2 | 0 |
| 79 | 1101110011 | 2 | 0 | 1100101110 | −2 | 0 |
| 7A | 1101110110 | 2 | 0 | 1100110010 | −2 | 1 |
| 7B | 1110001001 | 2 | 0 | 1100110101 | −2 | 0 |
| 7C | 1110001011 | 2 | 1 | 1100110111 | −2 | 1 |
| 7D | 1110001110 | 2 | 1 | 1100111010 | −2 | 0 |
| 7E | 1110010010 | 2 | 0 | 1100111101 | −2 | 1 |
| 7F | 1110010101 | 2 | 1 | 1100111111 | −2 | 0 |
| 80 | 1110010111 | 2 | 0 | 1101010001 | −2 | 1 |
| 81 | 1110011010 | 2 | 1 | 1101010011 | −2 | 0 |
| 82 | 1110011101 | 2 | 0 | 1101010110 | −2 | 0 |
| 83 | 1110011111 | 2 | 1 | 1101100010 | −2 | 1 |
| 84 | 1110101001 | 2 | 1 | 1101100101 | −2 | 0 |
| 85 | 1110101011 | 2 | 0 | 1101100111 | −2 | 1 |
| 86 | 1110101110 | 2 | 0 | 1101101010 | −2 | 0 |
| 87 | 1110110010 | 2 | 1 | 1101101101 | −2 | 1 |
| 88 | 1110110101 | 2 | 0 | 1101101111 | −2 | 0 |
| 89 | 1110110111 | 2 | 1 | 1101111001 | −2 | 1 |
| 8A | 1110111010 | 2 | 0 | 1101111011 | −2 | 0 |
| 8B | 1110111101 | 2 | 1 | 1101111110 | −2 | 0 |
| 8C | 1110111111 | 2 | 0 | 1110100011 | −2 | 0 |
| 8D | 1111010001 | 2 | 1 | 1110100110 | −2 | 0 |
| 8E | 1111010011 | 2 | 0 | 1111000101 | −2 | 0 |
| 8F | 1111010110 | 2 | 0 | 1111000111 | −2 | 1 |

| DATA | Q′ = 0 | | | Q′ = 1 | | |
|---|---|---|---|---|---|---|
| | CODE | CDS | Q | CODE | CDS | Q |
| 90 | 1111100010 | 2 | 1 | 1111001010 | −2 | 0 |
| 91 | 1111100101 | 2 | 0 | 1111001101 | −2 | 1 |
| 92 | 1111100111 | 2 | 1 | 1111001111 | −2 | 0 |
| 93 | 1111101010 | 2 | 0 | 1111011001 | −2 | 1 |
| 94 | 1111101101 | 2 | 1 | 1111011011 | −2 | 0 |
| 95 | 1111101111 | 2 | 0 | 1111011110 | −2 | 0 |
| 96 | 1111111001 | 2 | 1 | 1111110001 | −2 | 1 |
| 97 | 1111111011 | 2 | 0 | 1111110011 | −2 | 0 |
| 98 | 1111111110 | 2 | 0 | 1111110110 | −2 | 0 |
| 99 | 1000100011 | 0 | 0 | 1000100011 | 0 | 1 |
| 9A | 1000100110 | 0 | 0 | 1000100110 | 0 | 1 |
| 9B | 1001000101 | 0 | 0 | 1001000101 | 0 | 1 |
| 9C | 1001000111 | 0 | 1 | 1001000111 | 0 | 0 |
| 9D | 1001001010 | 0 | 0 | 1001001010 | 0 | 1 |
| 9E | 1001001101 | 0 | 1 | 1001001101 | 0 | 0 |
| 9F | 1001001111 | 0 | 0 | 1001001111 | 0 | 1 |
| A0 | 1001011001 | 0 | 1 | 1001011001 | 0 | 0 |
| A1 | 1001011011 | 0 | 0 | 1001011011 | 0 | 1 |
| A2 | 1001011110 | 0 | 0 | 1001011110 | 0 | 1 |
| A3 | 1001110001 | 0 | 1 | 1001110001 | 0 | 0 |
| A4 | 1001110011 | 0 | 0 | 1001110011 | 0 | 1 |
| A5 | 1001110110 | 0 | 0 | 1001110110 | 0 | 1 |
| A6 | 1010001001 | 0 | 0 | 1010001001 | 0 | 1 |
| A7 | 1010001011 | 0 | 1 | 1010001011 | 0 | 0 |
| A8 | 1010001110 | 0 | 1 | 1010001110 | 0 | 0 |
| A9 | 1010010010 | 0 | 0 | 1010010010 | 0 | 1 |
| AA | 1010010101 | 0 | 1 | 1010010101 | 0 | 0 |
| AB | 1010010111 | 0 | 0 | 1010010111 | 0 | 1 |
| AC | 1010011010 | 0 | 1 | 1010011010 | 0 | 0 |
| AD | 1010011101 | 0 | 0 | 1010011101 | 0 | 1 |
| AE | 1010011111 | 0 | 1 | 1010011111 | 0 | 0 |
| AF | 1010101001 | 0 | 1 | 1010101001 | 0 | 0 |
| B0 | 1010101011 | 0 | 0 | 1010101011 | 0 | 1 |
| B1 | 1010101110 | 0 | 0 | 1010101110 | 0 | 1 |
| B2 | 1010110010 | 0 | 1 | 1010110010 | 0 | 0 |
| B3 | 1010110101 | 0 | 0 | 1010110101 | 0 | 1 |
| B4 | 1010110111 | 0 | 1 | 1010110111 | 0 | 0 |
| B5 | 1010111010 | 0 | 0 | 1010111010 | 0 | 1 |
| B6 | 1010111101 | 0 | 1 | 1010111101 | 0 | 0 |
| B7 | 1010111111 | 0 | 0 | 1010111111 | 0 | 1 |
| B8 | 1011010001 | 0 | 1 | 1011010001 | 0 | 0 |
| B9 | 1011010011 | 0 | 0 | 1011010011 | 0 | 1 |
| BA | 1011010110 | 0 | 0 | 1011010110 | 0 | 1 |
| BB | 1011100010 | 0 | 1 | 1011100010 | 0 | 0 |
| BC | 1011100101 | 0 | 0 | 1011100101 | 0 | 1 |
| BD | 1011100111 | 0 | 1 | 1011100111 | 0 | 0 |
| BE | 1011101010 | 0 | 0 | 1011101010 | 0 | 1 |
| BF | 1011101101 | 0 | 1 | 1011101101 | 0 | 0 |

| DATA | Q′ = 0 | | | Q′ = 1 | | |
|---|---|---|---|---|---|---|
| | CODE | CDS | Q | CODE | CDS | Q |
| C0 | 1011101111 | 0 | 0 | 1011101111 | 0 | 1 |
| C1 | 1011111001 | 0 | 1 | 10111110011 | 0 | 0 |
| C2 | 1011111011 | 0 | 0 | 1011111011 | 0 | 1 |
| C3 | 1011111110 | 0 | 0 | 1011111110 | 0 | 1 |
| C4 | 1100010001 | 0 | 0 | 1100010001 | 0 | 1 |
| C5 | 1100010011 | 0 | 1 | 1100010011 | 0 | 0 |
| C6 | 1100010110 | 0 | 1 | 1100010110 | 0 | 0 |
| C7 | 1100100010 | 0 | 0 | 1100100010 | 0 | 1 |
| C8 | 1100100101 | 0 | 1 | 1100100101 | 0 | 0 |
| C9 | 1100100111 | 0 | 0 | 1100100111 | 0 | 1 |
| CA | 1100101010 | 0 | 1 | 1100101010 | 0 | 0 |
| CB | 1100101101 | 0 | 0 | 1100101101 | 0 | 1 |
| CC | 1100101111 | 0 | 1 | 1100101111 | 0 | 0 |
| CD | 1100111001 | 0 | 0 | 1100111001 | 0 | 1 |
| CE | 1100111011 | 0 | 1 | 1100111011 | 0 | 0 |
| CF | 1100111110 | 0 | 1 | 1100111110 | 0 | 0 |
| D0 | 1101001001 | 0 | 1 | 1101001001 | 0 | 0 |
| D1 | 1101001011 | 0 | 0 | 1101001011 | 0 | 1 |
| D2 | 1101001110 | 0 | 0 | 1101001110 | 0 | 1 |
| D3 | 1101010010 | 0 | 1 | 1101010010 | 0 | 0 |
| D4 | 1101010101 | 0 | 0 | 1101010101 | 0 | 1 |
| D5 | 1101010111 | 0 | 1 | 1101010111 | 0 | 0 |
| D6 | 1101011010 | 0 | 0 | 1101011010 | 0 | 1 |
| D7 | 1101011101 | 0 | 1 | 1101011101 | 0 | 0 |
| D8 | 1101011111 | 0 | 0 | 1101011111 | 0 | 1 |
| D9 | 1101101001 | 0 | 0 | 1101101001 | 0 | 1 |
| DA | 1101101011 | 0 | 1 | 1101101011 | 0 | 0 |
| DB | 1101101110 | 0 | 1 | 1101101110 | 0 | 0 |
| DC | 1101110010 | 0 | 0 | 1101110010 | 0 | 1 |
| DD | 1101110101 | 0 | 1 | 1101110101 | 0 | 0 |
| DE | 1101110111 | 0 | 0 | 1101110111 | 0 | 1 |
| DF | 1101111010 | 0 | 1 | 1101111010 | 0 | 0 |
| E0 | 1101111101 | 0 | 0 | 1101111101 | 0 | 1 |
| E1 | 1101111111 | 0 | 1 | 1101111111 | 0 | 0 |
| E2 | 1110010001 | 0 | 1 | 1110010001 | 0 | 0 |
| E3 | 1110010011 | 0 | 0 | 1110010011 | 0 | 1 |
| E4 | 1110010110 | 0 | 0 | 1110010110 | 0 | 1 |
| E5 | 1110100010 | 0 | 1 | 1110100010 | 0 | 0 |
| E6 | 1110100101 | 0 | 0 | 1110100101 | 0 | 1 |
| E7 | 1110100111 | 0 | 1 | 1110100111 | 0 | 0 |
| E8 | 1110101010 | 0 | 0 | 1110101010 | 0 | 1 |
| E9 | 1110101101 | 0 | 1 | 1110101101 | 0 | 0 |
| EA | 1110101111 | 0 | 0 | 1110101111 | 0 | 1 |
| EB | 1110111001 | 0 | 1 | 1110111001 | 0 | 0 |
| EC | 1110111011 | 0 | 0 | 1110111011 | 0 | 1 |
| ED | 1110111110 | 0 | 0 | 1110111110 | 0 | 1 |
| EE | 1111001001 | 0 | 0 | 1111001001 | 0 | 1 |
| EF | 1111001011 | 0 | 1 | 1111001011 | 0 | 0 |

Fig. 60

| DATA | Q′ = 0 | | | Q′ = 1 | | |
|---|---|---|---|---|---|---|
| | CODE | CDS | Q | CODE | CDS | Q |
| F0 | 1111001110 | 0 | 1 | 1111001110 | 0 | 0 |
| F1 | 1111010010 | 0 | 0 | 1111010010 | 0 | 1 |
| F2 | 1111010101 | 0 | 1 | 1111010101 | 0 | 0 |
| F3 | 1111010111 | 0 | 0 | 1111010111 | 0 | 1 |
| F4 | 1111011010 | 0 | 1 | 1111011010 | 0 | 0 |
| F5 | 1111011101 | 0 | 0 | 1111011101 | 0 | 1 |
| F6 | 1111011111 | 0 | 1 | 1111011111 | 0 | 0 |
| F7 | 1111101001 | 0 | 1 | 1111101001 | 0 | 0 |
| F8 | 1111101011 | 0 | 0 | 1111101011 | 0 | 1 |
| F9 | 1111101110 | 0 | 0 | 1111101110 | 0 | 1 |
| FA | 1111110010 | 0 | 1 | 1111110010 | 0 | 0 |
| FB | 1111110101 | 0 | 0 | 1111110101 | 0 | 1 |
| FC | 1111110111 | 0 | 1 | 1111110111 | 0 | 0 |
| FD | 1111111010 | 0 | 0 | 1111111010 | 0 | 1 |
| FE | 1111111101 | 0 | 1 | 1111111101 | 0 | 0 |
| FF | 1111111111 | 0 | 0 | 1111111111 | 0 | 1 |

Fig. 61

RECORDING/REPRODUCING APPARATUS FOR RECORDING AND REPRODUCING MULTIPLE KINDS OF DIGITAL SIGNALS HAVING DIFFERENT DATA AMOUNTS PER UNIT TIME

This application is a Continuation-in-part of parent application Ser. No. 08/018,403 filed Feb. 17, 1993, abandoned, and entitled "Data Conversion Method and Recording/Reproducing Apparatus Using the Same".

BACKGROUND OF THE INVENTION

1. Field of the Invention

The present invention relates to a data conversion method for converting digital data to signals suitable for the recording system or the transmission channel used when recording or reading the digital data onto or from a magnetic tape, and a recording/reproducing apparatus employing the data conversion method. The present invention further relates to encoding multiple kinds of data and data blocks of different lengths on the tape with a high density.

2. Description of Related Art

Prior art data conversion methods employed in magnetic recording/reproducing apparatus include, for example, an 8/10 modulation method such as disclosed in "THE DAT CONFERENCE STANDARD" (issued June 1987). The 8/10 modulation method is a data conversion method in which digital data is partitioned into datawords of 8 bits each for conversion into 10-bit codewords. FIG. 1 is a circuit block diagram for explaining this data conversion method, and FIG. 2 is a data conversion table used for the same. In FIG. 1, the reference numeral 1 designates an encoder for accepting eight-bit digital data and a one-bit table select signal (Q') at its respective inputs and for outputting a total of 11 bits, i.e. a 10-bit codeword plus a one-bit signal (Q) for selecting the table for the next codeword. Further, the numeral 2 denotes a flip-flop for delaying the codeword table select signal by one dataword. The encoder 1 includes a read-only memory (ROM) or the like which contains the data conversion table shown in FIG. 2, wherein codewords of CDS (Codeword Digital Sum)=0 are mapped on a one-to-one basis to 256 datawords from "OO" to "FF" of hexadecimal numeral while in the case of codewords of CDS=0, pairs of code-words, one with CDS=+2 and the other with CDS=−2, are each mapped to one dataword, the table of Q'=−1 consisting of codewords of CDS=+2 and the table of Q'=+1 consisting of codewords of CDS=−2. The table select signal (Q) is used to select the CDS (the table) having the direction that suppresses the dispersion of charges in the codeword sequence.

The operation of the above circuit will now be explained with reference to the timing diagram of FIG. 3. In FIG. 3, the reference signs (a), (Q), and (b) correspond to inputs/outputs at the respective parts shown in FIG. 1, and the reference signs (c) and (d) respectively represent an output signal from an NRZI converter (not shown) and a DSV (Digital Sum Variation) value at the end of each codeword.

First, an eight-bit dataword "FF" is input to the encoder 1, along with the table select signal (Q')=−1, and consequently, the encoder 1 outputs a 10-bit codeword "1111101010" of CDS=+2 corresponding to "FF" for Q'=−1. At the same time, the table select signal Q=−1 is output for the next codeword. The parallel 10-bit signal is then converted to a serial signal, after which the signal is NRZI-modulated. As a result, the DSV value at the end of the codeword becomes +2.

Next, when "00" is input to the encoder Is the encoder 1 outputs Q=1 together with a 10-bit signal "0101010101" of CDS=0 corresponding to "00" for Q'=−1 which is produced by introducing a one-symbol delay in the previous output Q=−1. As a results the DSV value at the end of the codeword after NRZI modulation remains at +2.

Next, when "11" is input to the encoder 1, the encoder 1 outputs Q=−1 together with a 10-bit signal of CDS=−2 corresponding to "11" for Q'=1. As a result, the DSV value at the end of the codeword after NRZI modulation becomes zero. In this manner, for each eight-bit dataword input to the encoder 1, a codeword to be output is selected from the table of either Q'=−1 or Q'=1 corresponding to the dataword on the basis of the table select signal output previously. The DSV at the end of each codeword after NRZI modulation can only take the value 0, +2 or −2. This means that the DSV dispersion is suppressed, as a result of which DC-free data conversion is realized.

As described above, according to the prior art data conversion method, eight-bit data is converted to a 10-bit codeword of CDS=0 or CDS=+2 or −2, and a DC-free signal is produced with the DSV dispersion suppressed, thereby minimizing intersymbol interference on the transmission channel and thus increasing the recording density per track. However, for recent digital magnetic recording/reproducing apparatus using a rotary head, a recording density as high as several square micrometers per bit is demanded, which necessitates not only increasing the recording density per track but also reducing the track width down to several micrometers. To implement such apparatus, it is highly useful to employ a dynamic tracking following (DTF) control system whereby pilot signals for tracking are recorded on the main track recorded by the rotary head and the playback head is controlled to follow the recorded track curves during playback. When the prior art data conversion method is employed in such apparatus for multiplex recording of the pilot signals, the digital signal spectral distribution has to be obtained down to ultra low frequency ranges although the recorded information signals contain no DC components; the resulting problem is that the pilot signals cause external disturbances, leading to increased errors in the detection of the digital signals.

One possible approach to overcoming the problem of the pilot signals causing external disturbances to the digital signals may be generating pilot signals synchronized to the digital signals. However, the prior art data conversion method is effective only in suppressing the DSV dispersion and is not capable of actively controlling the DSV, and therefore, has the problem that it cannot generate pilot signals synchronized to the digital signals.

FIG. 4 shows a DAT recording format employed in a magnetic recording apparatus using the 8/10 modulation method. As shown, according to the format of FIG. 4, ATF areas for tracking control are provided in each of which pilot signal for tracking control are provided in each of which a pilot signal for tracking control is recorded. Further, FIG. 5 shows a digital VTR recording format which is disclosed in Japanese Patent Application Laid Open No. 3-217179 (1991). As shown, the track is divided into a video data area, an audio data area, a servo pilot area, and a sub code area, the pilot signal being recorded in the servo pilot area only.

According to the above construction of the prior art, it is not possible to control the DSV in such a manner as desired, and a separate area has to be reserved for recording a pilot signal for tracking control. Accordingly, accurate tracking control cannot be realized without increasing the data amount and hence increasing the recording rate, which makes it difficult to achieve high density recording.

In conventional digital magnetic recording/reproducing apparatus typified by the rotaryhead digital audio tape recorder (R-DAT), data to be recorded on tracks for recording/reproducing are divided into blocks of identical block length.

FIG. 54 shows the track format and block format employed into conventional R-DAT. In the figure, part (a) shows the track format, and part (b) shows the block format. Referring to FIG. 54(*a*), the "MAIN DATA" area holds PCM audio data and an error-correcting code associated with the PCM audio data, a total of 128 blocks, each block signal being recorded in accordance with the block format shown in FIG. 5(*b*). In the "SUBCODE" areas near both ends of the track, subcode data containing additional function information, etc. are recorded as two blocks, each block written in accordance with the same block format shown in part (b) as the "MAIN DATA" area, the same data of two blocks being written a total of eight times per track (four times near the head of the track and four times near the end of the track). The MSB bit of the block address data shown in part (b) is used to discriminate between the PCM audio data and the subcode data both recorded in the same block format.

As described above, in the R-DAT, both PCM audio data and subcode data are recorded in the same block format and subjected to the same signal processing.

The conventional magnetic recording/reproducing apparatus is constructed to record data in the format as described above; whether the data to be recorded is the main data such as PCM audio data or the sub data such as additional function information, the data is constructed into data blocks each having the same information capacity, and the signal processing is fundamentally the same whether in recording or reproducing processes. The advantage of this system is that since the same signal processing circuit can be used for both the main data and sub data, the circuit configuration can be made relatively small in size and is easy to design.

In digital magnetic recording/reproducing apparatus for video such as digital VTRs, the recording track needs to be divided into separate areas, as in DAT recording, for recording video data amounting to several tens of megabits per second (Mbps), audio data needing a bandwidth several tens of times smaller (less than 1 Mbps) than the video data, and sub data having an even smaller information rate (about 100 kbps). If each area is to be recorded using a block structure having the same information capacity, the block structure needs to be determined in accordance with the video data having the largest information rate, in order to ensure sufficient coding efficiency. As a result, in the case of the sub data having a small information rate; either several data units must be combined in one block or redundant data must be added to fill the block. In cases where the information rate is small, such as audio data and subcode data, using a product code as an error-correcting code is not advantageous from the viewpoint of coding efficiency. For such data, it is common to construct the system so that error correction is performed using only an inner block error-correcting code (e.g., subcode in DAT recording). In this case, however, if a burst error occurs within a block in decoding, all information would be rendered unreproducible. Such burst data loss may be prevented by appending redundant data to the sub data and dividing it into a plurality of blocks, but this would in turn greatly reduce the information efficiency since the information rate of subcode data is by far smaller than that of video data.

SUMMARY OF THE INVENTION

It is an object of the present invention to provide a data conversion method which, by suppressing low frequency components, can minimize intersymbol interference on the transmission channel, thus permitting increased per-track recording density, as in the prior art data conversion method, and which is capable of generating pilot signals synchronized to digital signals, which has not been possible with the prior art method, and thus achieves increased recording density with reduced track width.

It is another object of the present invention to provide a recording/reproducing apparatus optimized for the data conversion method capable of generating pilot signals synchronized to digital signals.

It is a further object of the present invention to provide a data conversion method which is capable of generating pilot signals for tracking control and which involves hardly any increase in the recording rate and therefore permits high density recording, and a recording/reproducing apparatus using such a data conversion method.

It is a further object of the present invention to reduce the problem of redundant data and coding inefficiency by setting effective and efficient error-correcting codes for video data, main data, and sub data such as sub code data in accordance with their respective information rates, and treat them as different data blocks having different information rates.

It is another object of the invention is to ensure reliable signal processing on these different data blocks by providing a signal processing circuit that performs different synchronization detection operations, etc. on the respective data blocks to separate the blocks.

According to the present invention, there is provided a data conversion method for word-converting an r-bit first dataword to an m-bit second dataword ($r<m$) and converting the word-converted m-bit second dataword to an n-bit codeword ($m<n$), in which, for r/m word-conversion; a sequence of first datawords is divided into groups of x bits where x is the least common multiple of r and m, an arbitrary first dataword selected from x/r groups of first datawords is divided into x/m, and r/(x/m)-bit data obtained by dividing the first dataword into x/m is appended to the LSB (or MSB) side of one or other of the non-divided first datawords to form the m-bit second dataword. The m-bit second dataword can thus be handled as $r+(r/(x/m))$ (or $r/(x/m))+r$). Therefore, if, in m/n conversion, the n-bit codeword is formed by dividing it into n1 and n2 bits, the data conversion can be performed by relating r to n1 and r/(x/m) to n2. This serves to reduce the possibility of error propagation due to a bit error that may occur in reverse data conversion.

Furthermore, when converting the word-converted m-bit second dataword to the n-bit codeword, the number of successive 0s between a bit "1" and the next bit "1" in each n-bit codeword is limited to 4, and two codewords, one with CDS=+1 and the other with CDS=−1, are paired and related to the m-bit second dataword, the two codewords being selectively used in accordance with a DSV control signal. This enables the DSV to be controlled at a desired value for each codeword, thereby achieving spectrum suppression in a relatively low frequency range. Also, by controlling the CDS polarity in accordance with the DSV control signal, a pilot signal of the DSV variation cycle synchronized to digital data can be generated in the low frequency band where the digital data power spectrum exhibits an abrupt drop.

When the above data conversion method is employed in a recording/reproducing apparatus, the number of first datawords to be recorded in a data block, where an error-correcting code and an error-detection code are appended for every synchronizing signal, is set at an integral multiple of x/r. The recording/reproducing apparatus thus constructed achieves an efficient code format that does not require redundant bits.

The recording/reproducing apparatus employing the above data conversion method includes: decoding means for decoding n1 bits in the reproduced n-bit codeword into r bits, the reproduced n-bit codeword being divided into n1 bits and n2 bits for reverse conversion into the m-bit second dataword; decoding means for decoding the n2 bits into r/(x/m) bits; decoding means for decoding the n bits into the m bits; identifying means for identifying the type of bits at prescribed positions in the n-bit codeword and for outputting an identification signal designating the identified type; and means for selecting decoded data from the respective decoding means on the basis of the identification signal supplied form the identifying means and for outputting the decoded second dataword. This construction serves to reduce the possibility of the error propagation that may occur between decoded first datawords due to a single bit random error in the n-bit codeword.

Another recording/reproducing apparatus of the invention includes: means for recording multiple kinds of data in partitioned areas; means for relating 14-bit codewords of CDS=0 and pairs of codewords of CDS=±2 to respective 12-bit datawords when encoding and recording at least one of the multiple kinds of data and for encoding the data by selectively using these codewords; and means for appending one bit to each 14-bit codeword to form a pair of codewords, one with CDS=+1 and the other with CDS=−1, when encoding and recording at least one other of the multiple kinds of data and for encoding the data by selectively using these codewords.

In the above recording/reproducing apparatus, when encoding and recording at least one of the area-partitioned multiple kinds of data, either a 14-bit codeword of CDS=0 or a pair of codewords differing only in MSB, one with CDS=+2 and the other with CDS=−2, are related to one dataword, and the dataword is encoded by selectively using these codewords, thus constructing a DC-free code of Tmin=0.86T and Tmax=4.29T; on the other hand, when encoding and recording at least one other of the multiple kinds of data, one bit is appended to each 14-bit codeword to form a pair of codewords, one with CDS=+1 and the other with CDS=1, and the data is encoded by selectively using these codewords, thus constructing a code that provides the DSV coming round to the same value at prescribed intervals.

According to another embodiment of the present invention, a digital magnetic recording/reproducing apparatus having means for organizing recording data into different blocks having different lengths according to the data amount per unit time and for recording the different blocks on the same track is provided. According to the digital magnetic recording/reproducing apparatus of this embodiment a plurality of blocks having different block lengths that respectively match the data rates of plural kinds of data are constructed and recorded on the same track, thereby achieving effective data recording/reproducing.

According to another embodiment of the present invention, there is provided a digital magnetic recording/reproducing apparatus having means for setting error-correcting codes that match the respective blocks of different lengths and for appending the error-correcting codes to the respective blocks. According to the digital magnetic recording/reproducing apparatus of this embodiment, different error-correcting codes that respectively match the different blocks of different lengths are appended to the respective blocks, thereby providing an efficient error-correction capability for data recording/reproducing.

According to another embodiment of the present invention, there is provided a digital magnetic recording/reproducing apparatus including: means for recording different synchronizing signals for separating the blocks at the heads of the respective blocks of different lengths; means for discriminating between the different blocks of different lengths with the different synchronizing signals; and means for changing the counter value for a ring counter for synchronization protect.

According to the digital magnetic recording/reproducing apparatus of this embodiment, a plurality of different synchronizing signal patterns for separating the different blocks of different lengths are placed at the heads of the respective blocks, and in reproduction, the respective blocks are discriminated from each other on the basis of the plurality of different synchronizing signals detected, and the count value for a ring counter for synchronization protection is changed, thus making it possible to carry out different synchronization operations using a single synchronization protection circuit.

In another embodiment of the invention, the magnetic recording/reproducing apparatus includes: means for recording multiple kinds of data in partitioned areas; means for relating 10-bit codewords of CDS=0 and pairs of codewords of CDS=±2 to respective 8-bit datawords when encoding and recording at least one of the multiple kinds of data and for encoding the data by selectively using these codewords; and means for appending one bit to each 10-bit codeword to form a pair of codewords, one with CDS=+1 and the other with CDS=−1, when encoding and recording at least one other of the multiple kinds of data and for encoding the data by selectively using these codewords. In this embodiment, the magnetic recording/reproducing apparatus, when encoding and recording at least one of the area-partitioned multiple kinds of data, either a 10-bit codeword of CDS=0 or a pair of codewords, one with CDS=+2 and the other with CDS=−2, are related to one dataword, and the dataword is encoded by selectively using these codewords, thus constructing a DC-free code. On the other hand, when encoding and recording at least one other of the multiple kids of data, one bit is appended to each 10-bit codeword to form a pair of codewords, one with CDS=+1 and the other with CDS=−1, and the data is encoded by selectively using these codewords, thus constructing a code that provides the DSV coming round to the same value at prescribed intervals.

The above and further objects and features of the invention will more fully be apparent form the following detailed description with accompanying drawings.

BRIEF DESCRIPTION OF THE DRAWINGS

FIG. 2 is a code conversion table according to a prior art data conversion method.

FIG. 6 is a diagram showing the number of codewords for deriving codewords in accordance with a first embodiment of the invention.

FIG. 7 is a diagram showing a number of codewords for deriving codewords in accordance with a first embodiment of the invention.

FIG. 8 is a diagram for explaining the construction of code conversion tables according to the first embodiment of the invention.

FIG. 9 is a diagram for explaining the construction of code conversion table according to the first embodiment of the invention.

FIG. 10 is a diagram for explaining the construction of code conversion tables according to the first embodiment of the invention.

FIG. 11 is a diagram showing code conversion according to the first embodiment of the invention.

FIG. 12 is a diagram showing code conversion according to the first embodiment of the invention.

FIG. 13 is a diagram showing code conversion according to the first embodiment of the invention.

FIG. 14 is a diagram showing code conversion according to the first embodiment of the invention.

FIG. 15 is a diagram showing code conversion according to the first embodiment of the invention.

FIG. 16 is a diagram showing code conversion according to the first embodiment of the invention.

FIG. 17 is a diagram showing code conversion according to the first embodiment of the invention.

FIG. 18 is a diagram showing code conversion according to the first embodiment of the invention.

FIG. 19 is a diagram showing code conversion according to the first embodiment of the invention.

FIG. 20 is a diagram showing code conversion according to the first embodiment of the invention.

FIG. 21 is a diagram showing code conversion according to the first embodiment of the invention.

FIG. 22 is a diagram showing code conversion according to the first embodiment of the invention.

FIG. 23 is a diagram showing code conversion according to the first embodiment of the invention.

FIG. 24 is a diagram showing code conversion according to the first embodiment of the invention.

FIG. 25 is a diagram showing code conversion according to the first embodiment of the invention.

FIG. 26 is a diagram showing code conversion according to the first embodiment of the invention.

FIG. 28 including

FIG. 33 is a diagram showing classifications for 5-bit LSB codewords in the codewords of the first embodiment.

FIG. 34 including FIGS. 34(A) and 34(B) is a diagram showing code conversion according to a second embodiment of the invention.

FIG. 35 including FIGS. 35(A) and 35(B) is a diagram showing code conversion according to a second embodiment of the invention.

FIG. 36 including FIGS. 36(A) and 36(B) is a diagram showing code conversion according to a second embodiment of the invention.

FIG. 37 including FIGS. 37(A) and 37(B) is a diagram showing code conversion according to a second embodiment of the invention.

FIG. 38 including FIGS. 38(A) and 38(B) is a diagram showing code conversion according to a second embodiment of the invention.

FIG. 39 including FIGS. 39(A) and 39(B) is a diagram showing code conversion according to a second embodiment of the invention.

FIG. 40 including FIGS. 40(A) and 40(B) is a diagram showing code conversion according to a second embodiment of the invention.

FIG. 41 including FIGS. 41(A) and 41(B) is a diagram showing code conversion according to a second embodiment of the invention.

FIG. 42 including FIGS. 42(A) and 42(B) is a diagram showing code conversion according to a second embodiment of the invention.

FIG. 43 including FIGS. 43(A) and 43(B) is a diagram showing code conversion according to a second embodiment of the invention.

FIG. 44 including FIGS. 44(A) and 44(B) is a diagram showing code conversion according to a second embodiment of the invention.

FIG. 45 including FIGS. 45(A) and 45(B) is a diagram showing code conversion according to a second embodiment of the invention.

FIG. 46 including FIGS. 46(A) and 46(B) is a diagram showing code conversion according to a second embodiment of the invention.

FIG. 47 including FIGS. 47(A) and 47(B) is a diagram showing code conversion according to a second embodiment of the invention.

FIG. 48 including FIGS. 48(A) and 48(B) is a diagram showing code conversion according to a second embodiment of the invention.

FIG. 49 including FIGS. 49(A) and 49(B) is a diagram showing code conversion according to a second embodiment of the invention.

FIG. 51 is a diagram showing a code select table according to the second embodiment.

FIG. 52 including

FIGS. 56–61 are code conversion tables in one embodiment of the invention.

DESCRIPTION OF THE PREFERRED EMBODIMENTS

Figure 1:
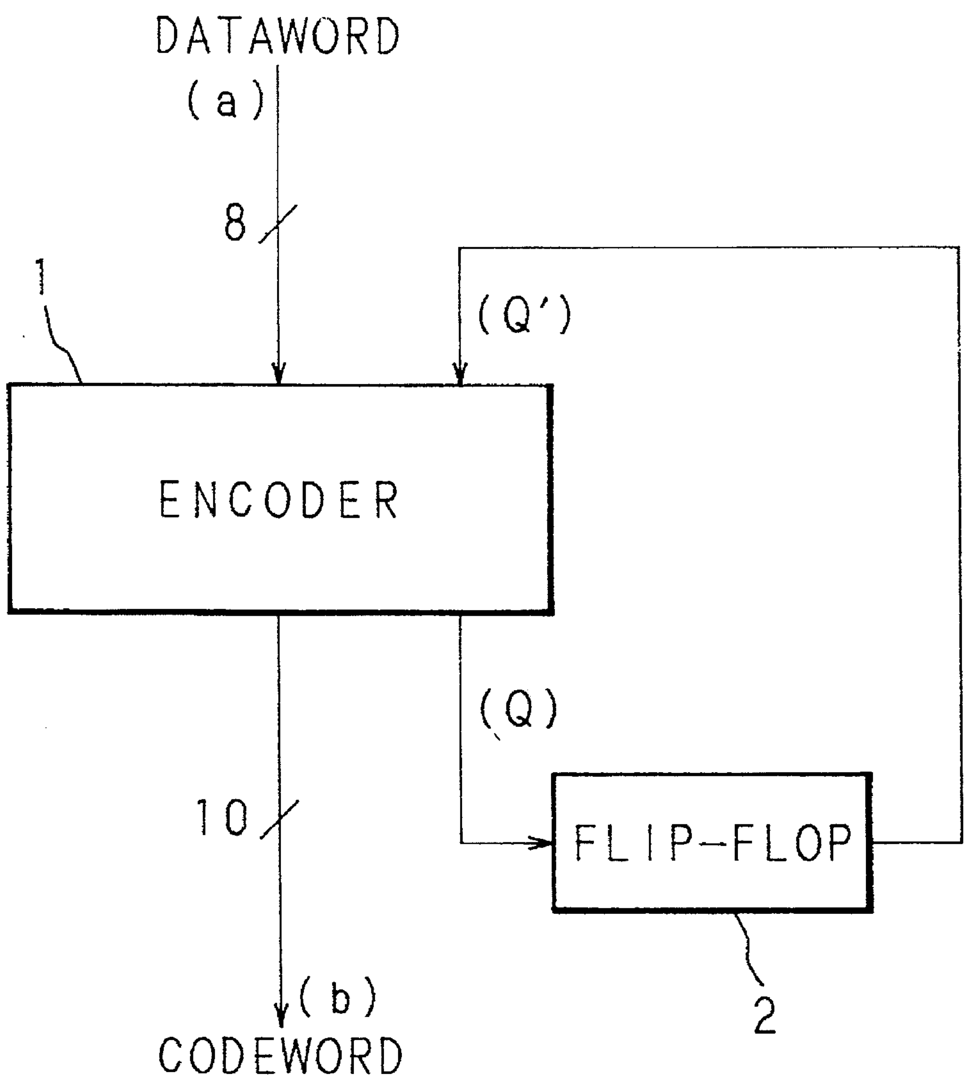
FIG. 1 is a diagram showing the circuit configuration of a prior art data converting apparatus.
Figure 3:
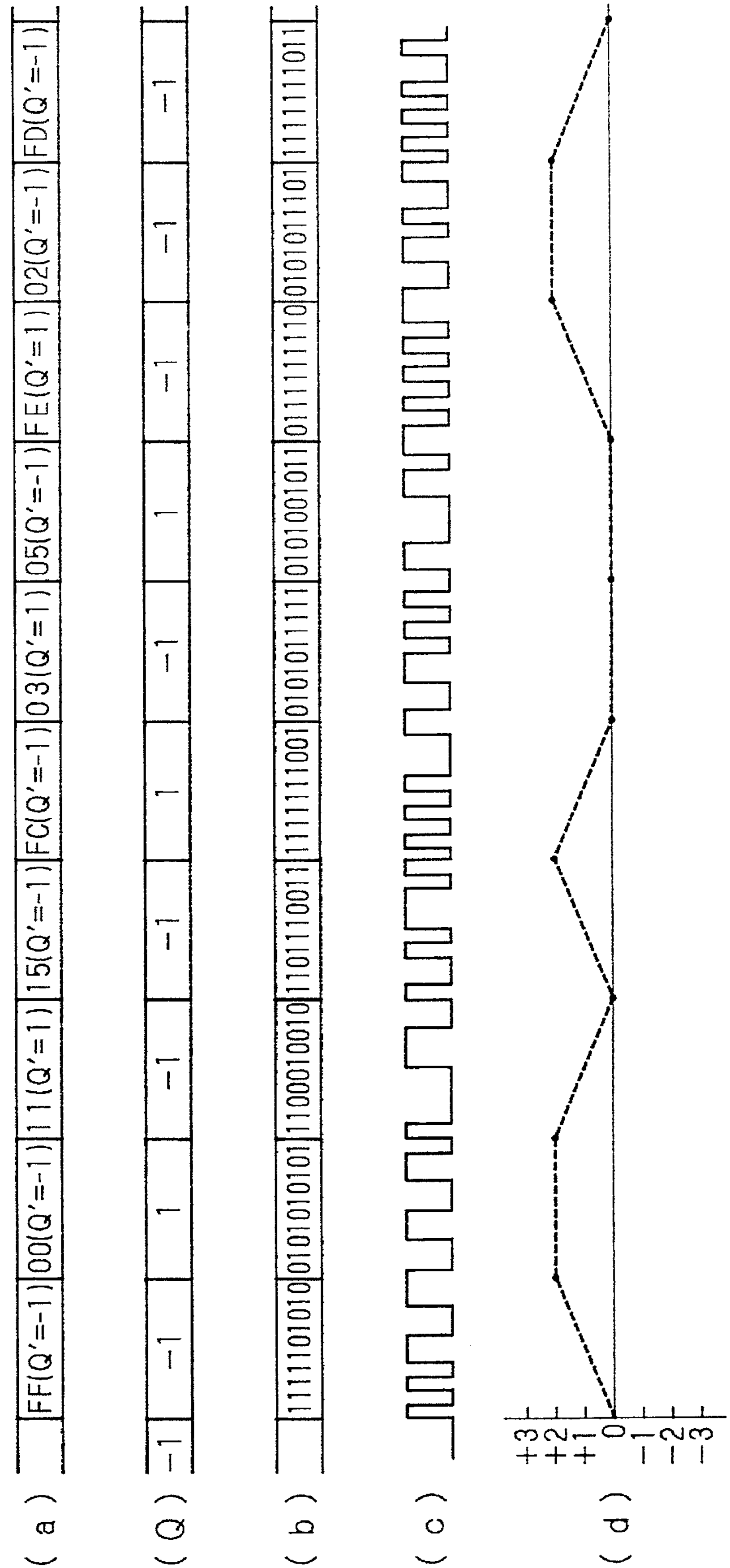
FIG. 3 including representative signal parts (a)–(d) is a diagram for explaining the operation of the data converting apparatus of FIG. 1.
Figure 4:
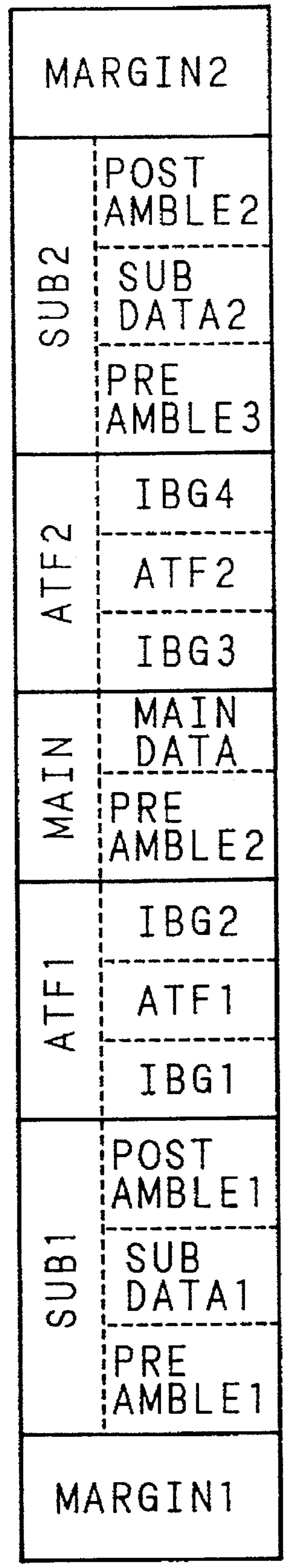
FIG. 4 is a diagram showing a recording format of a prior art DAT.
Figure 5:
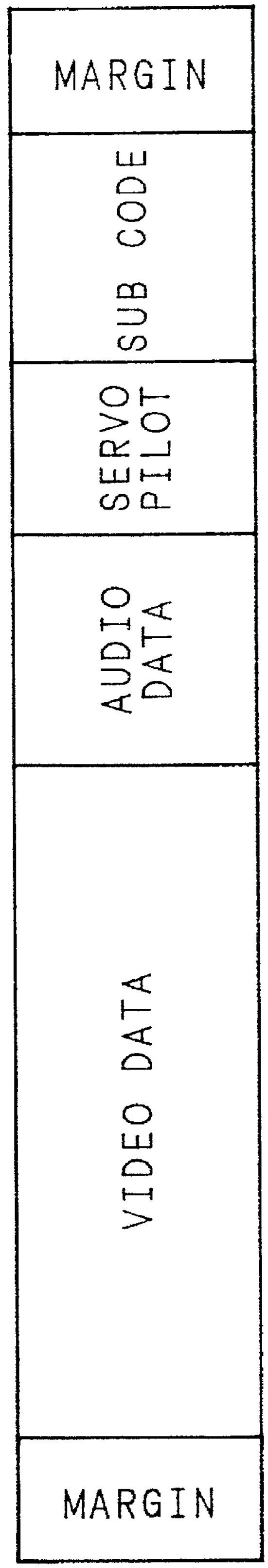
FIG. 5 is a diagram showing a recording format of a prior art digital VTR.

A first embodiment of the invention will now be described below with reference to accompanying drawings.

Now suppose a first dataword length r=8, a word-converted second dataword length m=12, and a data-converted codeword length n=15, to form a code with a modulation parameter Tmax/Tmin=5. At this time, d=0 and k=4, where d is the minimum number of 0s between an arbitrary 1 and the next 1, and k is the maximum number of 0s between an arbitrary 1 and the next 1. The NRZI (F) rule is used to form the code. To achieve such a data conversion, the maximum number of successive 0s in each codeword is limited to 3 on the MSB side, 1 on the LSB side, and 4 within codeword. In this situation, the number of possible codewords having the MSB of 0 and satisfying the 0 run length condition is given in FIG. 6 for each CDS.

To form a DC-free code, $2^{12}$ pairs (4096 pairs) of codewords, each pair having codewords of different CDS polarities, should be provided. The numbers given in FIG. 6 are only for codewords whose MSB is 0; by converting the MSB to 1, codewords of reverse CDS polarity can be obtained while satisfying the 0 run length condition. Accordingly, of the codewords given in FIG. 6, only the codewords of CDS=±1 are enough to satisfy the minimum required number of second datawords=$2^{12}$ (4096<number of codewords=4650). Therefore, by using only the codewords of MSB=0 and CDS=±1 and by setting the MSB to 0 or 1, it is possible to suppress the dispersion of DSV.

FIG. 7 shows possible combinations of codewords n1 and n2 when the codewords of CDS=±1 given in FIG. 6 are each divided into n1=10 bits and n2=5 bits, n1 representing the 10 bits on the MSB side and n2 representing the 5 bits on the LSB side. In FIG. 7, Group A consists of n1 codewords of CDS=0, Group B of n1 codewords of CDS=+2, Group C of n1 codewords of CDS=−2, Group D of n1 codewords of +4, and Group E of n1 codewords of CDS=−4. Each of the codeword groups A to E is subdivided in accordance with the 0 run length at codeword end resulting from the concatenation of the codewords n1 and n2.

First, we focus our attention on Group A. It can be seen that there are 18 different n2 codewords that can be paired with A1 while, of the 18 codewords, 17 codewords excluding the codeword "02" can also be paired with A2. Therefore, for Group A, 16 codewords, excluding the codewords "02" and "05", are used, and m=12 bits are divided into m1=8 bits and m2=4 bits at the time of m/n conversion, to realize m1/n1 (8/10) conversion and m2/n2 (4/5) conversion, respectively. This coding technique serves to avoid propagation of errors between divided codewords at the time of decoding. To utilize this property, when 8-bit first datawords of length (r) supplied from an error-correcting circuit are word-converted to 12-bit second datawords of length (m), four bits separated from the eight bits are mapped to m2, while non-divided 8 bits are mapped to m1. As a result, when a random error occurred to one bit in n bits during the reconstruction process, the error occurring to the first dataword after decoding is limited only to one dataword; the error is thus prevented from propagating between datawords.

In the first embodiment, 1s and 0s used to represent one-bit signals are binary numbers, a 1 representing a high level and a 0 a low level. On the other hand, "0" to "F" used to represent datawords, codewords, or parallel data bit sequences are hexadecimal numbers.

If the above coding method is provided in 256 pairs, a single bit error in n bits during the reconstruction process can be prevented from propagating between first datawords after decoding. However, as is apparent from FIG. 7, under the condition that satisfies the modulation parameter of the data conversion method of the first embodiment, the above coding method can be applied only to Group A, and cannot be applied to the other Groups B to E.

In view of the above situation, we now consider a method of coding, as shown in FIGS. 8 to 10 wherein the m1/n1, m2/n2 coding method is divided into three major coding groups, i.e. the first coding group consisting only of Group A codewords corresponding to the first datawords m1="00" to "73", the second coding group consisting of Group B and Group C codewords corresponding to the first datawords m1="74" to "BA", and the third coding group consisting of the codewords in the other groups as well as the remaining codewords in Group B and Group C corresponding to the first datawords m1="BB" to "FF".

First, referring to the first coding group of FIG. 8 which consists only of Group A codewords, if an error occurred to one bit in n bits in the reconstruction process, the error occurring to the first dataword after decoding is limited only to one dataword and is thus prevented from propagating between datawords.

Next, in the second coding group shown in FIG. 9, there is provided a one-to-one correspondence for the m2/n2 conversion, but for the m1/n1 conversion, two n1 codewords are mapped to one m1. Therefore, of the encoded 15 bits, if the 10 bits mapped to n1 contains a single bit error, the error occurring to the first dataword after decoding is limited only to one dataword and is thus prevented from propagating between datawords. However, if there is an error in one bit out of the five bits mapped to n2, error propagation can occur between first datawords after decoding from the probability point of view.

Further, in the third encoding group shown in FIG. 10, one m1 is mapped to a plurality of n1 codewords for the m1/n1 conversion, while for the m2/n2 conversions a plurality of m2 codewords are mapped to one n2. Therefore, any one bit error can cause error propagation between first datawords after decoding from the probability point of view whether the error is in n1 or n2.

In the data conversion method wherein an 8-bit first dataword is word-converted to a 12-bit second dataword which is further converted to a 15-bit codeword, the above coding method has the effect of reducing the possibility of error propagation that may occur between first datawords after decoding due to a single bit detection error in the encoded 15 bits.

Code conversion tables thus constructed are shown in FIGS. 11 to 26. The numbers given in FIGS. 11 to 26 represent binary digital signals in hexadecimal notation; "0" to "F" in the uppermost row each correspond to the four bits on the LSB side of a 12-bit input codeword, and "00" to "FF" in the leftmost column each correspond to the eight bits on the MSB side of a 12-bit input codeword, each row and column intersection "XXXX" forming the resulting 16-bit codeword. For example, when a 12-bit dataword "15A" is input, a codeword "9539" is obtained from the intersection between the row of "15" and the column of "A" (see FIG. 12). For a 12-bit input codeword (the second codeword), the resulting codeword consists of 16 bits, of which the MSB corresponds to a Q signal ("1" for a high level and "0" for a low level, representing the end level of an NRZI-modulated codeword when the MSB of the premodulation codeword is "0"), the 15th bit represented the CDS information ("1" for +1 and "0" for −1), and the remaining bits from the 14th bit to the LSB correspond to the bits from the 14th bit to the LSB of the 15-bit codeword to be NRZI-modulated. For the m/n (12/15) data conversion, the codeword output is selected as 16 bits because the codeword MSB control is performed by comparing the CDS information of the codeword to be converted with the end level of the previous NRZI-modulated codeword on the basis of a DSV control signal of 50% duty cycle derived by further dividing the data conversion rate signal.

Figure 27:
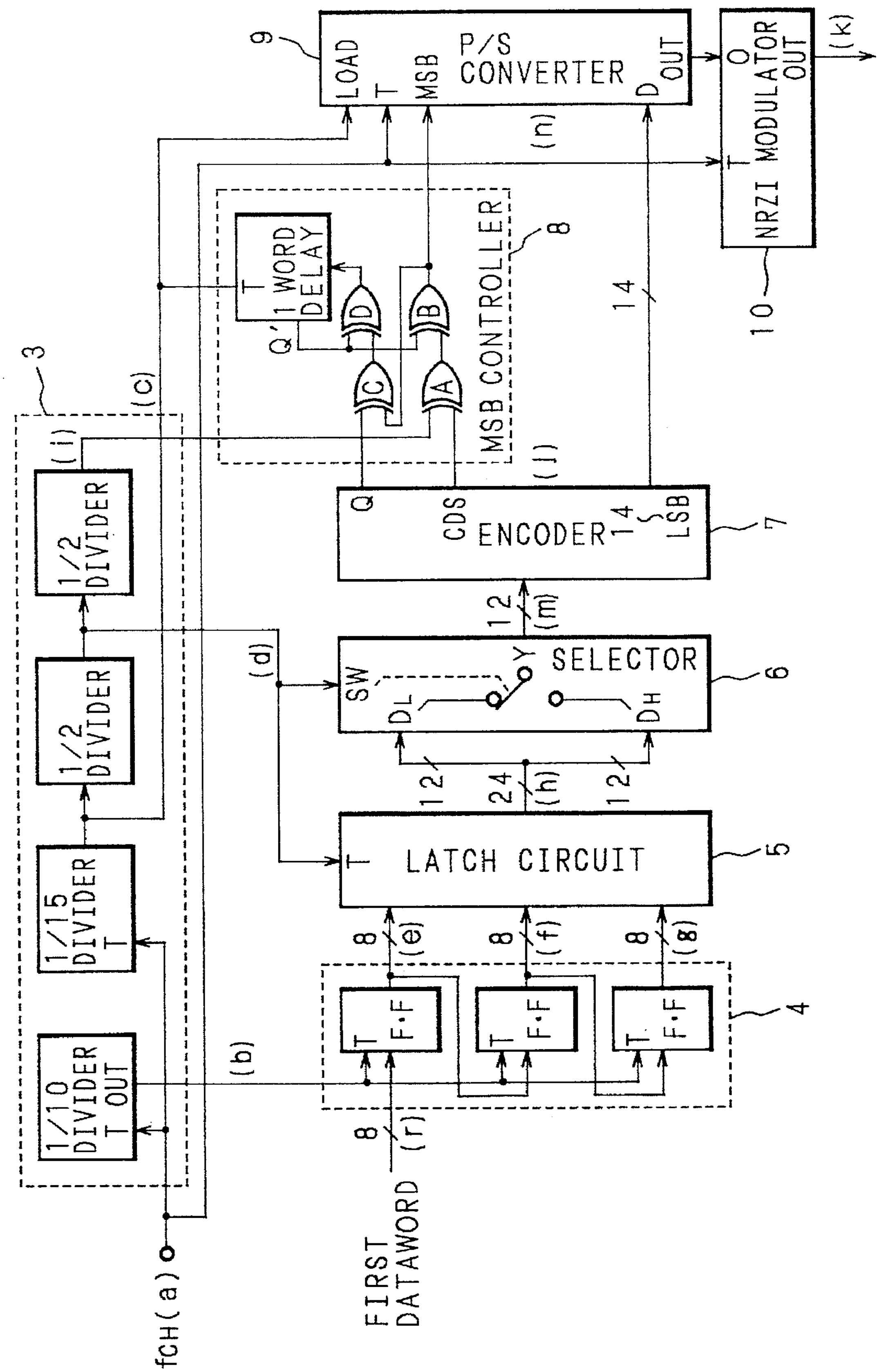
FIG. 27 is a diagram showing the circuit configuration of a data converting apparatus for implementing the code conversion method of the first embodiment.

FIG. 27 is a diagram showing an example of a circuit configuration implementing the first embodiment. The reference numeral 3 designates a clock generator circuit which generates, from a channel clock for transmitting a data-converted code, a symbol clock of fCH/10 for transmitting a first codeword (r), a clock (fMW/2) of fCH/30 (a value obtained by multiplying 24, the least common multiple of r and m, by n/m (10/8)) for word-converting the first dataword to the second dataword, a clock (fMW) for parallel-transmitting a converted n-bit codeword, and a DSV control signal (i) for determining the variation frequency of DSV.

The numeral 4 is a shift register constructed from three stages of flip-flops (F-F) for transmitting 8-bit first datawords in parallel at the symbol clock (fsym); 5 is a latch circuit that latches at the clock (fMW/2) the 24-bit parallel signal output from the Shift register 4; 6 is a selector for word-converting the first datawords of 3 bytes to two second datawords by using the clock (fMW/2) as a select switch; 7 is an encoder for data-converting each 12-bit dataword to a codeword selected from the tables shown in FIGS. 11 to 26; and 8 is an MSB controller for outputting the MSB of the codeword in accordance with the Q and CDS information supplied from the encoder 7 and the DSV control signal (i) supplied from the clock generator circuit 3, the MSB controller 8 having four EXOR circuits, A to D, and a one-word delay for delaying the end level of the previous NRZI-modulated codeword by one encoding cycle by using the clock (fMW). Further, the numeral 9 designates a parallel/serial converter for loading the encoded 15-bit parallel signal at the clock (fMW) and for converting the parallel signal to a serial signal which is transmitted at the channel clock (fCH), and the numeral 10 indicates an NRZI modulator for causing state inversion (high to low and low to high transitions) when signal "1" is input.

Figure 28A:
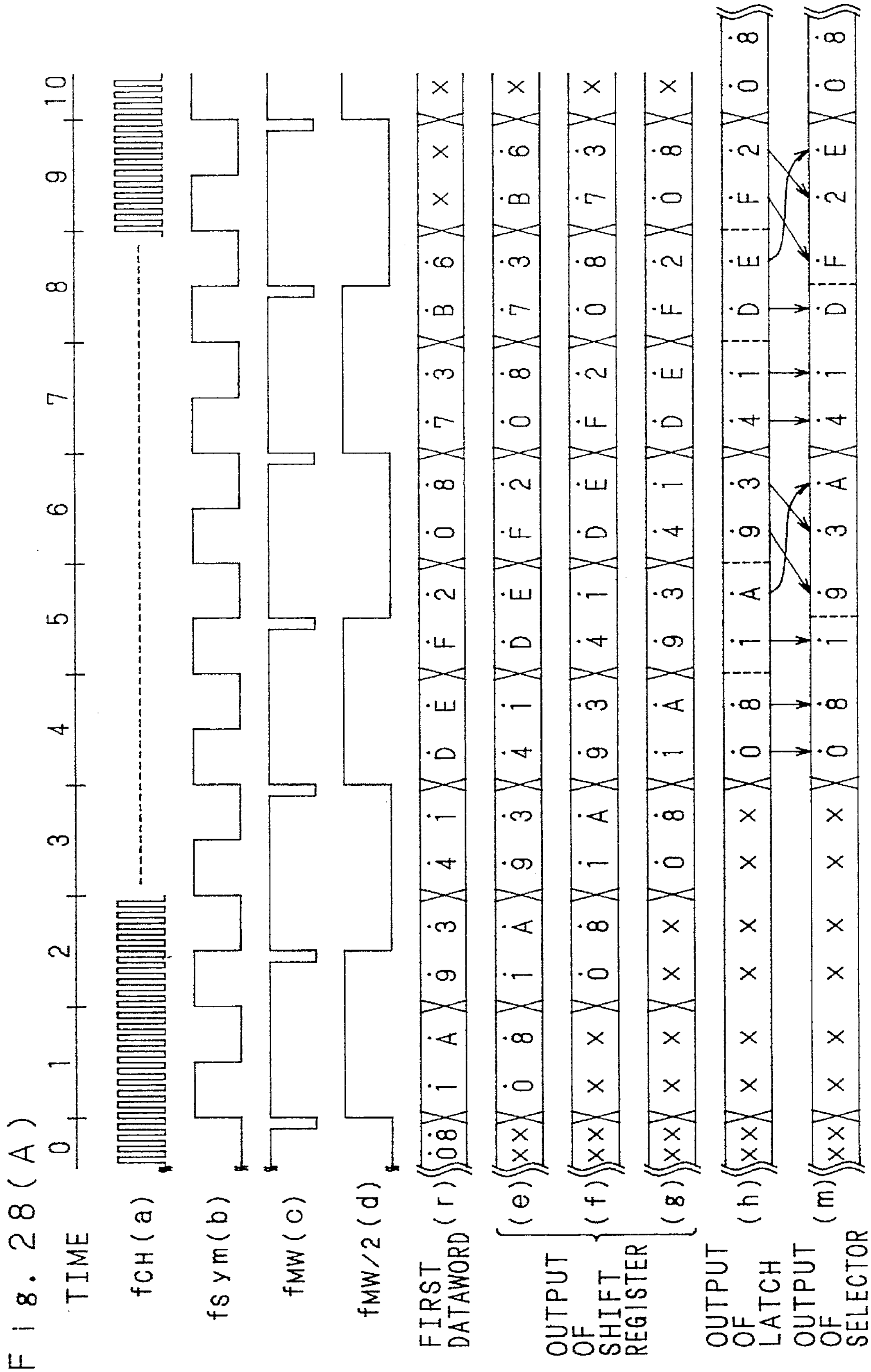
FIGS. 28(A) and 28(B) is a diagram for explaining the operation of the data converting apparatus of FIG. 27.
Figure 28B:
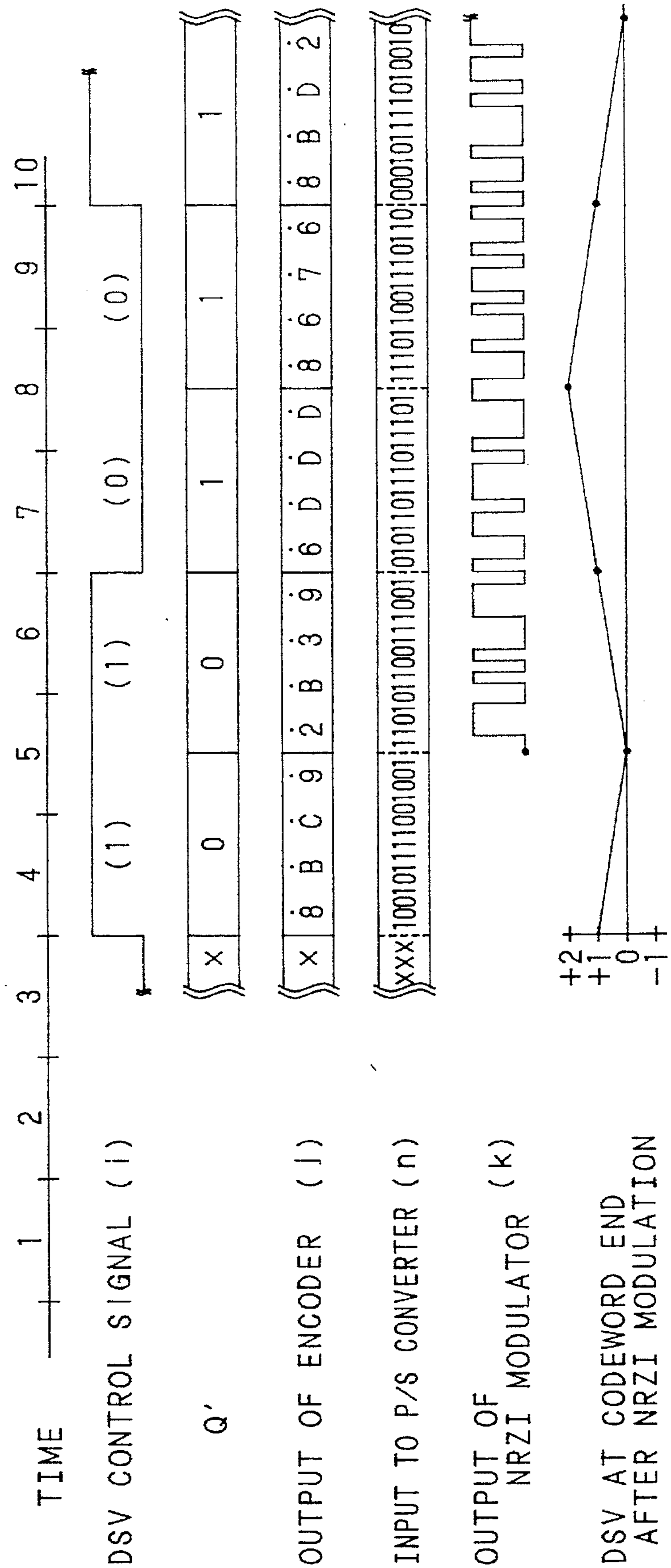

FIG. 28 is a timing diagram for explaining the operation of the circuit shown in FIG. 27. The reference signs (a) to (k), (m), (n), and (r) correspond to the respective points designated by the same signs appearing at the inputs/outputs of the respective circuit sections.

The operation of the circuit will now be described in detail. 8-bit first datawords (r) fed from an error-correcting circuit section are shifted at the symbol clock (fsym) into and along the shift register 4 and are output as a 3-byte or 24-bit parallel signal. The 24-bit parallel signal is latched by the latch circuit 5 at the clock (fMW/2) of three-symbol cycle. That is, three bytes of signals "08", "1A", and "93" are latched by the latch circuit 5 at the rising edge, between times 3 and 4, of the clock (fMW/2) shown in FIG. 28. Of the three bytes of parallel signals, the first byte (8 bits) is input to DH11–DH4 of the selector 6, and the four bits of "1" on the MSB side of the second byte are input to DH3–DH0 of the selector 6. Further, the last byte (8 bits) "93" is input to DL11–DL4 of the selector 6, and the four bits of "A" on the LSB side of the second byte are input to DH3–DH0, respectively. As a result, between time 4 and the first half of time 5 in FIG. 28, the selector 6 outputs a 12-bit parallel signal "081". Between the second half of time 5 and time 6, the selector 6 outputs a 12-bit parallel signal "93A".

With the above operation, the three 8-bit first datawords "08", "1A", and "93" are word-converted to two 12-bit second datawords, "081" and "93A", by dividing the second byte of the first dataword into two and appending the respective halves to the LSBs of the first and third bytes of the first dataword. Likewise, the three bytes of the first dataword, "41", "DE", and "F2", latched by the latch circuit 5 at the rising edge, between times 6 and 7, of the clock (fMW/2) in FIG. 28, are word-converted by the selector 6 to two second datawords "41D" and "F2E".

Next, we will describe in detail the operation for converting the 12-bit second datawords to 15-bit codewords. For the convenience of explanation, it is assumed that, at time 4 in FIG. 28, the output Q' of the one-word delay in the MSB controller 8 is low, and that the DSV value for the codeword sequence up to the converted second dataword immediately preceding "081" is 0.

In this condition, when the second dataword "081" is input to the encoder 7 during the period from time 4 to the first half of time 5, the encoder 7 outputs a signal, 8BC9, in accordance with the conversion tables shown in FIGS. 11 to 26, the signal having a total of 16 bits, i.e. a codeword formed from the LSB to the 14th bit and the CDS signal and Q signal, one bit each, associated with the codeword. To describe the contents of the signal, of the four bits "1000" corresponding to "8", the MSB represents the Q signal, "0" for a low level and "1" for a high level. Further, of "1000" corresponding to "8", the bit immediately preceding the MSB represents the CDS signal for the codeword, indicating CDS=−1 and a low level and "1" indicating CDS=+1 and a high level. The remaining two bits of the "1000" corresponding to "8", plus the 12 bits "BC9", a total of 14 bits, constitute the data-converted codeword which has 14 bits of "00101111001001" from the 14th bit to the LSB.

Of the signals thus created, the Q signal and the CDS signal are input, along with the DSV control signal (i), to the MSB controller 8 which then determines and outputs the MSB of the codeword in accordance with the operation hereinafter described. The DSV control signal (i) is set at "1" (high level) if the DSV is to be dispersed in the positive direction and at "0" (low level) if the DSV is to be dispersed in the negative direction. In the present embodiment, the DSV control signal is set at a high level for the duration of times 4, 5, and 6 and at a low level for the duration of times 7, 8, and 9, so that the CDS is controlled to give +1 for encoding the second datawords "081" and "93A" and −1 for encoding the second datawords "41D" and "F2E".

The operation of the MSB controller 8 will now be described in detail. First, using the EXOR circuit A, it is checked whether the CDS value of the codeword currently output agrees with the direction in which the DSV is to be dispersed; if they agree, a 0 is output, and if they do not agree, a 1 is output, thereby making the CDS value of the codeword agree with the dispersing direction of the DSV. Note, however, that the above output condition is based on the assumption that encoding is performed with the start point of the codeword at a low level at the time of NRZI modulation. Also note that the MSB needs to be determined by referencing the Q' signal (a 0 for a low level and a 1 for a high level) indicating the end level of the previous NRZI-modulated codeword. The output of the EXOR circuit A and the Q' signal are both input to the EXOR circuit B, and when the Q' signal is "0" (indicating that the NRZI-modulated word level at the end of the previous codeword is low), the output level of the EXOR circuit A appears unchanged at the output of the EXOR circuit B. On the other hand, when the Q' signal is "1" (indicating that the NRZI-modulated word level at the end of the previous codeword is high), since the polarity of the CDS of the codeword is inverted after NRZI modulation, the output level of the EXOR circuit A appears inverted at the output of the EXOR circuit B, The output of the EXOR circuit B is supplied as the MSB of the codeword to the parallel/serial converter 9.

To describe the above operation as applied to the present embodiment, when the second dataword "081" is input to the encoder 7, the CDS signal output from the encoder 7 is "0", and the DSV control signal (i) is at a high level ("1") that causes the DSV to disperse in the positive direction, as can be seen from FIG. 28, so that the EXOR circuit A outputs a high level signal ("1"). At this time, the Q' signal that indicates the end level of the previous NRZI-modulated codeword is at a low level ("0"), so that the EXOR circuit B outputs a as the MSB of the codeword.

As a result, a 15-bit parallel signal "1001011101" is loaded into the parallel/serial converter 9 in the middle of time 5 when the clock (fMW) goes low. The loaded bits are then output serially at the channel clock (fCH) from the parallel/serial converter 9 to form a code sequence with the MSB at the top of the sequence. The code sequence output from the parallel/serial converter 9 is fed to the NRZI modulator 10 where the polarity of the signal is inverted each time a "1" is input, the resulting signal being shown in FIG. 28(*k*). Here, with +1 as a high level and −1 as a low level, the CDS can be calculated as +1, which indicates that the DSV of the code sequence is in the positive dispersing direction.

With the above operation, the 12-bit dataword is data-converted to the 15-bit codeword in accordance with the DSV control signal, but it is further necessary to check the end level of the NRZI-modulated codeword, as previously described. This is accomplished by the following operation.

The Q signal from the encoder 7 and the MSB signal from the EXOR circuit B are input to the EXOR circuit C in the MSB controller 8. When the MSB is "0", the Q signal appears unchanged at the output of the EXOR circuit C. On the other hand, when the MSB is "1", the number of inversions that occur in the NRZI modulation increases by one as the number of 1s in the codeword increases by one, and therefore, the Q signal is inverted for output. During the NRZI modulation, the polarity is inverted between positive and negative in accordance with the level of the connected signal. Therefore, the output of the EXOR circuit C is input to the EXOR circuit D along with the Q' signal indicating the word end level of the previous NRZI-modulated codeword, and when the Q' signal is "0" (indicating the word end level after NRZI modulation is low), the output signal of the EXOR circuit C appears unchanged at the output of the EXOR circuit D. On the other hand, when the Q' signal is "1" (indicating the word end level after NRZI modulation is high), the output of the EXOr circuit C is inverted through the EXOR circuit D. The output of the EXOR circuit D is supplied to the one-word delay as a signal indicating the end level of the NRZI-modulated codeword for the immediately following data conversion.

To describe the above operation as applied to the present embodiment, when the second dataword "081" is input to the encoder 7, the Q signal output from the encoder 7 is "1", and the MSB output from the EXOR circuit B is also "1", as can be seen from FIG. 28, so that the output of the EXOR circuit D is at a low level ("0"). At this time, the signal Q' that indicates the end level of the previous NRZI-modulated codeword is at a low level ("0"), and therefore, the EXOR circuit D outputs a signal "0" indicating that the end level of the NRZI-modulated codeword is low, the signal "0" being input at the clock (fMW) to the one-word delay through which the signal is delayed by one encoding cycle. By repeating the above operation for every m/n data conversion with one word delay at each time, the end level of each codeword can be checked correctly for continuous sequences of codewords.

As described above, the data that has been word-converted by the selector 6 from 8-bit first datawords to 12-bit second datawords is converted by the encoder 7 to a 16-bit codeword, which is further converted by the MSB controller 8 to a 15-bit codeword, capable of determining the dispersing direction of the DSV as desired by the DSV control signal (i), by converting the two bits on the MSB side of the\16-bit codeword to a one-bit signal that determines the polarity of the CDS. Likewise, subsequent second datawords "93A", "41D", and "F2E" ar respectively input to the encoder 7 and converted to the signal shown in FIG. 28(*j*), with their CDSs being controlled in accordance with the DSV control signal (i). As a result, the DSV value at the codeword end obtained at the output of the NRZI modulator 10 has a variation width p–p2 over four data conversion cycles as shown in FIG. 28(*k*), the resulting signal thus being made to synchronize with the DSV control signal.

Figure 29:
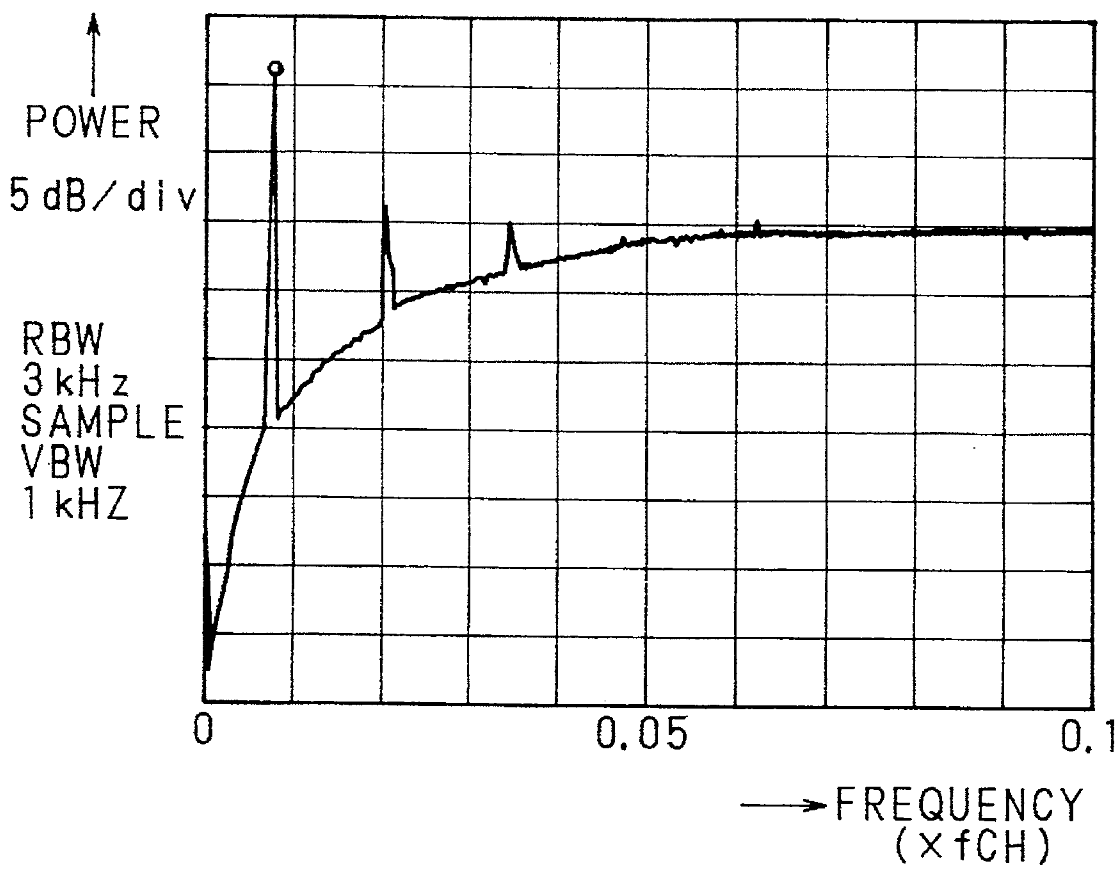
FIG. 29 is a power spectrum diagram showing the effect of the first embodiment.

The power spectrum of the digital signal is dependent on the state transition probability, and by keeping the DSV variation cycle at a constant value, the state transition occurring at the DSV variation cycle becomes high, thus making is possible to obtain a spectrum having high power at frequencies corresponding to the DSV variation cycle. In the present embodiment, the cycle of the DSV control signal is selected to be equal to four m/n data conversion cycles. However, if the signal cycle is set equal to about 10 data conversion cycles, it will be possible to obtain a relatively low frequency signal corresponding to the DSV variation cycle synchronized with the digital data, and such a low frequency signal can be used as a tracking pilot signal that will become necessary when the track width is reduced. FIG. 29 is a diagram illustrating the power spectrum obtained when first datawords constructed from 8-bit m-sequence random signals expressed as $X^{23}+X^5+1$ are input in a circuit constructed in accordance with the first embodiment but with the cycle of the DSV control signal set equal to ten m/n data conversion cycles. As can be seen from FIG. 29, the resulting spectrum has no DC content (DC-free) and, at the same time, exhibits high power only at frequencies corresponding to the cycle of the DSV control signal.

We will now describe a digital magnetic recording/reproducing apparatus that can be constructed into a system optimized for the above-described data conversion method.

Figure 30:
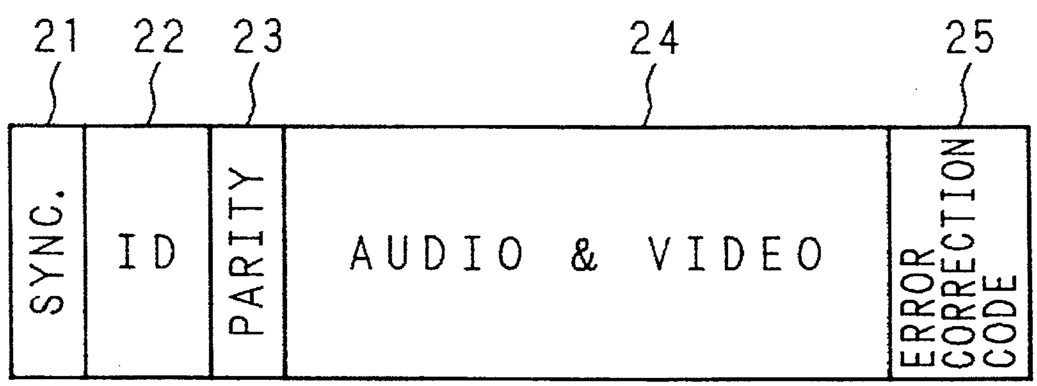
FIG. 30 is a diagram showing the structure of a first dataword block recorded by a recording/reproducing apparatus employing the data conversion method of the first embodiment.
Figure 31:
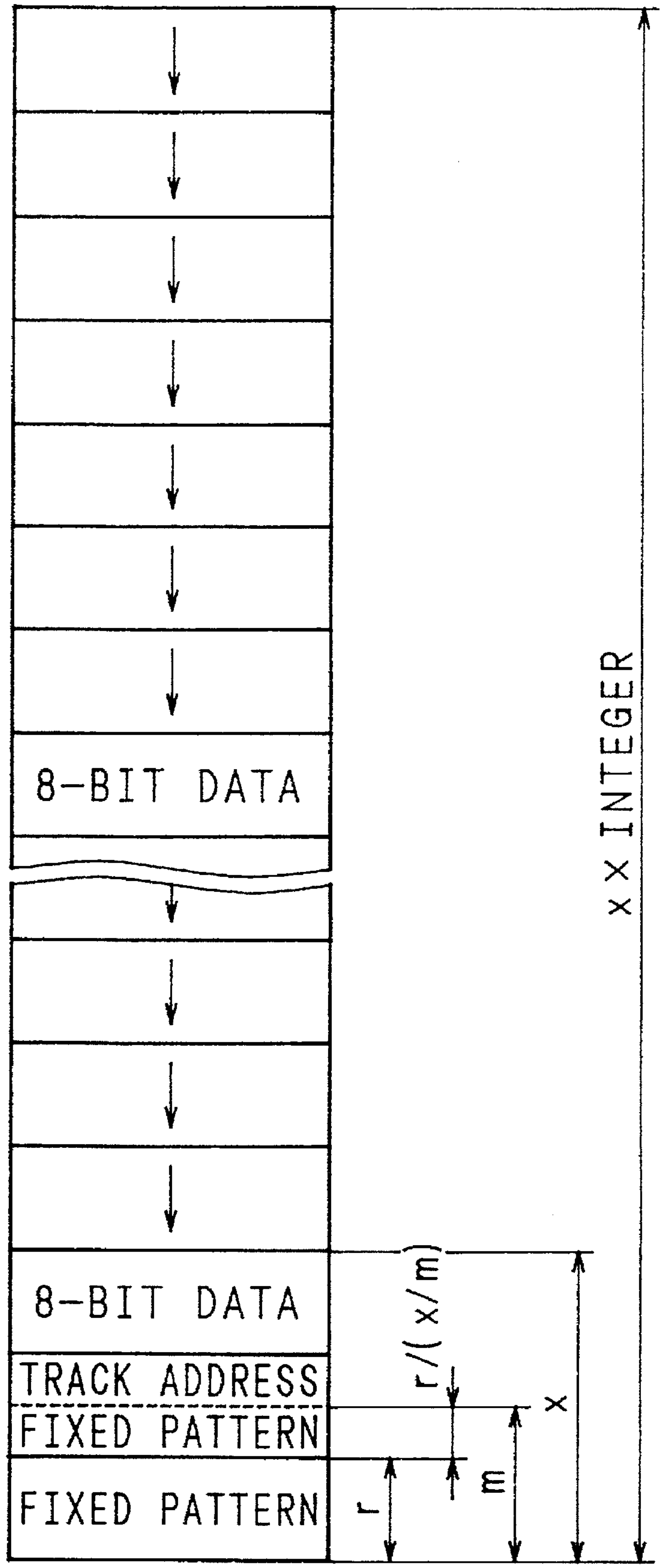
FIG. 31 is a diagram showing the structure of the first dataword block recorded by the recording/reproducing apparatus employing the data conversion method of the first embodiment along with the structure of the first datawords recorded at the top of the block.

Digital magnetic recording/reproducing apparatus such as DAT, digital VTR, etc. have the characteristic of being insusceptible to system variation in the sense that degradation in the signal-to-noise ratio does not lead to degradation in the audio and video reproduction performance as long as 1s and 0s can be distinguished. On the other hand, there is some danger with such digital apparatus that only a single bit error in a large volume of information may entirely change the contents of the information. Therefore, in digital magnetic recording/reproducing apparatus, it is essential to employ error-correcting codes for correction of errors caused on the transmission channel. Usually, error-correcting codewords are recorded in error-correcting code blocks separated from one another by a synchronizing signal as shown in FIG. 30. In FIG. 30, the numeral 21 is the synchronizing signal for separating one error-correcting code block from another, 22 is an ID signal for the block identified by the track number or the synchronizing signal, 23 is a parity-check codeword for checking whether the ID signal is correctly reproduced, 24 is an audio/video sector, and 25 is an error-correcting code. Rotary head type digital magnetic recording/reproducing apparatus usually have about 100 such block per track, each block being separated by the synchronizing signal.

The following description deals with a method of setting the amount of information for each block.

The synchronizing signal 21 serves not only as a signal for separating each error-correcting code block but also as a signal for executing word synchronization for decoding the codeword, encoded and recorded as previously described, into the original dataword. The synchronizing signal thus has a very important role, and therefore, a unique signal that does not usually appear in the recorded signal sequences is often used as the synchronizing signal. This unique signal can only be obtained by reconverting the data-converted codeword. According to the data conversion method of the first embodiment in which 8-bit first datawords are first converted to 12-bit second datawords and then converted to 15-bit codewords, the synchronizing signal length corresponds to 1.5 bytes in the original first datawords. Therefore, if the synchronizing signal sector is constructed from one-byte synchronizing signal data plus 0.5 byte obtained by dividing the first dataword, these components would become separated at the time of decoding, so that he 0.5 byte in the synchronizing signal sector would cause a fixed error and therefore, the one byte data immediately following the synchronizing signal data would also cause a fixed error. This problem may be solved by inserting a dummy dataword of one byte immediately following the first dataword (which may be formed from a fixed pattern) used for the synchronizing signal.

However, it is not advantageous in terms of space utilization to add a dummy dataword in a limited package. Therefore, in the recording/reproducing apparatus employing the data conversion method of the first embodiment, the first dataword used for the synchronizing signal is constructed from a fixed pattern of one byte, and the immediately following first dataword is constructed rom a fixed pattern of four bits on the MSB side and data (e.g., a cue signal, track address, etc.) of four or less bits on the LSB side. Ordinary 8-bit datawords are mapped starting with the first dataword of the third byte. The pattern of the synchronizing signal sector may be set in any pattern suitable for the reconversion performed after ordinary data conversion.

We will now describe a method of setting the number of first datawords for each block separated by the synchronizing signal. According to the data conversion method of the first embodiment, r-bit first datawords are first word-converted to m-bit second datawords and then data-converted to n-bit codewords. This requires word synchronization for every x bits, where x is the least common multiple of r and m. For example, in the present embodiment, r=8 and m=12, and hence the least common multiple is 24 bits, so that the first codewords are word-synchronized for every three bytes. Since word synchronization is performed for every three bytes in each block, as described above, if the number of first datawords in the block is not an integral multiple of 3, the first dataword remaining after dividing the number by 3 will cause a fixed error. Therefore, in the recording/reproducing apparatus employing the data conversion method of the first embodiment, the number of first datawords per block is selected to be equal to an integral multiple of x/r.

The following describes a method of converting the reproduced 15-bit codeword back to the original 12-bit second dataword in the recording/reproducing apparatus employing the above-described data conversion method.

Figure 32:
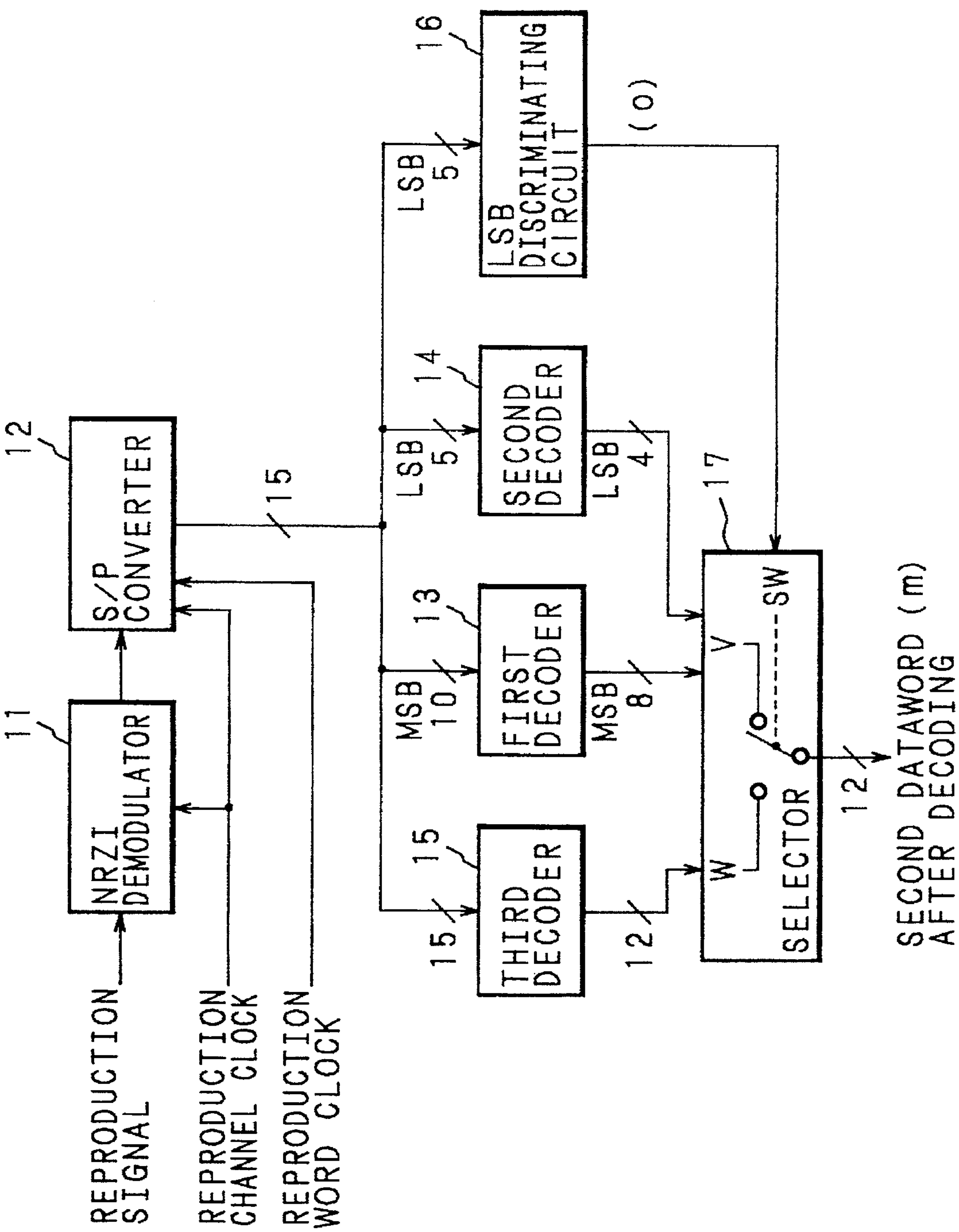
FIG. 32 is a diagram showing the configuration of a circuit for implementing a decoding method in the recording/reproducing apparatus employing the data conversion method of the first embodiment.

FIG. 32 is a diagram illustrating an example of a circuit configuration for decoding the reproduced 15-bit codeword into the original 12-bit second dataword (m), employed in the recording/reproducing apparatus using the data conversion method of the first embodiment. In FIG. 32, the reference numeral 11 is an NRZI demodulator for NRZI-demodulating the reproduction signal transmitted by a reproduction channel clock; 12 is a serial/parallel converter for converting the NRZI-demodulated serial signal, fed from the NRZI demodulator 11, to a 15-bit parallel signal by using a reproduction word clock which is word-synchronized by a synchronizing signal appended to the top of each block; 13 is a first decoder for accepting at its input the 10 bits n1 on the MSB side of the 15-bit codeword (n) output from the serial/parallel converter 12 and for decoding the n1 into a dataword that forms the eight bits on the MSB side of the second dataword; and 14 is a second decoder for accepting at its input the five bits n2 on the LSB side of the 15-bit codeword (n) output from the serial/parallel converter 12 and for decoding the n2 into a dataword that forms the four bits on the LSB side of the second dataword. The numeral 15 designates a third decoder for decoding the 15-bit codeword, output from the serial/parallel converter 12, into 12-bit decoded data. The third decoder 15 is constructed to perform one-to-one decoding when the five bits on the LSB side is of a prescribed type.

Furthermore, the reference numeral 16 indicates an LSB discriminating circuit which accepts at its input the five bits on the LSB side of the 15-bit codeword output from the serial/parallel converter 12, and which discriminates the type of the codeword and outputs a control signal (o) designating the classification type; and 17 refers to a selector which selects either the 12-bit dataword having decoded data from the first decoder 13 and the second decoder 14 or the 12-bit dataword from the third decoder 15 by using the control signal supplied from the LSB discriminating circuit 17 as a select SW, and which generates the second dataword (m) after decoding.

The operation of this embodiment will now be described. The reproduction signal is NRZI-demodulated by the NRZI demodulator 11 and fed to the serial/parallel converter 12 through which the demodulated serial signal is converted to a 15-bit codeword (n). Of the 15 bits in the codeword (n), the 10 bits n1 on the MSB side are entered to the first demodulator 13, and the five bits n2 on the LSB side are fed to the second demodulator 14 as well as to the LSB discriminating circuit 16. On the other hand, all the 15 bits of the codeword (n) are loaded directly into the third demodulator 15.

We will now describe in detail the operation of decoders for decoding the 15-bit codeword back into the 12-bit second dataword. From FIGS. 8 to 10, the five-bit codeword n2 on the LSB side of the 15-bit codeword can be classified in relation to the demodulated 4-bit dataword M2, as shown in FIG. 33. The codewords classified as the first LSB code group n FIG. 33 correspond to the LSB codewords n2 in the first and second coding groups in FIGS. 8 and 9 as well as in the first n1 group for m1="BB" to "E7" in the third coding group in FIG. 10, and each n1 in the N1 group is related to one decoding data m1 within the limits of the first LSB code group. Further, the codewords classified as the second LSB code group correspond to the LSB codewords classified as the second n1 group in the third coding group as well as the fourth n1 group for m1="EE" to "FF" in the same coding group. The codewords classified as the third LSB code group correspond to the LSB codewords classified as the third n1 group, while the codewords classified as the fourth LSB code group correspond to the LSB codewords in the n1 group for m1="E8" to "FF". Note, however, that the N1 group in the second to the fourth LSB code groups overlaps with the N1 group in the first LSB code group, and that, in some cases, a plurality of M2 are mapped to one LSB codeword n2.

Now, the first decoder 13 decodes the 10 bits on the MSB side into an eight-bit dataword. In this case; the top bit in the 10-bit codeword is a control bit for controlling the DSV during demodulation and may therefore be disregarded at the time of decoding. Thus, the remaining nine bits are decoded. The decoding is performed on the codewords in the first and second coding groups in FIGS. 8 and 9 as well as in the first n1 group for m1="BB" to "E7" in the third coding group in FIG. 10, and the decoded 8-bit dataword is applied to V11–V4 on the selector 17 as data representing the eight bits on the MSB side of the second dataword. On the other hand, the second decoder 14 decodes the five bits on the LSB side into a four-bit dataword. In this case, the decoding is performed on the codeword n2 in the first LSB code group. The decoded 4-bit dataword is applied to V3–V0 on the selector 17 as data representing the four bits on the LSB side of the second dataword. The third decoder 15 decodes the input 15-bit codeword into a 12-bit dataword. In this case also, the top bit on the MSB side is excluded, as in the case of the first decoder 13, and the remaining 14 bits are decoded. The decoding is performed only when the five-bit LSB codeword falls in one of the second to the fourth LSB code groups, and the decoded 12-bit dataword is applied to W11–W0 on the selector 17.

The selector 17 is switched to select either the dataword supplied from the first decoder 13 and second decoder 14 or the dataword supplied from the third decoder 15, and outputs the selected dataword as the decoded second dataword; the switching of the selector 17 is controlled by a control signal supplied from the LSB discriminating circuit 16. Of the 15 bits in the codeword, the five bits n2 on the LSB side are input to the LSB discriminating circuit 16 to discriminate the type of the LSB codeword. For example, if the LSB codeword n2 is a codeword discriminated as belonging to one of the second to the fourth LSB code groups, the LSB discriminating circuit 16 outputs a control signal (o) indicating the discriminated type and applies it to the select SW on the selector 17. When no control signal (o) is received, the selector 17 selects the eight-bit MSB dataword V11–V4 supplied from the first decoder 13 and the four-bit LSB dataword V3–V0 supplied from the second decoder 14 and outputs the resulting 12-bit dataword V. On the other hand, when the control signal (o) is received, the selector 17 is switched to select the 12-bit dataword W decoded by the third decoder 15.

Thus, the selector 17 outputs the 12-bit dataword m obtained by reconverting the codeword that was encoded in accordance with the tables shown in FIGS. 8 to 10. As described, the 15-bit codeword is decoded on a one-to-one basis to the 12-bit dataword only when the five-bit LSB codeword is decoded by dividing it into 10 bits on the MSB side and 5 bits on the LSB side. This construction serves to reduce the possibility of the error propagation that may occur between decoded first datawords due to a single bit detection error in the 15-bit codeword.

In the above decoding method, the discrimination of the five-bit LSB codeword is determined by which of the two major groups, the first LSB code group or the second to fourth LSB code group, the LSB codeword belongs to. However, in an alternative method, the types of codeword may be classified into three major groups, for example, the first LSB code group, the second LSB code group, and the third/fourth LSB code group, and four decoders, i.e. the first to the fourth decoders, may be provided, the outputs of these decoders being selected accordingly by using a control signal from the LSB discriminating circuit. Such configuration may somewhat increase the circuit complexity compared to that of the above embodiment, but will serve to further reduce the possibility of error propagation between decoded first datawords.

Thus, according to the first embodiment, eight-bit first datawords are first word-converted to 12-bit second datawords, and then, the 12-bit second datawords are converted to 15-bit codewords, each having bits of CDS=+1 or −1, by executing word-synchronization for every two second datawords, which is the least common multiple of the first and second datawords. In the conversion process, the first byte of the first dataword is mapped to the eight bits on the MSB side of the first of the two second datawords, and the four bits on the MSB side of the second byte of the first dataword are mapped to the four bits on the LSB side of the first of the two second datawords. For the second of the two second datawords, the third byte of the first dataword is mapped to the eight bits on the MSB side, while the four bits on the LSB side of the second byte of the first dataword are mapped to the four bits on the LSB side of the second of the two second datawords, thus accomplishing the 8/12 word-conversion. Thereafter, each 12-bit dataword is converted to a 15-bit codeword (12/15 data conversion). This encoding method permits the 8/10 encoding of non-divided first datawords and the 4/5 encoding of divided first datawords, which serves to reduce the possibility of the error propagation that may occur, due to a single bit error in the codeword, between first datawords during reverse conversion at the time of decoding. Furthermore, when this data conversion method is applied to a recording/reproducing apparatus, it is possible to construct a system capable of efficient recording of data without requiring redundant bits, the system being constructed such that the number of first datawords for each block separated by a synchronizing signal is set at a multiple of r/x and that the first dataword as the synchronizing signal at the beginning of the block is formed from a fixed pattern and the immediately following first dataword is formed from a fixed pattern of four bits on the MSB side and data of four or less bits (e.g., cue signal, track address, etc.) on the LSB side.

On the other hands when decoding the 15-bit codeword into the 12-bit second dataword, the 15-bit codeword is divided into 10 bits on the MSB side and five bits on the LSB side, and the 10 bits are decoded into eight bits by the first decoder and the five bits are decoded into four bits by the second decoder, while the 15 bits are decoded into 12 bits by the third decoder. The discriminating circuit discriminates the type of the five bits on the LSB side of the 15-bit codeword and outputs a control signal indicating the discriminated type, on the basis of which the decoded data from the decoders are selected to reconstruct the second dataword. Thus, the codeword is decoded by reverse conversion of 10/8 and 5/4, except when the LSB codeword falls under specific conditions. This has the effect of reducing the possibility of the error propagation that may occur between decoded first datawords due to a detection error in the codeword.

Embodiment 2

A second embodiment of the invention will now be described below. Suppose a code of dataword length=12 and codeword length=14 with one bit added to form a code with Tmax/Tmin=5. Here, let d=0 and k=4. The NRZI(F) rule is used to construct the code. To satisfy K=4 in each codeword, the number of successive 0s in the codeword is limited to 4, and since one bit is inserted between codewords, the number of successive 0s is limited to 2 on the MSB side and 1 on the LSB side.

To form a DC-free code, 4096 pairs of codewords, each pair having codewords of different CDS polarities, should be provided. There are 2481 codewords with CDS=0, 2169 codewords with CDS=+2, and 1888 codewords with CDS=−2, which satisfy the above conditions. Hence, 2481 codewords with CDS=0 and 1615 pairs of codewords with CDS=±2, which differ only in MSB, are used to suppress the dispersion of DSV to achieve DC-free modulation. Code conversion tables thus constructed are shown in FIGS. 34 to 49. The data given in FIGS. 34 to 49 represent binary digital signals in hexadecimal notation. For every 12-bit input data (dataword), there are output a total of 16 bits, i.e. a 14-bit codeword, one-bit data (hereinafter represented by Q) indicating the number of inversions performed on the NRZI-modulated codeword, and the CDS (a zero or nonzero bit) of the codeword.

Figure 50:
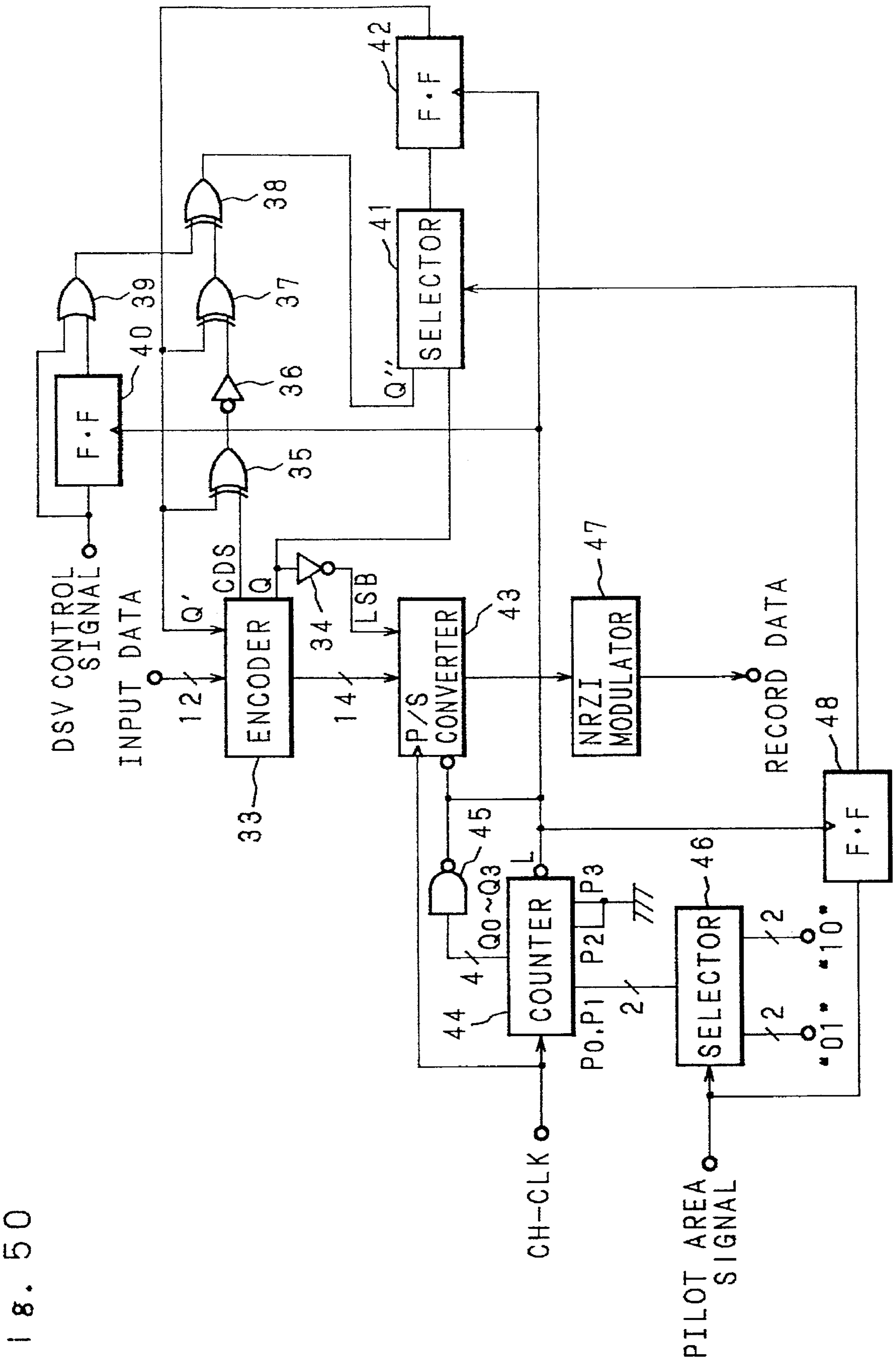
FIG. 50 is a diagram showing the circuit configuration of a data converting apparatus for implementing the data conversion method of the second embodiment.

FIG. 50 is a diagram illustrating an example of a circuit configuration implementing the second embodiment. In FIG. 50, the reference numeral 33 is an encoder for converting 12-bit digital data (dataword) to 16-bit digital data shown in FIGS. 34 to 49; 34 and 36 are NOT gates; 35, 37, 38, and 39 are EXOR gates; 40, 42, and 48 are flip-flops; 41 and 46 are selectors; 43 is a parallel/serial converter for converting 14-bit or 15-bit parallel data to a serial data sequence; 44 is a counter; 45 is a four-input NAND gate; and 47 is an NRZI modulator for processing the codeword, converted to serial data, so that the signal polarity is inverted each time a 1 is input.

FIG. 51 shows a code select table used to determine a code to be selected in accordance with the current and the previous DSV control signal values, the CDS value of the codeword just selected, and the previous Q' signal.

Figure 52A:
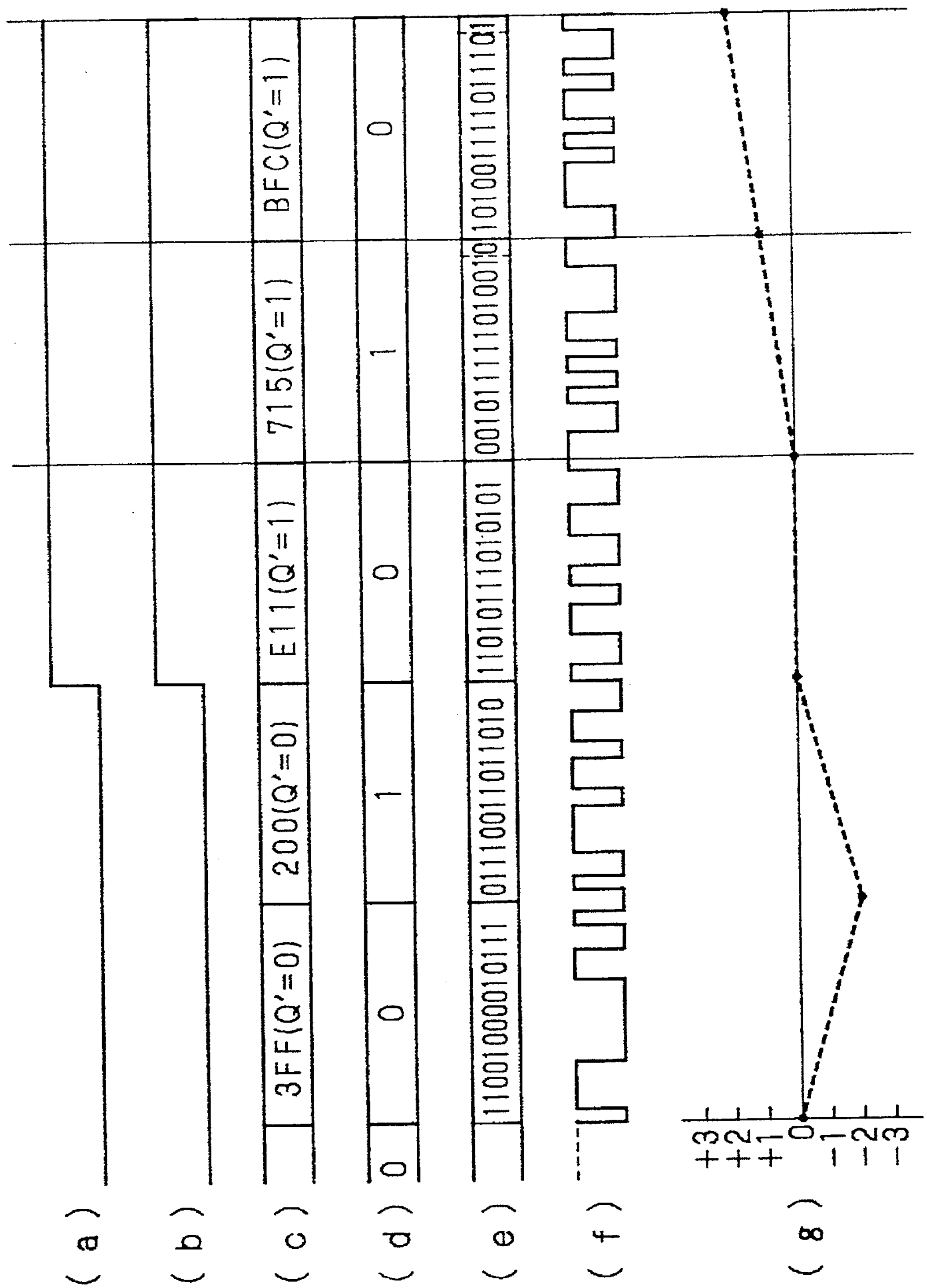
FIGS. 52(A) and 52(B) is a diagram for explaining the operation of the data converting apparatus of FIG. 50.
Figure 52B:
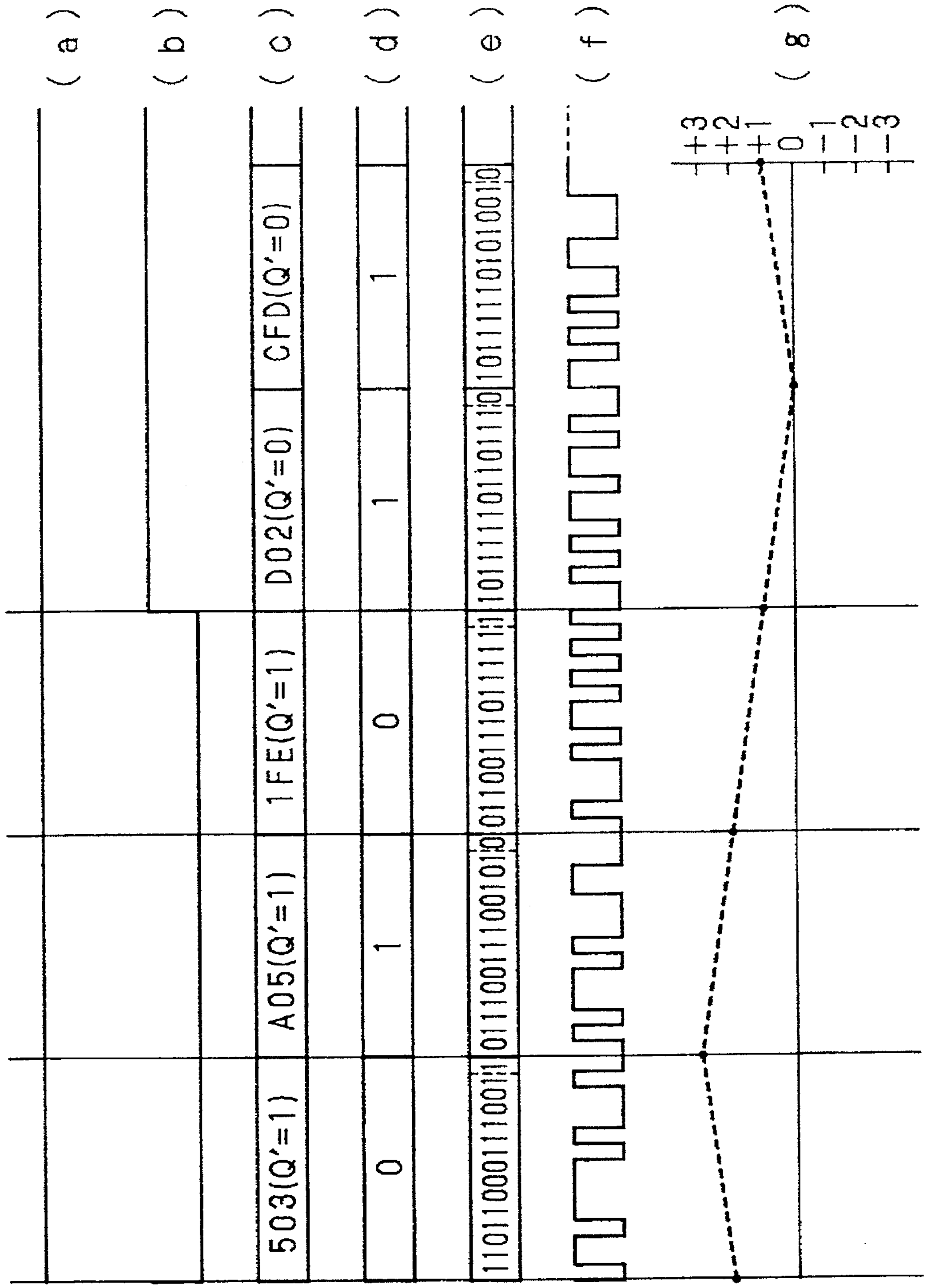

FIG. 52 is a diagram illustrating code conversion and DSV value variation according to the second embodiment. In FIG. 52, (a) is a pilot signal (write at "1"), (b) is a DSV control signal (positive direction at "1"), (c) is input data (12 bits), (d) is a code select signal Q', (e) is a selected codeword, (f) is a signal waveform to be recorded, and (g) is a DSV value at the end of each codeword.

Figure 53:
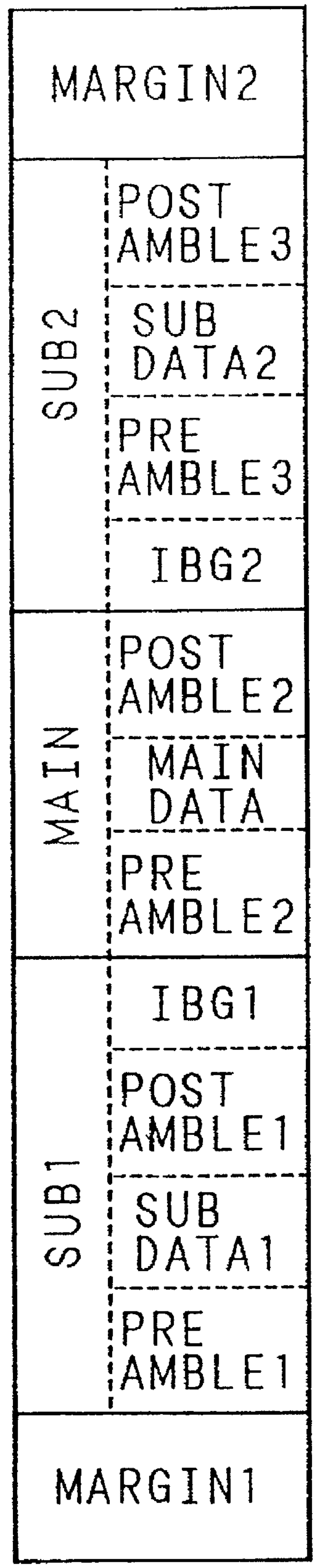
FIG. 53 is a diagram showing a recording format of a recording/reproducing apparatus according to the second embodiment.
Figure 54:
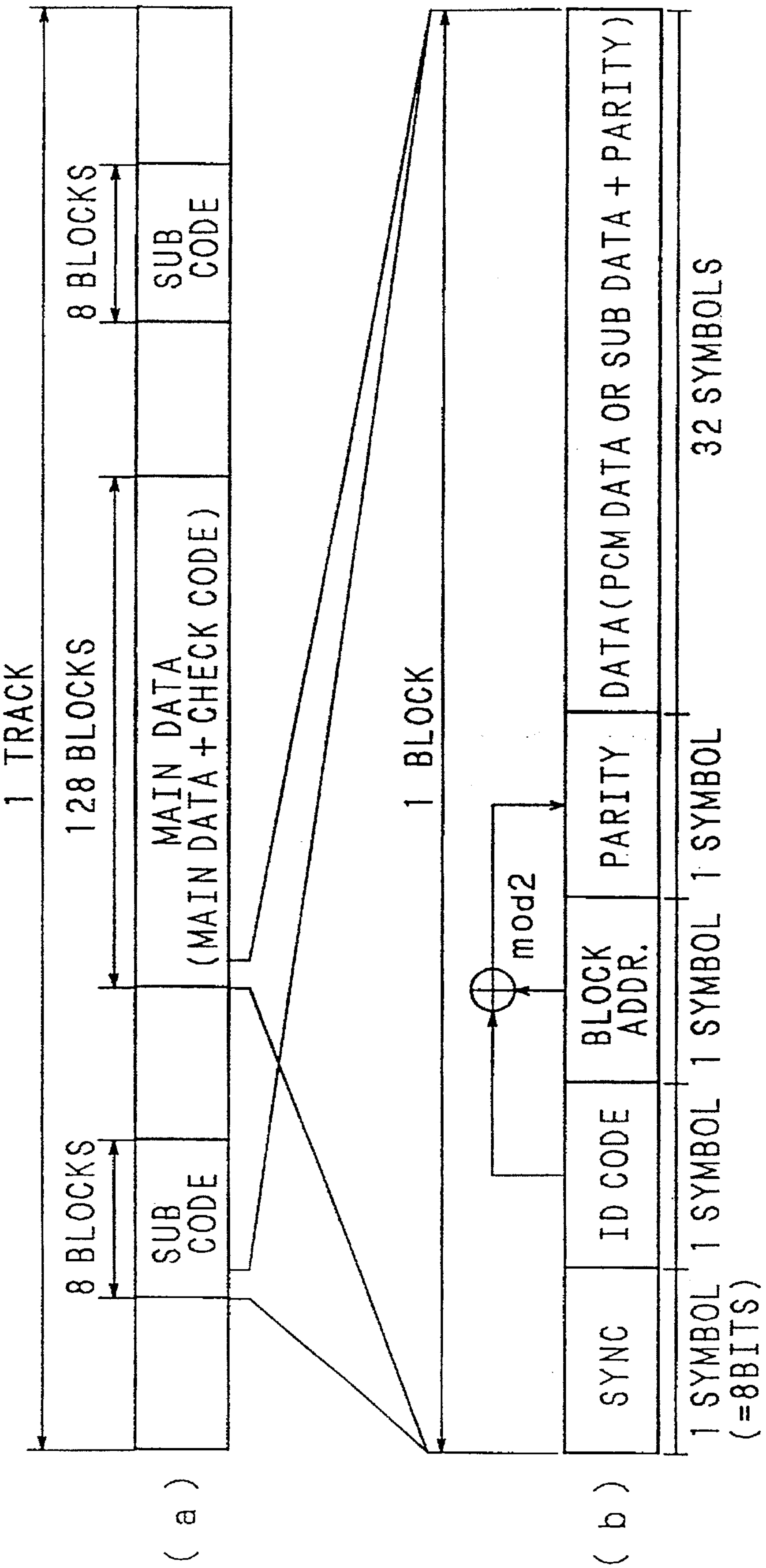
FIG. 54 is a diagram illustrating the block structure for recording/reproducing circuitry in a prior art magnetic recording/reproducing apparatus.

FIG. 53 is a diagram illustrating the recording format of a magnetic recording/reproducing apparatus according to the second embodiment. In FIG. 53, subcode signals, etc. are recorded in the subdata areas (SUB1, SUB2), and video and audio signals are recorded in the main data area (MAIN). Pilot signals are recorded in the subdata areas (SUB1, SUB2).

The circuit operation of the second embodiment will now be described below with reference to FIG. 50.

First, when the pilot area signal output from the flip-flop 48 is "0", i.e. when data other than that for the subdata area is to be encoded for recording, 12-bit data is input to the encoder 33 where the 12-bit data is converted to a 14-bit codeword (parallel) by using the code select signal Q' supplied from the flip-flop 42. The resulting 14-bit codeword is supplied to the parallel/serial converter 42. The encoder 33 also outputs a Q signal which is supplied to the selector 41. On the other hand, the selector 46 selects "10" by the input pilot area signal "0", which sets the load value of the counter 14 to "0010", and the counter 14 outputs a load CLK of one CLK width to the parallel/serial converter 43 for every 14 CH–CLKs. The parallel/serial converter 43 converts the input 14-bit parallel codeword to serial data which is fed to the NRZI modulator 47. At this time, the output of the NOT gate 34, i.e. the LSB, is input to the parallel/serial converter 43, but since a load CLK is input for every 14 CH–CLKs, the LSB is not output from the parallel/serial converter 43. The serial codeword input to the NRZI modulator 47 is NRZI-modulated for output. The Q signal output from the encoder 33 is input to the selector 41 which selects the Q signal by the pilot area signal and supplies it to the flip-flop 42.

On the other hand, when the pilot area signal output from the flip-flop 48 is "1", i.e. when data for the subdata area is to be encoded for recording, 12-bit data is input to the encoder 33 which converts the 12-bit data to a 14-bit codeword (parallel) by using the code select signal Q' supplied from the flip-flop 42. The resulting 14-bit codeword is supplied to the parallel/serial converter 43. The encoder 33 also supplies a Q signal to the selector 41 and the NOT gate 34, and a CDS signal to the EXOR gate 35. The selector 46 selects "01" by the input pilot area signal "1", which sets the load value of the counter 14 to "0001", and the counter 14 supplies a load CLK of one CLK width to the parallel/serial converter 43 for every 15 CH–CLKs. The parallel/serial converter 43 converts the input 14-bit parallel codeword and LSB to serial data which is supplied to the NRZI modulator 47. The serial codeword input to the NRZI modulator 47 is NRZI-modulated for output. The DSV control signal is input to the flip-flop 40 and the EXOR gate 39, the output of the flip-flop 40 being coupled to the other input of the EXOR gate 39. The output of the EXOR gate 39, i.e. the exclusive OR sum of the current DSV control signal and the previous DSV control signal, is supplied to one input of the EXOR gate 38. The EXOR gate 35 EXORs the CDS signal output from the encoder 33 with the Q' signal. The output of the EXOR gate 35 is inverted through the NOT gate 36 and applied to one input of the EXOR gate 37. The EXOR gate 37 EXORs the output of the NOT gate 36 with the Q' signal and supplies the result to the other input of the EXOR gate 38. The EXOR gate 38 EXORs the outputs of the EXOR gates 37 and 39 and supplies the result to the other input of the selector 41. In this manner, the signal selected in accordance with the codeword select table is output as the Q" signal. The Q" signal is selected by the pilot area signal and is fed to the flip-flop 42 to form a code select signal Q' for the next coding.

Suppose, for example, that the pilot area signal is "0", the input data is "3FF", the previous polarity is "1", and the Q' signal is "0". In this case, the 14-bit codeword output from the encoder 33 is "11001000010111"; the CDS is −2 and the DSV is also −2. As a result, the Q signal "0" is output. Next, when data "200" is input, since the Q' signal, i.e. the previous Q signal, is "0", the selected codeword is "01110011011010"; the CDS is +2 and the DSV is 0. Next, when the pilot area signal and the DSV control signal both go to a "1" and data "E11" is input, since the Q' signal is "1", the output codeword is "11010111010101", and a Q signal of "0" and a CDS signal of "0" are output; CDS and DSV are both 0. When data "715" is input, since the Q' signal is "1", the selected codeword is "00101111101001" and the LSB is "0"; CDS and DSV are both +1. Next, when data "BFC" is input, since the Q' signal is "1", the selected codeword is "10100111101110" and the LSB is "1"; CDS is +1 and DSV is +2. The above operation is repeated for the subdata areas where the pilot area signal is "1", thereby achieving a modulation method in which the DSV varies at the cycle of the DSV control signal.

Using the above-described modulation method, a tracking servo pilot signal is recorded at two places within one track. Therefore, in the subdata areas (SUB1, SUB2), one LSB bit is added to the 14-bit codeword to form a 15-bit codeword, as described previously, and modulation is performed on the codeword including the pilot signal, while for other areas, the 14-bit codeword is directly modulated.

According to the format shown in FIG. 53, two subdata areas are provided within one track, and the pilot signals are recorded in these areas. Alternatively, three or more pilot signal recording areas may be provided within one track in order to enhance the tracking accuracy with a narrower track. It will also be appreciated that the pilot signal may be recorded in any portion within the subdata areas.

As described, according to the second embodiment, 12-bit datawords are each converted to a 14-bit codeword which, after NRZI modulation, has a succession of the same level, more than one bit long and five bits at maximum, and provides CDS=0, +2 or −2, the CDS value being controlled to suppress the dispersion of DSV, thus accomplishing a DC-free modulation method. Furthermore, in areas where pilot signals are recorded, one bit is added to the 14-bit codeword to form codewords of CDS=±1, and the modulation is performed so that the DSV varies in synchronism with the DSV control signal to produce a tracking control pilot signal. This eliminates the need for ATF areas, the areas where only tracking control signals are recorded. Moreover, since one bit is added to the codeword and the pilot signal is recorded in a restricted area, it is not necessary to substantially raise the recording rate, and therefore, high density recording is achieved. Furthermore, since the modulation method is basically the same for both the pilot signal areas and other areas, the configuration does not involve any appreciable increase in the circuit complexity.

A third embodiment of the invention will now be described below. Suppose a code of dataword length=8 and codeword length=10 with one bit added to form a code with Tmax/Tmin=4. Here, let d=0 and k=3, where d is the minimum number of 0s between an arbitrary 1 and the next 1, and k is the maximum number of 0s between an arbitrary 1 and the next 1. The NRZI(F) rule is used to construct the code. To satisfy k=3 in each codeword, the number of successive 0s in the codeword is limited to 3, and since one bit is inserted between codewords, the number of successive 0s is limited 1 on the MSB side and the LSB side.

To form a DC-free code, 256 pairs of codewords, each pair having codewords of different CDS polarities, should be provided. There are 163 codewords with CDS=0, 140 codewords with CDS=+2, and 95 codewords with CDS=−2, which satisfy the above conditions. Hence, 163 codewords with CDS=0 and 93 pairs of codewords with CDS=+2 are used to suppress the dispersion of DSV to achieve DC-free modulation. Code conversion tables thus constructed are shown in FIGS. 56 to 61. The data given in FIGS. 56 to 61 represent binary digital signals in hexadecimal notation. For every 8-bit input data (dataword), there are output a total of 12 bits, i.e. a 10-bit codeword, one-bit data (hereinafter represented by Q) indicating the number of inversions performed on the NRZI-modulated codeword, and the CDS (a zero or nonzero bit) of the codeword.

Figure 55:
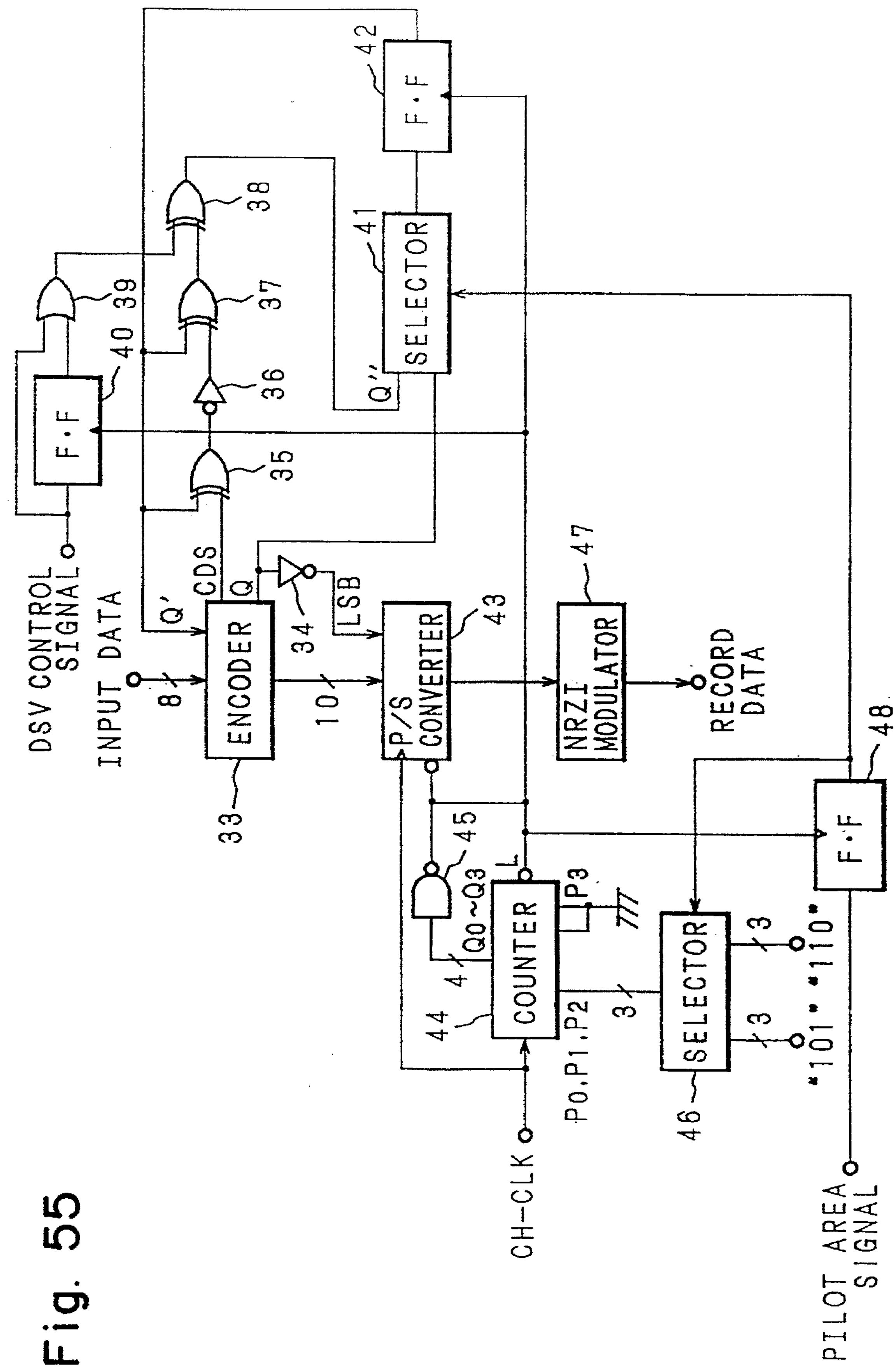
FIG. 55 is a circuit diagram illustrating one embodiment of the invention.
Figure 62:
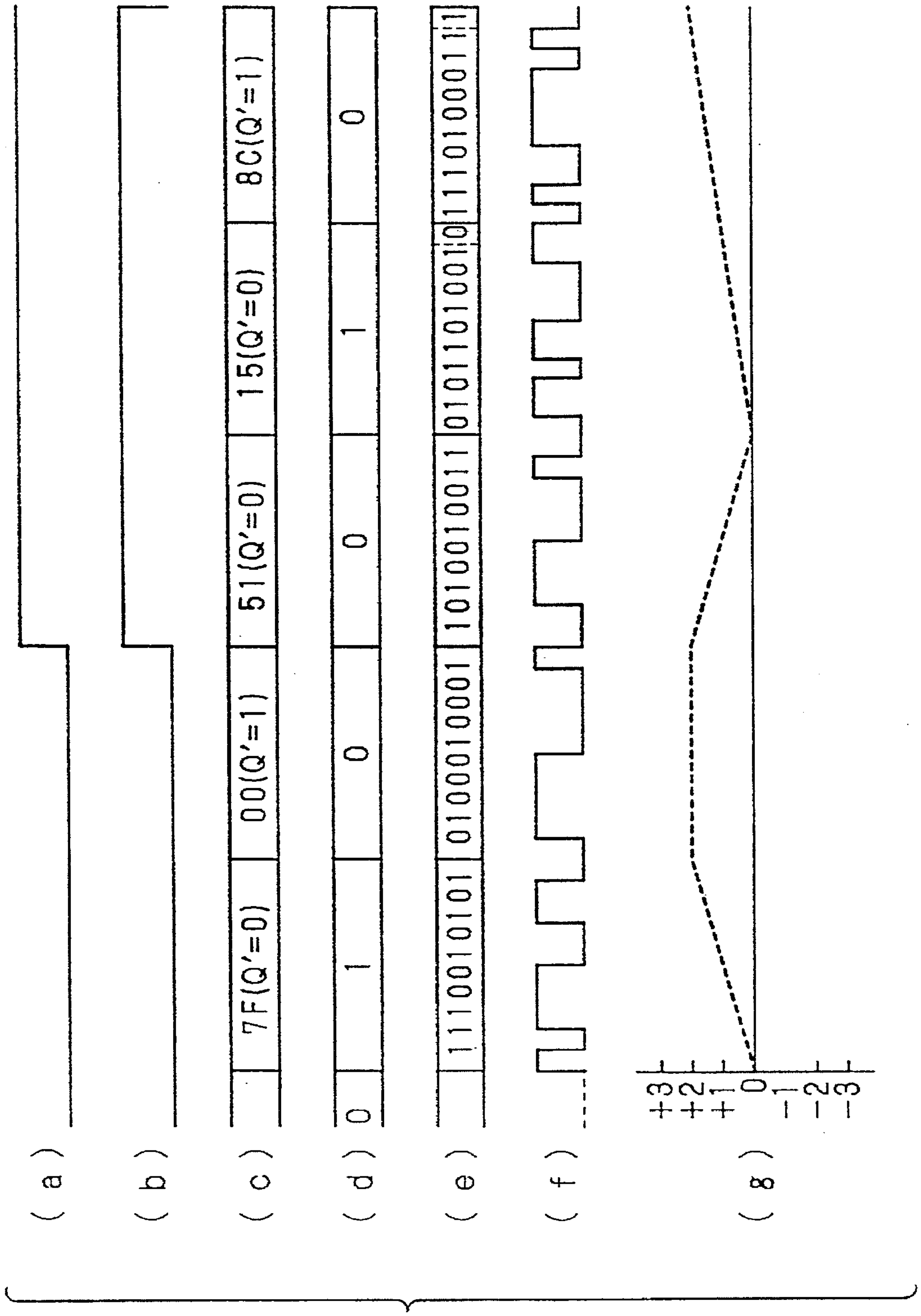
FIGS. 62 including FIGS. 62(*a*) and 62(*b*) is diagrams showing data conversion and DSV values in one embodiment of the invention.
Figure 62:
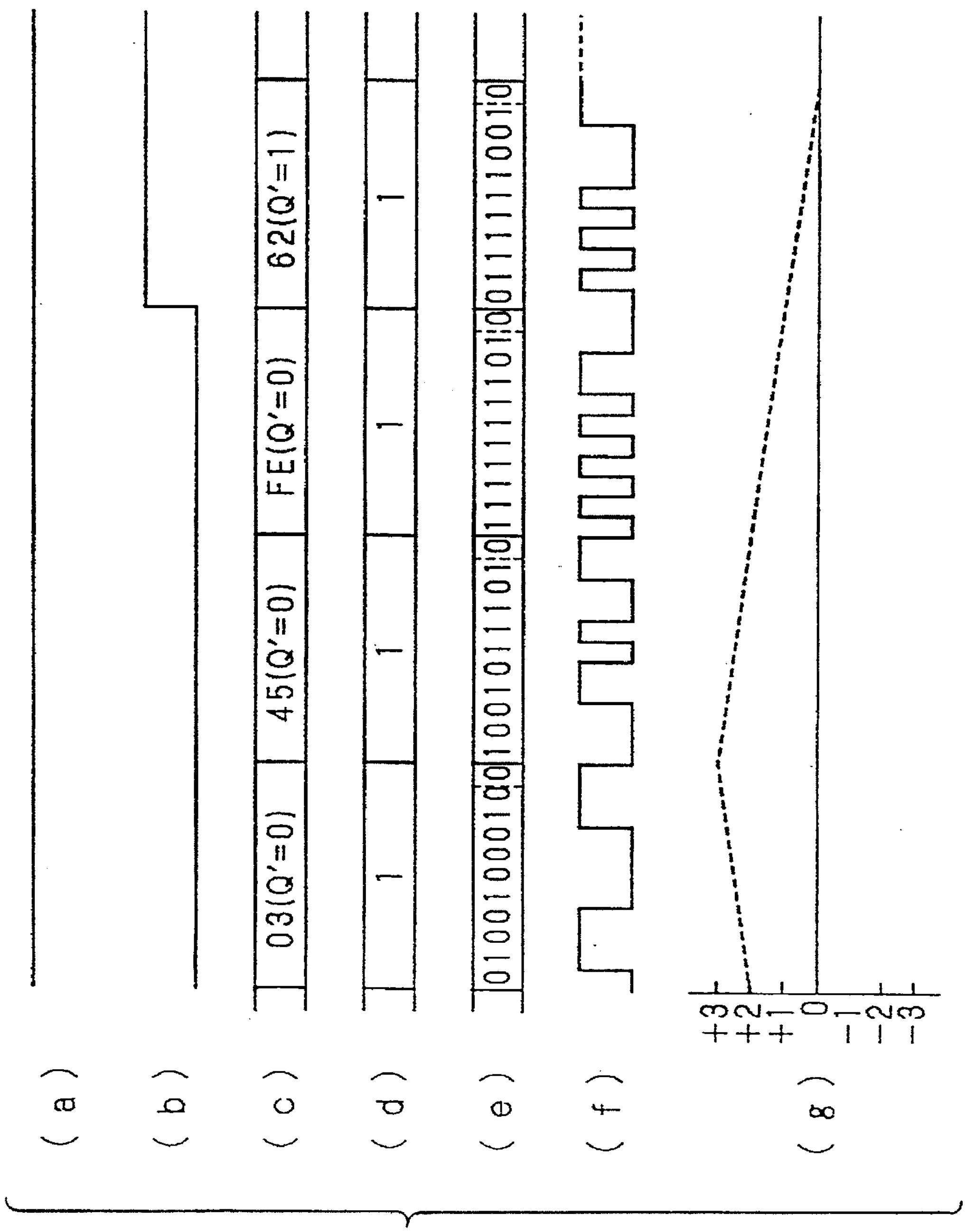

FIG. 55 is a diagram illustrating an example of a circuit configuration implementing this embodiment of the present invention. In FIG. 55, the reference numeral 33 is an encoder for converting 8-bit digital data (dataword) to 12-bit digital data shown in FIGS. 56 to 61; elements 34 and 36 are NOT gates; elements 35, 37, 38, and 39 are EXOR gates; elements 40, 42, and 48 are flip-flops; elements 41 and 46 are selectors; element 43 is a parallel/serial converter for converting 10-bit or 11-bit parallel data to a serial data sequence; element 44 is a counter; element 45 is a four-input NAND gate; and element 47 is an NRZI modulator for processing the codeword, converted to serial data, so that the signal polarity is inverted each time a 1 is input. The code select table of FIG. 51 is also used to determine a code to be selected in accordance with the current and the previous DSV control signal values, the CDS value of the codeword just selected, and the previous Q' signal. FIGS. 56 to 61 are code conversion tables. FIG. 62 including FIGS. 62(A) and 62(B) are diagrams illustrating code conversion and DSV value variation according to the embodiment of the invention. In FIG. 62(A), (a) is a pilot signal (write at "1"), (b) is a DSV control signal (positive direction at "1"), (c) is input data (12 bits), (d) is a code select signal Q', (e) is a selected codeword, "f" is a signal waveform to be recorded, and (g) is a DSV value at the end of each codeword. The diagram of FIG. 53 also illustrates the recording format of a magnetic recording/reproducing apparatus according to this embodiment of the invention. In FIG. 53, subcode signals; etc. are recorded in the subdata areas (SUB1, SUB2), and video and audio signals are recorded in the main data area (MAIN). Pilot signals are recorded in the subdata areas (SUB1, SUB2).

The circuit operation of this embodiment will now be described below with reference to FIG. 55.

First, when the pilot area signal output from the flip-flop 48 is "0", i.e. when data other than that for the subdata area is to be encoded for recording, 8-bit data is input to the encoder 33 where the 8-bit data is converted to a 10-bit codeword (parallel) by using the code select signal Q' supplied from the flip-flop 42. The resulting 10-bit codeword is supplied to the parallel/serial converter 43. The encoder 33 also outputs a Q signal which is supplied to the selector 41. On the other hand, the selector 46 selects "110" by the input pilot area signal "0", which sets the load value of the counter 44 to "0110", and the counter 44 outputs a load CLK of one CLK width to the parallel/serial converter 43 for every 10 CH–CLKs. The parallel/serial converter 43 converts the input 10-bit parallel codeword to serial data which is fed to the NRZI modulator 47. At this time, the output of the NOT gate 34, i.e. the LSB, is input to the parallel/serial converter 43, but since a load CLK is input for every 10 CH–CLKs, the LSB is not output from the parallel/serial converter 43. The serial codeword input to the NRZI modulator 47 is NRZI-modulated for output. The Q signal output from the encoder 33 is input to the selector 41 which selects the Q signal by the pilot area signal and supplies it to he flip-flop 42.

On the other hand, when the pilot area signal output from the flip-flop 48 is "1"; i.e. when data for the subdata area is to be encoded for recording, 8-bit data is input to the encoder 33 which converts the 8-bit data to a 14-bit codeword (parallel) by using the code select signal Q' supplied form the flip-flop 42. The resulting 10-bit codeword is supplied to the parallel/serial converter 43. The encoder 3 also supplies a Q signal to the selector 41 and the NOT gate 34, and a CDS signal to the EXOR gate 35. The selector 46 selects "101" by the input pilot area signal "1", which sets the load value of the counter 44 to "0001", and the counter 44 supplies a load CLK of one CLK width to the parallel/serial converter 43 for every 11 CH–CLKs. The parallel/serial converter 43 converts the input 10-bit parallel codeword and LSB to serial data which is supplied to the NRZI modulator 47. The serial codeword input to the NRZI modulator 47 is NRZI-modulated for output. The DSV control signal is input to the flip-flop 40 and the EXOR gate 39, the output of the flip-flop 40 being coupled to the other input of the EXOR gate 39. The output of the EXOR gate 39, i.e. the exclusive OR sum of the current signal, is supplied to one input of the EXOR gate 38. The EXOR gate 35 EXORs the CDS signal output from the encoder 33 with the Q' signal. The output of the EXOR gate 35 is inverted through the NOT gate 36 and applied to one input of the EXOR gate 37. The EXOR gate 37 EXORs the output of the NOT gate 36 with the Q' signal and supplies the result to the other input of the EXOR age 38. The EXOR gate 38 EXORs the outputs of the EXOR gates 37 and 39 and supplies the result to the other input of the selector 41. In this manner, the signal selected in accordance with the codeword select table shown in FIG. 2 is output as a Q" signal. The Q" signal is selected by the pilot area signal and is fed to the flip-flop 42 to form a code select signal Q' for the next coding.

Suppose, for example as shown in FIG. 62(*a*), that the pilot area signal is "0", the input data is "7F", the previous polarity is "0", and the Q' signal is "0". In this case, the 10-bit codeword output from the encoder 33 is "1110010101"; the CDS is +2 and the DSV is also +2. As a result the Q signal "1" is output. next, when data "00" is input, since the Q' signal, i.e. the previous Q signal, is "1", the selected codeword is "0100010001"; the CDS is 0 and the DSV is +2. Next, when the pilot area signal and the DSV control signal both go to a "1" and data "51" is input, since the Q' signal is "0", the output codeword is "1010010011", and a Q signal of "0" and a CDS signal of "0" are output; CDS is −2 and DSV is 0. When data "15" is input, since the Q' signal is "0", the selected codeword is "0101101001" and the LSB is "0"; CDS and DSV are both +1. Next, when data "8C" is input, since the Q' signal is "1", the selected codeword is "1110100011" and the LSB is "1"; CDS is +1 and DSV is +2. The above operation is repeated for the subdata areas where the pilot area signal is "1", thereby achieving a modulation method in which the DSV varies at the cycle of the DSV control signal.

Using the above-described modulation method, a tracking servo pilot signal is recorded at two places within one track.

Therefore, in the subdata areas (SUB1, SUB2), one LSB bit is added to the 10-bit codeword to form a 11-bit codeword, as described previously, and modulation is performed on the codeword including the pilot signal, while for other areas, the 10-bit codeword is directly modulated.

According to the format shown in FIG. 10, two subdata areas are provided within one track, and the pilot signals is recorded in these areas.

Alternatively, three or more pilot signal recording areas may be provided within one track in order to enhance the tracking accuracy with a narrower track. It will also be appreciated that the pilot signal may be recorded in any portion within the subdata areas.

As described, according to the present invention, 8-bit datawords are each converted to a 10-bit codeword which, after NRZI modulation, has a succession of the same level, more than one bit long and four bits at maximum, and provides CDS=0, +2 or −2, the CDS value being controlled to suppress the dispersion of DSV, thus accomplishing a DC-free modulation method. Furthermore, in areas where pilot signals are recorded, one bit is added to the 10-bit codeword to form codewords of CDS=1, and the modulation is performed so that the DSV varies in synchronism with the DSV control signal to produce a tracking control pilot signal. This eliminates the need for ATF areas, the areas where only tracking control signals are recorded. Moreover, since one bit is added to the codeword and the pilot signal is recorded in a restricted area, it is not necessary to substantially raise the recording rate, and therefore, high density recording is achieved. Furthermore, since the modulation method is basically the same for both the pilot signal areas and other areas, the configuration does not involve any appreciable increase in the circuit complexity.

A fourth embodiment of the invention will be described below with reference to drawing FIGS. 63–66.

Figure 63A:
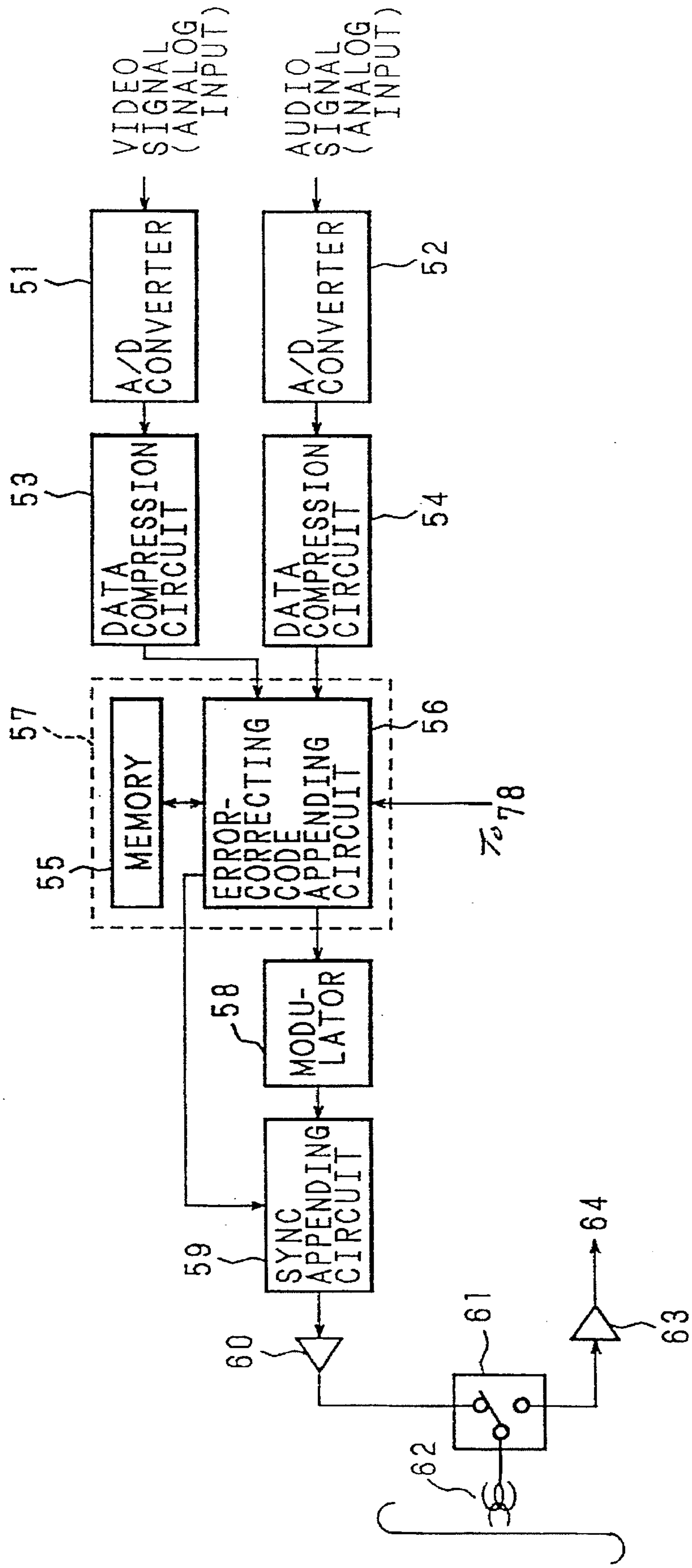
FIG. 63 including FIG. 63(*a*) and 63(*b*) is a block diagram showing the configuration of recording/reproducing in a digital magnetic recording/reproducing apparatus according to one embodiment of the invention.
Figure 63B:
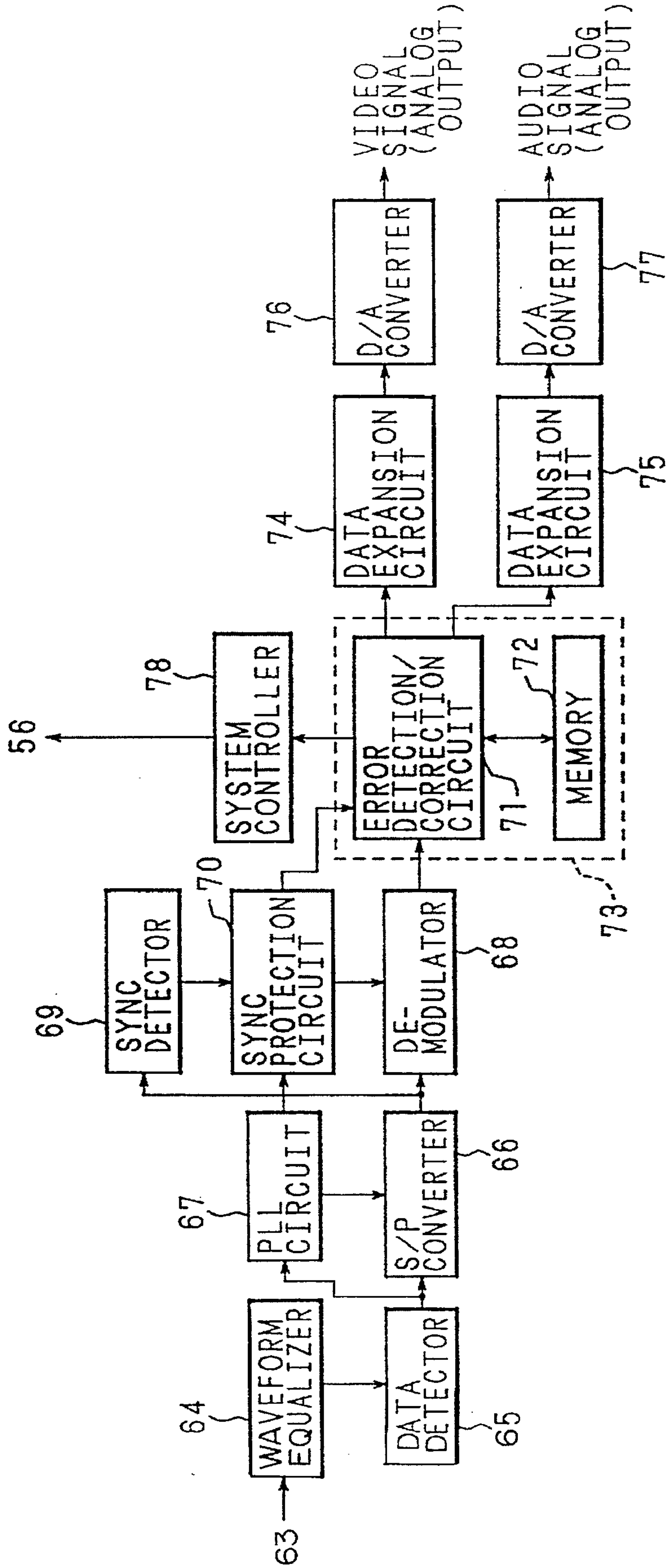

FIG. 63 including FIG. 63(*a*) and 63(*b*) are a block diagrams showing the configuration of recording/reproducing circuitry in a magnetic recording/reproducing apparatus according to another aspect of the invention. In the figure, the reference numerals 51 and 52 are A/D converters for quantizing a video signal and an audio signal input thereto; 53 and 4 are data compression circuits for performing band compression on the quantized video data and audio data by DCT or other methods; 55 is a memory; 56 is an error-correcting code appending circuit; 57 is a digital signal processing circuit, constructed from the memory 55 and error-correcting code appending circuit 56, for selecting and encoding the band-compressed video and audio data as well as sub data containing additional function information, etc. supplied from a system controller, shuffling the data in memory space in accordance with the block structures that match the data rates of the respective data, and for appending error-correcting codes for output; 58 is a modulator for modulating the respective data with the respective error-correcting code appended thereto into respective recording signals; 59 is a SYNC appending circuit for discriminating the received recording signals between video, audio, and subcode, and appending at the head of each block a synchronizing signal unique to the block for separating one block from another; 60 is a recording amplifier; 61 is a record/playback selector switch; 62 is a rotary head; 63 is a playback amplifier; 64 is an waveform equalizer for performing waveform equalization on the amplified playback signal to deal with intersymbol interference, etc.; 65 is a data detector for detecting data by performing integrating detection, etc. on the waveform-equalized signal; 67 is a PLL circuit for generating playback clock pulses from the detected signal; 66 is a serial/parallel converter for sampling the data detected by the data detector 65 in synchronism with the playback clock pulses and thereby converting it into 8-bit parallel data; 68 is a demodulator for demodulating the parallel data; 71 is an error-detection/correction circuit; 72 is a memory; 73 is a digital signal processing circuit, constructed from the error-detection/correction circuit 71 and the memory 72, for performing error detection and correction on the data demodulated by the demodulator 68, and for deshuffling the data and converting it into decoded data; 69 is a SYNC detector for detecting a SYNC pattern from the parallel data and for generating a detection pulse; 70 is a SYNC protection circuit for discriminating between different SYNC signals by the detection pulse and thereby effecting synchronization protection for each specific SYNC signal; 74 and 85 are data expansion circuits for converting the band-compressed video and audio playback data back to the data of original bandwidths; 76 and 77 are D/A converters for converting the expanded video and audio playback data into respective analog playback signals; and 78 is the system controller which is responsible for the entire system control of the VTR, and which, in the illustrated configuration, performs signal processing such as additional function information processing.

Figure 64:
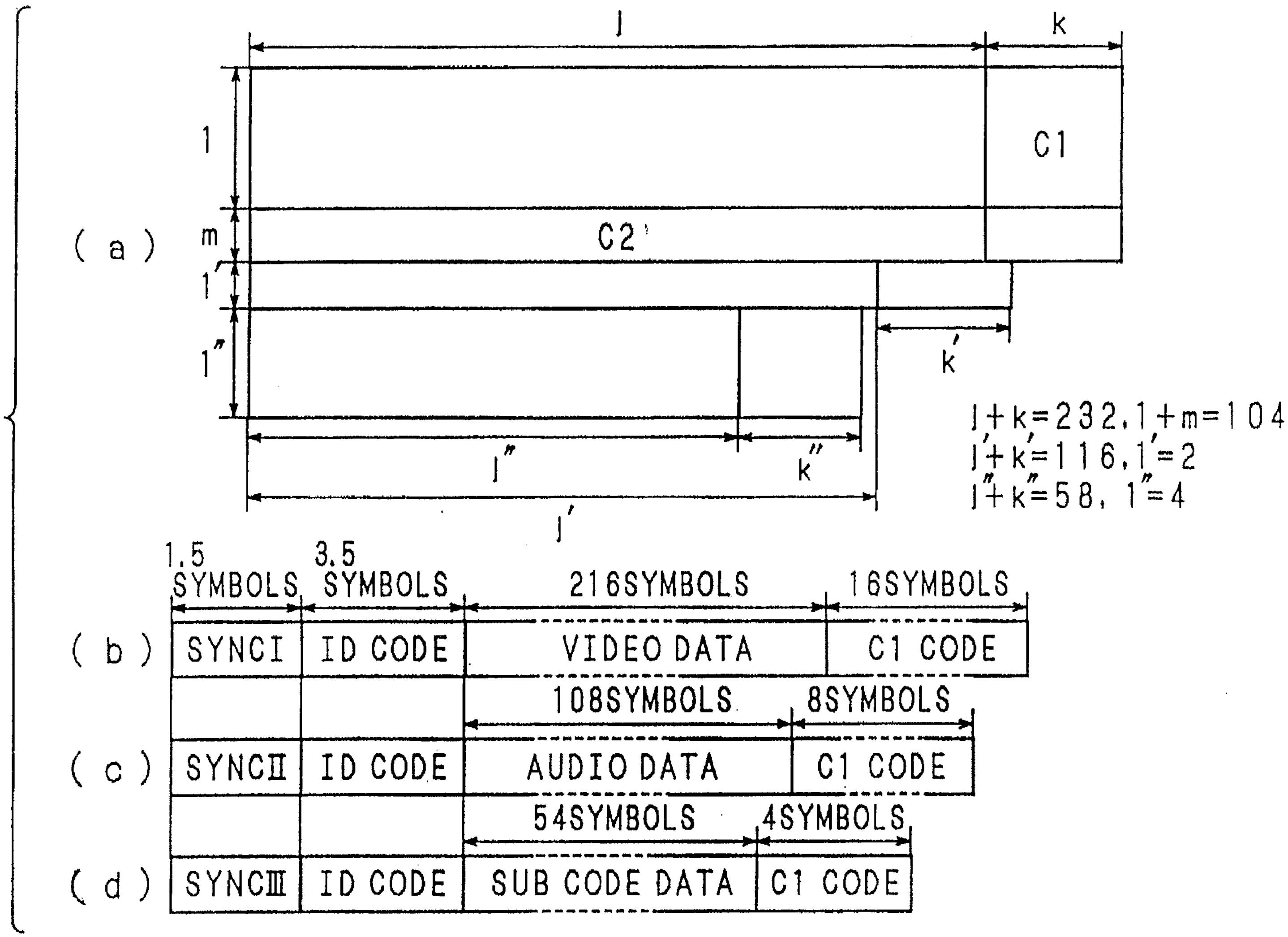
FIG. 64 is a diagram illustrating the block structures of data blocks for recording/reproducing according to the embodiment of the invention.

FIG. 64 is a diagram illustrating the block structures of the signals processed in the magnetic recording/reproducing apparatus according to the invention. In the figure, (a) shows the code structure for the respective data recorded on one track, and (b), (c), and (d) show the C1 code block structures for video data, audio data, and subcode data, respectively. In the figure, the "SYNC" area is for a synchronizing signal used to separate one block from another, the "ID CODE" area is for additional information, and the "C1 CODE" area is for an error-correcting code appended to the data area.

Figure 65:
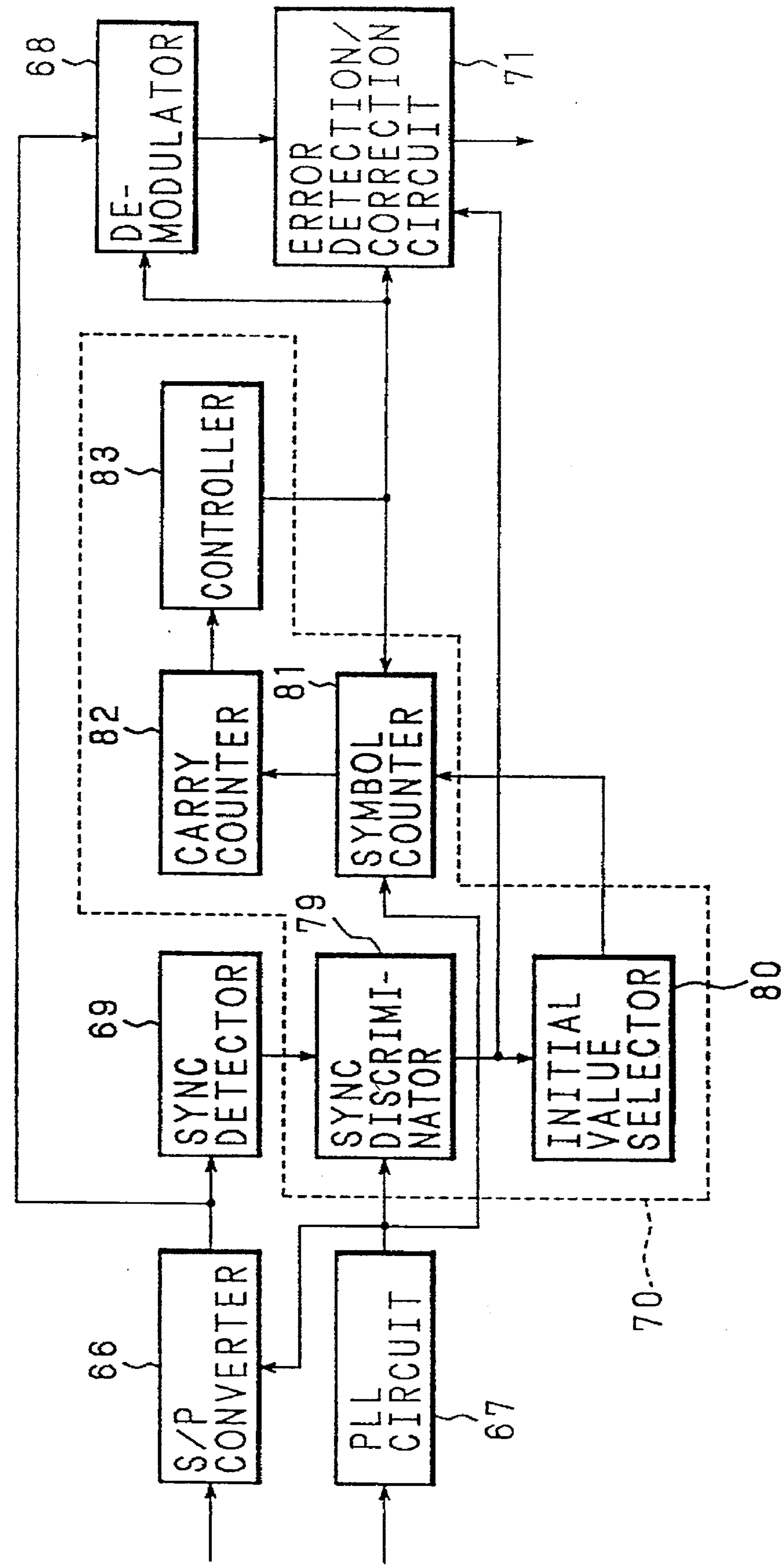
FIG. 65 is a block diagram showing the configuration of a SYNC protection circuit according to the embodiment of the invention.

FIG. 65 is a block diagram showing the configuration of the SYNC protection circuit 70. In the figure, the reference numeral 69 is the SYNC detector for detecting a synchronizing signal unique to the respective blocks for separating one block from another; 79 is a SYNC discriminator for discriminating each detected SYNC signal to identify which of the blocks the SYNC signal indicates; 80 is an initial value selector for selecting the count value for a symbol counter (a ring counter for synchronization protection) for synchronization protection for each specific block on the basis of the result supplied from the SYNC discriminator; 81 is the symbol counter for counting the number of symbol clocks on the basis of the playback clocks; 82 is a carry counter for counting the number of carry pulses generated when an overflow occurs in the symbol counter; and 83 is a controller for controlling the synchronization protection operation of the carry counter.

Figure 66:
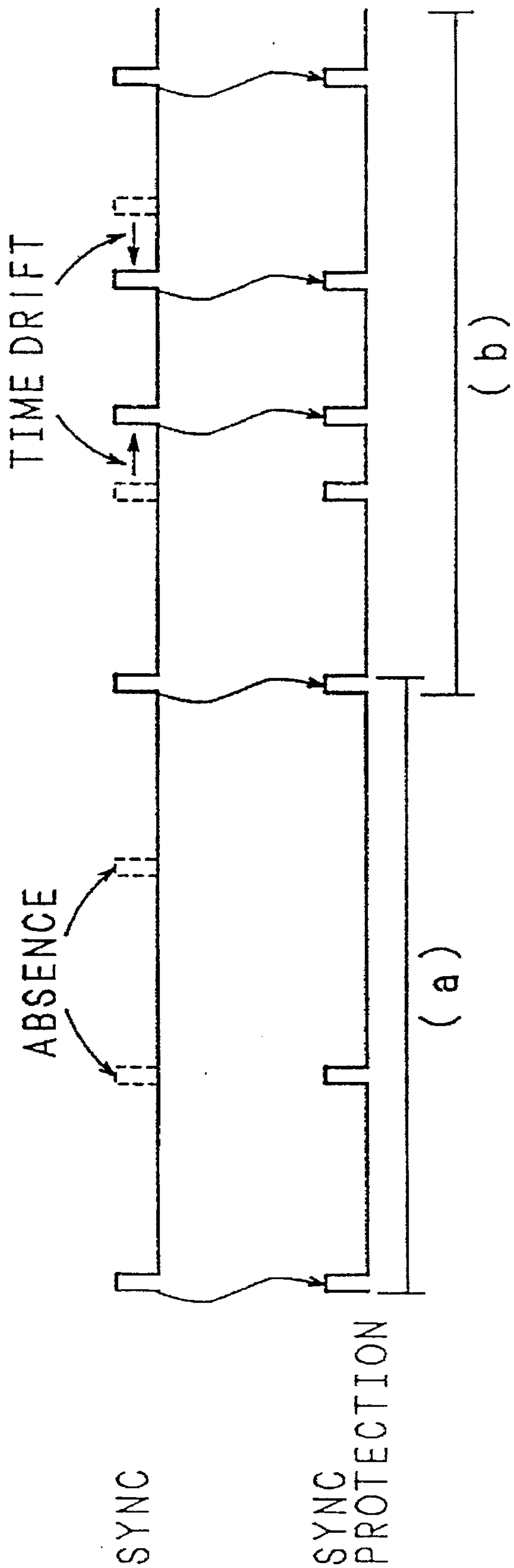
FIG. 66 is a diagram for explaining the output operation of the SYNC protection circuit according to the embodiment of the invention.

FIG. 66 is a timing diagram for explaining the operation of the SYNC protection circuit: Part (a) explains the operation in the absence of SYNC pulses, and Part (b) explains the operation in the case of time drift of SYNC pulses.

First, the recording operation will be explained with reference to FIG. 63.

The input video signal and audio signal are converted by the A/D converters 51, 52 into 8-bit and 16-bit data, respectively. Usually, the converted video signal has an information rate as high as about 160 Mbps (bps: bits per second), while the converted audio signal has an information rate of about 1 Mbps. In commercial digital VTRs, the digitized data are band-compressed by the data compression circuits 53, 54 using DCT or other method sin order to increase tape utilization; thus, the video data is compressed to about 40 Mbps and the audio data to about 400 kbps (for two channels L and R) in terms of information rate. The compressed data are transferred to the digital signal processing circuit 57 together with the subcode data, such as additional function information, output from the system controller 78. In the digital signal processing circuit 57, blocking, error-correcting code appending, and other signal processing operations are performed on the input data for recording track by track on the tape.

The information rate greatly differs between the types of data, i.e. 40 Mbps for video data, 400 kbps for audio data, and 100 kbps for subcode data. If they are to be organized into blocks using the same block format, a block format that can handle the video data having the largest information rate of the three would have to be employed. Suppose, for example, that the audio and subcode data are each organized into a data group of a plurality of data units with a total information rate equivalent to that of the video signal. In this case, as previously described, if an error occurs in any one block on the track, several data units would be put in error at a time, causing a drastic reduction in the error correction rate. On the other hand, if dummy data is inserted in each audio or subcode data to form a block of the size equivalent to the video data, the overall information rate would drop significantly.

For these reasons, in the present invention, the digital signal processing circuit 57 performs error correction coding, using the memory 55 and the error-correcting code appending circuit 56, whereby in the C1 block as shown in FIG. 64(*b*), a 16-byte C1 check code is appended to a 216-byte video signal as an error-correcting code for the video signal. This can correct errors of up to eight bytes within the block. Furthermore, for each column (96 bytes) of the block, an m-byte (8-byte) check code (C2 code) is appended in case of an occurrence of errors of more than eight bytes. This format is capable of correcting errors column-wise and thus provides a powerful burst error correcting capability. If the above format is structured to record the C1×C2 code group on one track, the recording rate is about 240 tracks per second.

On the other hand, the information rate of the audio data is 400 kbps for the two channels L and R. If recorded at the above rate of 240 tracks per second, about 1667 bits will be recorded per track. Therefore, if the same C1 block code structure were used for audio as well as for video, one block would suffice for the purpose, and appending a C2 code for each column would be disadvantageous from the viewpoint of redundancy; in this case, therefore, it is more practical to append the C1 code only. In such a format, however, if a Burst error of nine bytes occurred in the first half of the audio block, the audio block would become uncorrectable, thus making it impossible to reproduce sound. Accordingly, in the present invention, the digital signal processing circuit 57 encodes the audio portion in such a manner that an eight-byte C1 check code is appended to 108-byte audio data, as shown in FIG. 64(*c*), and the audio portion is constructed into two blocks. This can correct errors up to four bytes within the block.

In encoding, the data are shuffled in such a manner that the odd-numbered samples from the left channel and the even-numbered samples from the right channel are written in the first audio block while the even-numbered samples from the left channel and the odd-numbered samples from the right channel are written in the second audio block. In this format, if a burst error of nine bytes occurred during reproduction in the first half of the same audio block as previously mentioned, the first block would no doubt become uncorrectable and the data would be lost, but if the second block can be reconstructed, reproduction is possible by means of data interpolation.

Likewise, the subcode data portion is encoded by the digital signal processing circuit 57 in such a manner that a 4-byte C1 check code is appended to 54-byte subcode data, as shown in FIG. 64(*d*), the same data being written four times. After ID information, such as block address, recording track address, etc., is appended immediately preceding each block, the signals respectively encoded as shown in FIG. 64(*a*) are supplied to the modulator 58.

The modulator 58 converts the received data into signals that matches the transmission channel. The signals thus converted block by block are then fed to the SYNC appending circuit 59. The block-by-block signals are recorded one after another on the track, but a synchronizing signal needs to be added in order to separate one block form another so that synchronization can be accurately maintained at the start of each block. In the present invention, using an RLL code (RLL: run length limited with d=2 and k=4 (d: the smallest number of successive 0s, k: the largest number of successive 0s), a plurality of signal patterns with d<2 and k>4 (e.g., "100000101000001") that cannot occur in encoded data are constructed as synchronizing signals (SYNC signals); these signal patterns are stored in a memory or the like and are added at the head of each of the block-by-block signals to uniquely identify the relevant block.

Based on the control signal supplied from the error-correcting code appending circuit 57, the SYNC appending circuit 59 identifies the block format for each block-by-block signal input to it, selects the SYNC signal corresponding to the block, and appends it at the head of the block. The data are then fed to the recording amplifier 60 and recorded on a magnetic medium by means of the rotary head 62.

Next, the reproduction operation will be explained with reference to FIGS. 63 and 65.

The playback signal reproduced by the rotary head 62 is fed to the playback amplifier 63, and then to the waveform equalizer 64 for waveform equalization. The waveform-equalized playback signal is supplied to the data detector 65 which performs data detection such as integrating detection. The result is fed to the PLL circuit 67 and the serial/parallel converter 66. The PLL circuit 67 generates playback clock pulses from the detection signal. In synchronism with the playback clock pulses, the serial/parallel converter 66 converts the detection signal into parallel data, each data constituting a codeword (symbol). The data is then fed to the demodulator 68 and the SYNC detector 69.

The SYNC signal appended to each block in the recording process differs according to the type of data constituting the block, and also, the block length itself is different according to the type of data. Therefore, in SYNC detection, a plurality of SYNC detection operations must be performed simultaneously to identify which type of data the SYNC signal indicates and to provide synchronization protection suitable for each individual block.

The SYNC detector 69 detects the SYNC signal from the parallel data output from the serial/parallel converter 66, and outputs a detection pulse to the SYNC protection circuit 70. In the SYNC protection circuit 70, the SYNC discriminator 79 identifies the SYNC signal for each block on the basis of the received SYNC pulse, and supplies the result of the identification to the initial value selector 80 and the error-detection/correction circuit 71. Based on this identification result, the count value with which to start the counting of the ring counter is set to perform synchronization protection at a time interval corresponding to the length of each block; that is, by changing the initial value for counting, the same counter is used to form different counters for the synchronization protection suitable for a plurality of data blocks of different lengths.

Based on the identification result, the initial value selector 80 selects a count value corresponding to each SYNC pattern, which value is input to the symbol counter 81. In synchronism with the SYNC detection pulse supplied from the SYNC detector 79 or a load pulse output from the controller 83 in response to a carry signal that is generated when an overflow occurs in the symbol counter 81, the count value is loaded into the symbol counter 81, thus reading the count value and starting the counting operation. When the largest count value for the symbol counter 81 is denoted as M, and the number of symbols is denoted as l, m, and n for data blocks a, b, and c, respectively, the count values $f_a$, $f_b$, and $f_c$ that the initial value selector 80 selects for the respective blocks are given by $$f_a=M-l+l$$

$$f_b=M-m+1$$

$$f_c=M-n+1$$

(where $M\geqq 1-1$, $M\geqq m-1$, $M\geqq n-1$)

The carry signal generated when an overflow occurs in the symbol counter 81 is input to the carry counter 82. The count value in the carry counter is reset by the application of the SYNC detection pulse. When the count value in the carry counter 82 is "1", the controller 83 outputs a load pulse in synchronism with the application of the carry signal. If SYNC detection pulses are not input because of the absence or time drift of the SYNC signal, and if the count value in the carry counter reaches "2" or over, the controller 83 does not output a load pulse even when the carry signal is input. On the other hand, during the counting of the symbol counter 81, even when no carry signal is generated, a load pulse is generated at the application of the SYNC detection pulse and is input to the symbol counter 81 to reset the carry counter 82. In this manner, the SYNC protection operation is carried out as shown in FIGS. 66(*a*) and (*b*).

The demodulator 68 demodulates the parallel data in synchronism with the symbol clock pulses, and the demodulated signal is input to the digital signal processing circuit 73. In the digital signal processing circuit 73, when the SYNC discriminating signal is input, the parallel data is input to the memory 72 where the data is reordered in the memory space into an arrangement that matches the code structure of each block according to video, audio, or subcode data, the reordered data then being detected and corrected for errors by the error-detection/correction circuit 71, and deshuffled for decoding. The decoded data is separated into video, audio; and subcode data on the basis of the SYNC discriminating signal, and supplied to the system controller 78 and also to the respective data expansion circuits 74 and 75. In the respective data expansion circuits 74 and 75, the decoded video and audio data are expanded to reconstruct the data of the original bandwidths, and in the D/A converters 76, and 77, the data are converted into an analog video signal and an analog audio signal which is output. The decoded subcode data is processed in the system controller 78 as additional function information.

The above-embodiment uses data quantized in 8 and 16 bits. It should be appreciated, however, that the teachings of the present application are equally applicable when the data is quantized in four, six, ten or any other number of bits.

In the above embodiment, SYNC protection is performed on the basis of a carry at the time of an overflow of the symbol counter that is constructed from an up counter, but alternatively, if the symbol counter is constructed from a down counter and SYNC protection is performed on the basis of a borrow, the same effect can be obtained.

As described above, according to the invention, when recording and reproducing different types of data of differing data rates, such as video data having a very large information rate and audio data having a relatively small information rate, blocks of different structures are constructed that match the respective types of data of different information rates, each different block containing an error-correcting code that matches the relevant information rate; this enhances the freedom of block structure design and thereby increases the information efficiency and accuracy in recording/reproducing processes. Furthermore, according to the invention, an increase in the circuit complexity involved in increasing the freedom of block structure design is held to a minimum, and reliable synchronization protection is ensured, thus achieving the construction of an efficient magnetic recording/reproducing apparatus.

The inventions described above may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A recording/reproducing apparatus for recording and reproducing multiple kinds of digital signals having different data amounts per unit time on a recording medium, comprising:

blocking means for organizing said multiple kinds of digital signals into a plurality of blocks, at least two of said multiple kinds of digital signals being organized into blocks having different lengths, and for appending a synchronizing signal to each of said plurality of blocks, said synchronizing signal identifying a length of each of said plurality of blocks;

recording means for recording the organized plurality of blocks on one track on the recording medium;

reproducing means for reproducing said plurality of blocks from said recording medium; and synchronization protecting means for detecting said synchronization signal for each of said plurality of blocks output by said reproducing means, and for performing synchronization protection for a variable protection period for said plurality of blocks based on said synchronization signal; wherein the synchronization protection means includes, means for detecting said appended synchronizing signal, means for identifying, by the detected synchronizing signal, the length of each of said plurality of blocks, and means for changing a counter value of a counter for synchronization protection in accordance with the result of the identification.

2. A recording/reproducing apparatus for recording and reproducing multiple kinds of digital signals having different data amounts per unit time on a recording medium, comprising:

blocking means for organizing said multiple kinds of digital signals into a plurality of blocks, at least two of said multiple kinds of digital signals being organized into blocks having different lengths, and for appending a synchronizing signal to each of said plurality of blocks, said synchronizing signal identifying a length of each of said plurality of blocks;

recording means for recording the organized plurality of blocks on one track on the recording medium;

reproducing means for reproducing said plurality of blocks from said recording medium; and synchronization protecting means for detecting said synchronization signal for each of aid plurality of blocks output by said reproducing means, and for performing synchronization protection for a variable protection period for said plurality of blocks based on said synchronization signal such that said synchronization protecting means sets said variable protection period for each of said plurality of blocks based on the length of each of said plurality of blocks.

3. The recording/reproducing apparatus of claim 2, wherein said synchronization protecting means includes a variable counter for measuring said variable protection period.

4. A recording/reproducing apparatus for recording and reproducing multiple kinds of digital signals having different data amounts per unit time on a recording medium, comprising:

blocking means for organizing said multiple kinds of digital signals into a plurality of blocks, at least two of said multiple kinds of digital signals being organized into blocks having different lengths, and for appending a synchronizing signal to each of said plurality of blocks, said synchronizing signal identifying a length of each of said plurality of blocks;

recording means for recording the organized plurality of blocks on one track on the recording medium;

reproducing means for reproducing said plurality of blocks from said recording medium; and synchronization protecting means for detecting said synchronization signal for each of aid plurality of blocks output by said reproducing means, and for performing synchronization protection for a variable protection period for said plurality of blocks based on said synchronization signal such that said synchronization protecting means sets said variable protection period for each of said plurality of blocks based on said synchronization signal appended thereto.

5. The recording/reproducing apparatus of claim 4, wherein said synchronization protecting means includes a variable counter for measuring said variable protection period.

6. A recording/reproducing apparatus for recording and reproducing multiple kinds of digital signals having different data amounts per unit time on a recording medium, comprising:

blocking means for organizing said multiple kinds of digital signals into a plurality of blocks, at least two of said multiple kinds of digital signals being organized into blocks having different lengths, for organizing said multiple kinds of digital signals into said plurality of blocks of different lengths such that a length of each of said plurality of blocks generally corresponds to a data amount per unit time of a corresponding one of said multiple kinds of digital signals, and for appending a synchronizing signal to each of said plurality of blocks, said synchronizing signal identifying a length of each of said plurality of blocks and identifying to which of said multiple kinds of digital signals each of said plurality of blocks corresponds;

recording means for recording the organized plurality of blocks on one track on the recording medium;

reproducing means for reproducing said plurality of blocks from said recording medium; and synchronization protecting means for detecting said synchronization signal for each of said plurality of blocks output by said reproducing means, and for setting a variable protection period for each of said plurality of blocks based on the length of each of said plurality of blocks, said synchronization protection means allowing sid recording/reproducing apparatus to accommodate blocks of different lengths within the same track.

* * * * *